United States Patent [19]
Kopec et al.

[11] Patent Number: 5,706,364
[45] Date of Patent: Jan. 6, 1998

[54] METHOD OF PRODUCING CHARACTER TEMPLATES USING UNSEGMENTED SAMPLES

[75] Inventors: Gary E. Kopec, Belmont; Philip Andrew Chou, Menlo Park, both of Calif.

[73] Assignee: Xerox Corporation, Stamford, Conn.

[21] Appl. No.: 431,714

[22] Filed: Apr. 28, 1995

[51] Int. Cl.$^6$ .................................................. G06R 9/62
[52] U.S. Cl. .................................. 382/159; 395/20
[58] Field of Search .................................. 382/155, 156, 382/157, 159, 160, 161, 209, 216, 294, 295; 395/20, 21, 23

[56] References Cited

U.S. PATENT DOCUMENTS

| | | | |
|---|---|---|---|
| 3,233,219 | 2/1966 | Atrubin et al. | 340/146.3 |
| 4,769,716 | 9/1988 | Casey et al. | 358/263 |
| 5,303,313 | 4/1994 | Mark et al. | 382/56 |
| 5,321,773 | 6/1994 | Kopec et al. | 382/30 |
| 5,438,630 | 8/1995 | Chen et al. | 382/159 |
| 5,440,651 | 8/1995 | Martin | 382/156 |
| 5,469,512 | 11/1995 | Fujita et al. | 382/159 |
| 5,526,444 | 6/1996 | Kopec et al. | 382/233 |
| 5,542,006 | 7/1996 | Shustorovich et al. | 395/21 |
| 5,566,247 | 10/1996 | Watanabe et al. | 382/155 |
| 5,577,166 | 11/1996 | Mizuno | 395/23 |

FOREIGN PATENT DOCUMENTS 0546843  6/1993  European Pat. Off. ......... G06K 9/00

OTHER PUBLICATIONS

National Science Foundation (NSF) Grant Proposal for NSF Program Digital Libraries NSF 93–141 Feb. 4, 1994, submitted by the Regents of the University of California, Berkeley, document date Jan. 24, 1994, p. i–xi, 2–5, 36–37, 101, and 106.

G. Kopec, "Least–Squares Font Metric Estimation from Images", in *IEEE Transactions on Image Processing*, Oct., 1993, pp. 510–519.

G. Kopec and P. Chou, "Document Image Decoding Using Markov Source Models," in *IEEE Transactions on Pattern Analysis and Machine Intelligence*, vol. 16, No. 6, Jun. 1994, pp. 602–617.

(List continued on next page.)

*Primary Examiner*—Joseph Mancuso
*Attorney, Agent, or Firm*—Judith C. Bares

[57] ABSTRACT

A method for producing, or training, a set of character templates uses as the source of training samples an image source of character images, called glyphs, that are not previously segmented or isolated for training. Also used is a labeled glyph position data structure that includes, for each glyph in the image source, a glyph image position in the image source associating an image location of the glyph with a character label paired with the glyph image position that indicates the character in the character set being trained. The labeled glyph position data is used to identify a collection of glyph sample image regions in the image source for each character in the character set; each glyph sample image region is large enough to contain a glyph and typically contains adjacent glyphs for other characters. The invention mathematically characterizes the template construction problem using unsegmented samples as an optimization problem that optimizes a function that represents the set of character templates being trained as an ideal image to be reconstructed to match the input image. The method produces all of the character templates contemporaneously by using a novel pixel scoring technique that implements an approximation of a maximum likelihood criterion subject to a constraint on the templates produced which holds that foreground pixels in adjacently positioned character images have substantially nonoverlapping foreground pixels. The character templates produced may be binary templates or arrays of pixel color probability values, and may also have substantially disjoint supports, such that adjacently imaged templates have substantially no overlapping foreground pixels.

24 Claims, 23 Drawing Sheets

OTHER PUBLICATIONS

E. Levin and R. Pieraccini, "Dynamic planar warping for optical character recognition," in *Proceedings of the 1992 International Conference on Acoustics, Speech and Signal Processing* (ICASSP), San Francisco, California, Mar. 23–26, 1992, pp. III–149–III–152.

R. Rubenstein, *Digital Typography: An Introduction to Type and Composition for Computer System Design*, Addison–Wesley, 1988, pp. 115–121.

*Adobe–Systems, Inc. Postscript Language Reference Manual*, Addison–Wesley, 1985, pp. 95–96.

A. Kam and G. Kopec, "Separable source models for document image decoding", conference paper presented at *IS&T/SPIE 1995 Intl. Symposium on Electronic Imaging*, San Jose, CA, Feb. 5–10, 1995.

A. Kam, "Heuristic Document Image Decoding Using Separable Markov Models", S.M. Thesis, Massachusetts Institute of Technology, Cambridge, MA, Jun., 1993.

P.A. Chou and G.E. Kopec, "A Stochastic Attribute Grammar Model of Document Production and Its Use in Document Image Decoding", conference paper presented at *IS&T/SPIE 1995 Intl. Symposium on Electronic Imaging*, San Jose, CA, Feb. 5–10, 1995.

*Fig. 13* procedure $(\mathcal{F}, C, Z)$ do begin while $\max\limits_{\left\{\begin{array}{l}c \in \mathcal{F} \\ \vec{x} \in C\end{array}\right\}} S_c(\vec{x}; Z, \alpha_1^{(c)}) > 0$ do begin

$(s, \vec{w}) := \arg \max\limits_{\left\{\begin{array}{l}c \in \mathcal{F} \\ \vec{x} \in C\end{array}\right\}} S_c(\vec{x}; Z, \alpha_1^{(c)})$ $q_s(\vec{w}) := 1$ for $i = 1 \ldots N_s$ do $z(\vec{w} + \vec{x}_i^{(s)}) := 0$ end end

*Fig.16* procedure $(\mathcal{F}, C, Z_1, Z_0)$ do begin while $\max\limits_{\left\{\begin{array}{l}c \in \mathcal{F} \\ \vec{x} \in C\end{array}\right\}} S_c(\vec{x}; Z_{\sigma(\alpha_1^{(c)})}, \alpha_1^{(c)}) > 0$ do begin

$(s, \vec{w}) := \arg \max\limits_{\left\{\begin{array}{l}c \in \mathcal{F} \\ \vec{x} \in C\end{array}\right\}} S_c(\vec{x}; Z_{\sigma(\alpha_1^{(c)})}, \alpha_1^{(c)})$ $q_s(\vec{w}) := 1$ for $i = 1 \ldots N_s$ do $z_1(\vec{w} + \vec{x}_i^{(s)}) := 0$ for $i = 1 \ldots N_s$ do $z_0(\vec{w} + \vec{x}_i^{(s)}) := 1$ end end

*Fig.17* procedure $(\mathcal{F}, \mathcal{C}, \mathcal{A}, Z_1, Z_0)$ do begin while $\max\limits_{\left\{\begin{array}{c} c \in \mathcal{F} \\ \vec{x} \in \mathcal{C} \\ a_1 \in \mathcal{A} \end{array}\right\}} S_c(\vec{x}; Z_{\sigma(a_1)}, a_1) > 0$ do begin

$$(s, \vec{w}, \hat{a}_1) := \arg \max_{\left\{\begin{array}{c} c \in \mathcal{F} \\ \vec{x} \in \mathcal{C} \\ a_1 \in \mathcal{A} \end{array}\right\}} S_c(\vec{x}; Z_{\sigma(a_1)}, a_1)$$

$q_s(\vec{w}) := 1$ $a_1^{(s,\vec{w})} := \hat{a}_1$ for $i = 1 \ldots N_s$ do $z_1(\vec{w} + \vec{x}_i^{(s)}) := 0$ for $i = 1 \ldots N_s$ do $z_0(\vec{w} + \vec{x}_i^{(s)}) := 1$ end end

*Fig.18*

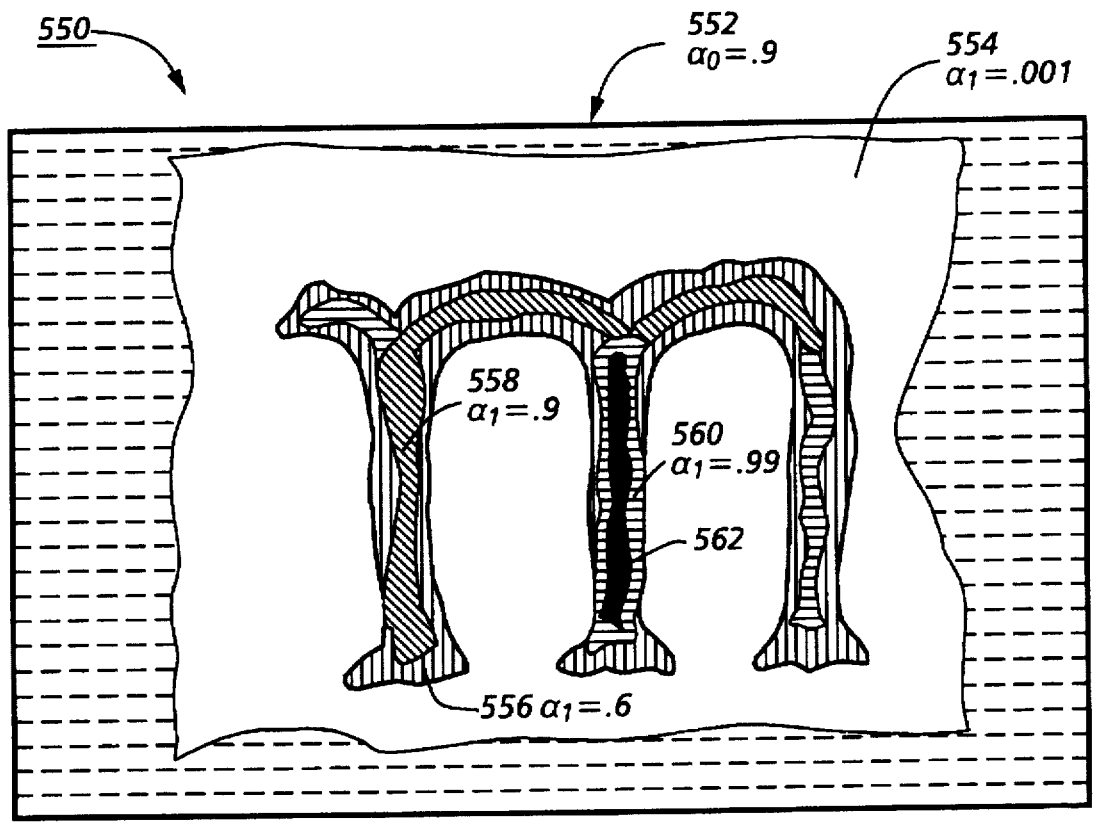
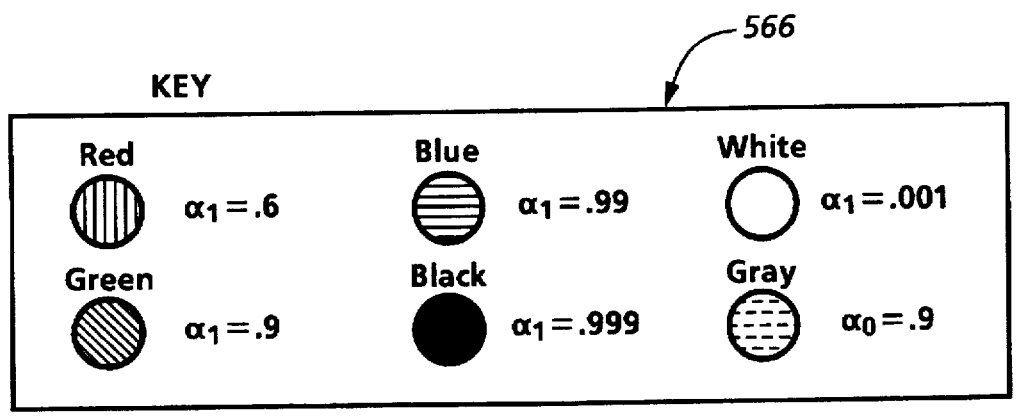
Fig.19

METHOD OF PRODUCING CHARACTER TEMPLATES USING UNSEGMENTED SAMPLES

CROSS REFERENCE TO OTHER APPLICATIONS

The invention that is the subject matter of the present application is related to several other inventions that are the subject matter of copending, commonly assigned U.S. patent applications, respectively identified as Ser. No. 08/431,223, "Automatic Training of Character Templates Using a Transcription and a 2D Image Source Model"; Ser. No. 08/431,253, "Automatic Training of Character Templates Using a Text Line Image Source, a Text Line Transcription and an Image Source Model"; Ser. No. 08/430,635, "Unsupervised Training of Character Templates Using Unsegmented Samples"; and Ser. No. 08/460,454, "Method and System for Automatic Transcription Correction."

FIELD OF THE INVENTION

The present invention relates generally to the field of computer-implemented methods of and systems for document and character recognition, and more particularly to a method of producing character templates for use in computer-implemented systems that process text document images.

BACKGROUND

Information in the form of language symbols (i.e., characters) or other symbolic notation that is visually represented to a human in an image on a marking medium, such as a computer display screen or paper, is capable of manipulation for its semantic content by a processor included in a computer system when the information is accessible to the processor in an encoded form, such as when each of the language symbols is available to the processor as a respective character code selected from a predetermined set of character codes (e.g. ASCII code) that represent the symbols to the processor. When manipulation of the semantic content of the characters in the image by a processor is desirable, a process variously called "recognition," or "character recognition," or "optical character recognition" must be performed on the image in order to produce, from the images of characters, a sequence of appropriate character codes.

An image is typically represented in a computer system as a two-dimensional array of image data, with each item of data in the array providing a value indicating the color (typically black or white) of a respective location of the image. An image represented in this manner is frequently referred to as a bitmapped image, or a binary image. Each location in a binary image is conventionally referred to as a picture element, or pixel. Sources of binary images include images produced by scanning a paper form of a document using an optical scanner, or by receiving image data via facsimile transmission of a paper document.

Character recognition systems typically include a process in which the appearance of an isolated, input character image, or "glyph," is analyzed and, in a decision making process, classified as a distinct character in a predetermined set of characters. The term "glyph" refers to a character in its exemplary image form; a glyph is an image that represents a realized instance of a character. The classification analysis typically includes comparing characteristics of the isolated input glyph (e.g., its pixel content or other characteristics) to units of reference information about characters in the character set, each of which defines characteristics of the "ideal" visual representation of a character in its particular size, font and style, as it would appear in an image if there were no noise or distortion introduced by the image creation process. The unit of reference information for each character, typically called a "character template," "template" or "prototype," includes identification information, referred to as a "character label," that uniquely identifies the character as one of the characters in the character set. The character label may also include such information as the character's font, point size and style. A character label is output as the identification of the input glyph when the classification analysis determines that a sufficient match between the glyph and the reference information indicating the character label has been made.

The representation of the reference information that comprises a character template may be referred to as its model. Character template models are broadly identifiable as being either binary images of characters, or lists of high level "features" of bitmapped character images. A binary image of a black character template on a white background includes black foreground pixels that collectively make up the template's "support." "Features" are measurements of a character image that are derived from the binary image and are typically much fewer in number than the number of pixels in a binary template. Examples of features include a character's height and width, and the number of closed loops in the character.

Within the category of bitmapped, or binary, character template models, at least two different types of models have been defined. One common model for binary character templates may be called the "segmentation-based" model, and describes a character template as fitting entirely within a minimally-sized rectangular region, referred to as a "bounding box." A bounding box is defined to be the smallest rectangular box that can be drawn around a glyph or character template and include all of the foreground pixels within the rectangular box. The segmentation-based character template model describes the combining of adjacent character templates as being "disjoint"—that is, requiring substantially nonoverlapping bounding boxes. U.S. Pat. No. 5,321,773 discloses another binary character template model that is based on the sidebearing model of letterform shape description and positioning used in the field of digital typography. The sidebearing model, described in more detail below in the discussion accompanying FIG. 21, describes the combining of templates to permit overlapping rectangular bounding boxes as long as the foreground pixels of one template are not shared with, or common with, the foreground pixels of an adjacent template; this is described as requiring the templates to have substantially "disjoint supports."

Training character templates is the process of using training data to create, produce or update the templates for use typically, but not exclusively, in a recognition operation. Training data can be broadly defined as a collection of isolated, individual character image (glyph) samples, each with an assigned character label identifying the character in the character set that it represents, that provide the information necessary to produce templates according to the character template model defining the templates. Existing methods for the estimation (i.e., construction) of binary character templates are relatively straightforward variations of foreground (e.g., black) pixel counting algorithms imposed on collections of isolated glyph samples that are aligned at their bounding boxes. Threshold values are typically used to evaluate the pixel counts to determine whether a pixel in the final template is to be designated a foreground pixel. Binary character templates may also be represented as arrays of probability values, where each pixel location indicates, instead of an ON/OFF value, a probability that reflects the statistical occurrence of an ON or an OFF pixel in the training data for that pixel location. Character templates represented as probability arrays may provide for improved character classification during recognition. For purposes of this background discussion, the term "binary character template" will include both bitmapped character templates and templates of probability values.

The success of training high quality binary character templates using conventional methods ultimately depends on the quality of the glyph samples provided for training. Glyph samples are typically derived from a two-dimensional image of a page that includes text, hereafter also called a text document image. Good quality glyph samples required by conventional training techniques are those (1) that are substantially unimpaired by missing or extraneous foreground pixels when they are input to the training process, and (2) for which all or substantially all foreground pixels have been properly identified for inclusion in the sample prior to training. The first requirement pertains directly to the issue of noise in the input sample, and the second is relevant to the issue of pre-training sample segmentation. These requirements, it will be shown, substantially limit the usefulness and flexibility of existing training processes.

Glyph samples derived from binary images produced from well-known sources such as scanning and faxing processes are subject to being degraded by image noise which contributes to uncertainty in the actual appearance of the bitmap. A degraded bitmap appearance may be caused by an original document of poor quality, by scanning error, by image skewing, or by similar factors affecting the digitized representation of the image. Particular problems in this regard are the tendencies of characters in text to blur or merge, or to break apart. Such a degraded image will be referred to herein as a "noisy" image. The requirement of good quality glyph samples as an input to existing training processes has generally imposed the limitation that the input image used as the source of glyph samples be relatively non-noisy, or, if noisy images are permitted to be used, that there be some process for removing or otherwise compensating for the noise in the samples.

More importantly, existing template construction techniques require that good quality glyph samples be isolated, or segmented, from adjacent glyphs, at least to the extent that, in a text document image in which several adjacent glyph samples occur, a decision has been made with respect to each foreground pixel prior to template training as to which glyph sample the pixel is to be included. Glyph sample segmentation may be accomplished using known methods for automatically finding character bounding boxes. However, such techniques are highly error prone, especially when the text document image containing the samples is noisy. For fonts that permit overlapping bounding boxes, such as those following the sidebearing model, many script fonts, and fonts for languages that have inherently touching symbols, glyph sample segmentation may be impossible to accomplish successfully using automatic methods. For these reasons, when high quality templates are desired, glyph sample segmentation for training purposes is more typically accomplished by requiring the user of the training system to manually isolate each glyph sample from a displayed image of glyph samples.

Recognition systems typically provide distinct training subsystems for the purpose of training the character templates. Training systems may be "supervised" or "unsupervised." A template training system that requires some aspect of the training data to be specially prepared by a user of the system is considered to be a "supervised" training or learning system. Typically, a supervised training system requires samples that have been labeled in advance of training. In contrast, an "unsupervised" training system produces training data automatically, typically as a result of performing a recognition operation on an input text document image, on a series of text lines extracted from an input text document image, or on pre-segmented, isolated character images. In unsupervised training, labels for glyph samples are not known prior to the start of the training process; the source of glyph samples is the image being recognized, and the character labels are assigned to the glyph samples as a result of performing the recognition operation. When the input source of glyph samples is not a collection of pre-segmented, isolated character images, the recognition operation in unsupervised training typically includes a character segmentation process during which the glyph samples themselves are identified. The training data then can be used in a training system without user involvement in its preparation. Unsupervised training is characterized by the fact that the character templates that provide the character labels for the glyph samples in the training data are the same character templates that are being trained. This provides the opportunity to train existing templates using the same image that is used for recognition, toward improving overall recognition accuracy for similar documents in the same font or character set, while eliminating or reducing the direct involvement of a user in the preparation of the training data.

The quality of the training data produced by unsupervised training systems is subject to the same concerns of image noise and segmentation as previously described. In some existing unsupervised training systems, the input image is some type of text document image produced by a well-known source process such as scanning or facsimile transmission, in contrast to an image specially prepared for training purposes in a supervised training system. The quality of the glyph samples identified during unsupervised training is directly dependent on the quality, i.e. the degree of non-noisiness, of the input image source, or, if noisy images are permitted to be used, on the ability of the recognition operation to remove or otherwise compensate for the noise in the glyph samples.

Similarly, with respect to the proper identification of glyph samples, when the character template model of the character templates being trained is the bitmapped, segmentation-based model, the templates are required to each fit within a bounding box. This typically imposes the same requirement on the glyph samples, which in turn may impose a constraint on the type of input image that may be used in the unsupervised training process. If the glyph samples are to be derived from an image of an existing text document, or from an image of a line of text or word in such a document, the glyph samples must occur within the image, line or word either in substantially nonoverlapping bounding boxes, or, if the glyph samples are not so restricted, the recognition operation must provide for assign pixels in the image to a specific glyph sample, so that the samples may be isolated, recognition may be performed and character labels may be assigned to the samples. This requirement of the input image will be hereafter described as requiring that the input glyph samples be "segmentable" during the recognition process, either by determining the bounding box around each glyph, or by some other process that assigns foreground pixels to glyph samples. Requiring segmentable glyph samples generally imposes a limitation on the type of existing text document input image that may be used in an unsupervised training process, since some images may contain glyphs representing characters in fonts or in character sets that do not lend themselves easily to such segmentation. Moreover, even when the samples are segmentable, the effectiveness of the unsupervised training process depends on the ability of the recognition process to correctly segment them, a process that may be adversely affected by factors such as an excessive amount of noise in the input image.

U.S. Pat. No. 5,321,773, issued to G. Kopec and P. A. Chou and entitled "Image Recognition Method Using Finite State Networks" discloses a recognition system that uses binary character templates modeled after the sidebearing model. The recognition system and the template model are also discussed in G. Kopec and P. Chou, "Document Image Decoding Using Markov Source Models," in *IEEE Transactions on Pattern Analysis and Machine Intelligence*, June, 1994, pp. 602–617 (hereafter, "Kopec and Chou, 'Document Image Decoding'".) Training of the character templates used in U.S. Pat. No. 5,321,773 involved both the actual construction of the binary character templates and estimating or computing specific typographic characteristics, or parameters, that are required for proper template positioning; these are known as character sidebearings, set widths and baseline depths, collectively called font metrics. The training process disclosed is illustrative of the problems involved in preparing high quality training data for the training of binary character templates using conventional training techniques.

U.S. Pat. No. 5,321,773 discloses the training of the character templates at col. 11–170, and the training process is further described in G. Kopec, "Least-Squares Font Metric Estimation from Images," in *IEEE Transactions on Image Processing*, October, 1993, pp. 510–519 (hereafter, "Kopec, 'Font Metric Estimation'".) The training technique disclosed is a supervised technique that used a specially prepared input image, shown in FIG. 14 of the patent, and in FIG. 3 of Kopec, "Font Metric Estimation" in which the glyph samples were segmentable. The samples were subjected to a pre-training segmentation step described at pg. 516 in Kopec, "Font Metric Estimation" in which the text lines and individual characters within each line of a font sample page were extracted using simple connected-component based analysis procedures of a text image editor. The text image editor required the input image of samples to be a single column of Roman text laid out in distinct horizontal lines separated by white space. In order to minimize segmentation problems, the space between each glyph sample in the input image was increased when the samples were created. This increased horizontal white space between the glyphs is observable in FIG. 14 of the patent. Each glyph sample isolated by the text image editor was labeled using a prepared text transcription of the sample page that included ordered character labels identifying the samples, paired on a one-for-one basis with the glyph samples in the input image.

The essentially manual supervised training technique disclosed in U.S. Pat. No. 5,321,773 and in Kopec, "Font Metric Estimation" requires that glyph samples be segmentable in the image source in which they occur, while the template model of the templates being trained requires only that pairs of the character images of the templates have substantially disjoint supports. This is because existing template construction techniques using pixel averaging and thresholding techniques are only capable of producing binary character templates from samples that include foreground pixels capable of being isolated within a bounding box that does not overlap with the bounding boxes of adjacent samples. Requiring specially prepared, segmentable glyph samples for training purposes imposes the burden of preparing the training data on the user, and eliminates the possibility of doing unsupervised training of the character templates. In addition, some text document images having character images positioned according to the sidebearing model could not themselves be used as sources of glyph samples for training, since these images might include some adjacent character pairs that would not be segmentable.

SUMMARY OF THE INVENTION

The present invention is based on the premise that requiring either segmentable or pre-segmented glyph samples for use as training data for the training of binary character templates, as is done in conventional training techniques, poses an unnecessary and inflexible restriction on the format of the training data that eliminates the possibility of successfully automating the training process. Automatic glyph sample segmentation techniques are prone to error in assigning foreground pixels correctly to appropriate samples, especially for noisy samples, and neither automatic nor manual segmentation techniques can accommodate the segmentation of glyph samples for character sets or fonts that contain pairs of letters that are inherently connected or touching.

The present invention is based on the further premise that significant flexibility in the source of training samples, as well as in the types of character sets that could be accommodated, would be provided if binary character templates could be trained without regard to finding the bounding boxes of the glyph sample training data prior to actual template construction.

The present invention is based on the discovery that training binary character templates may be effectively accomplished knowing only a single pixel position, for example the image origin position, of each of the glyph samples occurring in an input two-dimensional (2D) text image along with a character label identifying the glyph as a character in the character set being trained. Template training need not also depend on determining a bounding box around a glyph sample to segment the pixels that are to be included in the sample prior to training the binary character templates.

The novel template construction technique of the present invention requires only that glyphs occurring in an existing input text document image each be identified by two data items: a single pixel position in an input sample image region and a character label identifying the character for which the glyph is a sample. The sample image region that includes the glyph sample is not restricted in size to require only pixels that belong to a single glyph, since such information about the glyphs in the image is unknown when using this training technique. Therefore, the sample image region may be relatively large in comparison with a minimally sized bounding box and may contain other adjacent glyph samples in addition to the glyph sample included in the region. For convenience and consistency in the discussion of the template construction technique, the single pixel position associated with a glyph will be referred to herein as the glyph sample's image origin position along the baseline of the text line in which it appears in the image. However, any single pixel position that is either a foreground pixel in the glyph sample, or is a pixel position that is somehow related to a foreground pixel position in the glyph sample may be used to associate the location in the sample image region with a glyph, as long as each glyph sample having the same label is designated in the same manner as all others having that label.

The template construction technique of the present invention is developed from a mathematical model of the template construction problem that arises when training data samples are permitted to include unsegmented glyph samples. The mathematical model models the template construction problem as an optimization problem in which an ideal image, representing a function of the set of character templates being constructed, is reconstructed to match image 10 by positioning respective ones of the character templates in an image plane at image pixel positions identified as image glyph source locations of glyphs occurring in the image glyph source. A character template is identified for positioning in the ideal image by the glyph label paired with the image glyph source location. Pixel scores are then computed for template pixel positions in template image regions using selected ones of the sample pixel positions in selected ones of the sample image regions included in the image glyph source. The pixel scores are used to select and sequentially assign a pixel value to selected template pixel positions in selected template image regions. The selected template pixel positions are selected on the basis of the pixel scores optimizing the function representing the ideal image such that the pixel value assigned to each selected template pixel position optimizes a matching score measuring the match between the image glyph source and the ideal image when all template pixel positions have been assigned pixel values.

The sample pixel positions in sample image regions that are used to determine the order of template pixel assignment may vary with the specific implementation of the template construction technique of the present invention. For example, the technique may be implemented in a manner that produces a character template from information about only the image origin positions of the glyph samples in the input image glyph source by aligning the sample image regions identified as training data samples for respective ones of the character templates in a particular manner. An array of template pixel positions, called a template image region, having vertical and horizontal dimensions suitable for storing a character template, is produced for each character template to be trained. The template image region is used to determine, for each character template, sample image regions in a 2D input image, each containing at least one image origin position of a glyph sample identified for the respective character template. Each sample image region is typically large enough to include one or more additional image origin positions of other glyph samples. A template image region includes a template pixel position designated as the template origin position, and a sample image region in the 2D input image is determined relative to the local coordinate system of the template image region such that the image origin position of a glyph sample has the same displacement from a lower left corner reference pixel of the sample image region as the template origin position's displacement from a lower left corner reference pixel in the template image region. All of the sample image regions indicating the same respective one of the characters in the glyph sample character set are called a collection of sample image regions, and each sample image region in the collection is aligned with all others, and with the template for that character, at the image origin position of the glyph identifying the sample. Thus, even though a sample image region may include more than one glyph sample, it is aligned with other sample image regions in the same collection at the proper image origin position.

The order in which foreground pixel color values are assigned to template pixel positions in selected ones of the template image regions is not restricted to completing a single one of the template image regions at a time; in fact, because the sample image regions contain unsegmented glyphs, the present invention produces character templates substantially contemporaneously. For example, in the illustrated implementation, template pixel assignment is based on computing template pixel scores for respective ones of the template pixel positions in the template image regions using the sample pixel values indicated by the sample pixel positions included in the sample image regions. A pixel value is then assigned to a template pixel position, referred to as an assigned template pixel position, selected on the basis of the template pixel scores. The sample pixel values of the sample pixel positions used in computing the template pixel score for the assigned template pixel position are then modified to reduce subsequently-computed pixel scores. These steps are repeated until a stopping condition indicates that the set of character templates is complete. This pixel scoring technique ensures that templates are produced correctly from unsegmented samples.

There are several benefits and advantages that result from the template construction technique of the present invention. Elimination of a segmentation step prior to template construction eliminates segmentation errors introduced when performing segmentation on a noisy image, and so permits images of existing text documents of varying quality to be used as sources of glyph samples. The novel template construction process successfully handles blurred, broken and merged glyph samples that occur in noisy images, or merged glyph samples that naturally occur in a font in which character images have been designed to be connected. Since the template construction process uses multiple glyph samples that occur in the text of the 2D input image and produces the templates substantially contemporaneously, extraneous or missing dark pixels that occur in one or two blurred, broken or merged samples resulting from noise in the image are less likely to affect the quality of the character templates trained when these low quality samples are processed with other non-noisy and higher quality samples. Moreover, since this novel template construction method does not require that an actual bounding box for each glyph sample be found, a potentially wider range of symbol sets, alphabets and character fonts that do not easily lend themselves to segmentation may be accommodated by the training technique of the present invention, which in turn permits a wide variety of images of existing text documents to be used as sources of glyph samples.

The template construction technique makes use of probability values that indicate the probability of foreground pixels occurring in the template in the foreground color (e.g., black) and background pixels occurring in the template in the background color (e.g., white). For templates in which the foreground and background probabilities are assumed to be uniform for all templates, the templates are more efficiently represented as binary templates. These, however, turn out to be a special case of a more general template representation in which the templates are represented as arrays of foreground probability values, where the probability varies either by individual template pixel position, or is uniform by template but varies between templates.

Two significant advantages that arise from using multiple probabilities for representing templates are that: (1) the templates constructed as arrays of foreground probabilities are more tolerant of errors in the training data, since the decision as to whether a pixel is a foreground or background pixel in the template based on the observations of the training data is not a binary one, but is rather spread across more possibilities; and (2) the templates constructed as arrays of foreground probabilities are particularly useful for matching glyph boundary pixels, in effect performing glyph boundary edge detection, where the greatest likelihood of noise will occur in glyph image rendering; pixels are most likely to be unreliably rendered or reproduced at the edges of the glyphs in an observed image, and recognition operations can make use of templates that are trained to reflect this lack of reliability with a statistical model.

An important advantage of the template construction technique of the present invention is its specific application to the construction of character templates defined by a template model, known as the sidebearing model of letterform shape description and positioning, in which character bounding boxes of adjacently positioned glyphs are permitted to overlap as long as the adjacent templates have substantially nonoverlapping foreground pixels. Clearly, conventional template construction techniques using training data samples isolated in bounding boxes would produce templates that would not, when used in imaging characters, produce adjacent glyphs whose bounding boxes overlapped. The template construction technique of the present invention is particularly suited for training character templates based on this type of character template model, since glyph samples need not be delineated by bounding boxes prior to training in order to train the templates.

A further advantage of the template construction technique of the present invention is that the training of character templates may be entirely automated using this technique when an operation is available that can identify and label glyph samples as required by the technique. For example, a suitable operation would be any existing recognition operation that identifies a glyph in an input source of glyph samples by a single pixel image position and labels the glyph sample with the character label of the character in the character set being trained that is represented by the glyph sample. The template construction technique, therefore, provides the opportunity to expand the usefulness of any suitable recognition system to include unsupervised training of character templates, without requiring the character image samples to be either manually or automatically segmented.

In accordance with another aspect of the present invention, therefore, there is also provided a method of operating a machine to perform the unsupervised training of a set of character templates. The machine includes a processor and a memory device for storing data. The data stored in the memory device includes instruction data the processor executes to operate the machine, and the processor is connected to the memory device for accessing the data stored in the memory. The method comprises operating the processor to receive and store in machine memory the image glyph source data structure previously described, wherein each glyph occurring in the image glyph source is an image instance of a respective one of a plurality of characters in the character set being trained. The processor then performs a recognition operation on the image glyph source; the recognition operation is of the type that produces the plurality of labeled glyph position data items that have been previously described, wherein each labeled glyph position data item indicates one of the plurality of image pixel positions in the image glyph source and a glyph label paired with the image pixel position. Each image pixel position associates an image glyph source location with a glyph occurring in the image glyph source. The processor then determines a sample image region in the image glyph source for each labeled glyph position data item. The sample image region includes the image pixel position associating the image glyph source location with a glyph and is identified as a training data sample for the character template indicated by the respectively paired glyph label. Each sample image region includes a plurality of sample pixel positions each indicating a glyph pixel value. The processor then produces the set of character templates using the sample image regions as previously described, by sequentially assigning, in a template assignment order, a template pixel value indicating a background or foreground color to a selected template pixel position in a selected template image region until the set of character templates is complete. The template assignment order is determined on the basis of template assignment selection criteria determined using the sample pixel values indicated by the sample pixel positions in the sample image regions.

In particular the template construction technique of the present invention may be combined with the recognition system disclosed in U.S. Pat. No. 5,321,773 to provide unsupervised training of character templates modeled after the sidebearing model. This unsupervised training method and system permits the use of an existing text document image as the source of glyph samples, without any special editing or advance preparation by a user with respect to glyph sample segmentation. The recognition system makes use of a formal image source model that models the spatial structure of a set of 2D text images having a common spatial structure as a regular grammar in the form of a finite state transition network. As originally described in U.S. Pat. No. 5,321,773, the recognition system decodes an original input text image of the type described by the formal image source model to produce a message string that corresponds to a transcription of the original image.

The novel unsupervised training system of the present invention is premised on the discovery that a series of glyph image origin positions is also available from the displacements associated with the transitions that comprise the best path through the network. These glyph image origin positions associate image locations with glyphs in the input image being decoded, and, along with paired character labels provided by existing bitmapped templates used during the decoding operation, make up the training data necessary to locate glyph samples in the original input image for use in training character templates according to the template construction technique described previously.

An advantage of the unsupervised training system of the present invention is the opportunity it provides to improve an existing set of character templates, or to produce a modified set of character templates, to be used for recognition (decoding), using glyphs as training data samples that occur in an existing text document and that are labeled by the recognition operation, without manual intervention in the preparation of the training data. As shown clearly in U.S. Pat. No. 5,321,773, the decoding process there successfully recognizes noisy images with a high degree of recognition accuracy. This supports an assumption that the corresponding identification of glyph samples and their labels will also be of a sufficiently high degree of accuracy to provide high quality training data to the template construction process. Moreover, the use of a formal model to model a set of input images expands the type and number of available text document images that may be used as sources of glyph samples for training.

In addition to the use by a recognition operation of the character templates produced from unsegmented training data according to the present invention, character templates produced in this manner may also be used for a variety of other character image or document processing operations.

The novel features that are considered characteristic of the present invention are particularly and specifically set forth in the appended claims. The invention itself, however, both as to its organization and method of operation, together with its advantages, will best be understood from the following description of an illustrated embodiment when read in connection with the accompanying drawings. In the Figures, the same numbers have been used to denote the same component parts and acts.

BRIEF DESCRIPTION OF THE DRAWINGS

FIG. 9 presents an image of a collection of sample image regions clipped from an exemplary input image for use in training a template according to the illustrated implementation of the present invention;

FIG. 13 illustrates a 2D image of a plurality of glyphs in a Gothic typeface for use as a source of glyph samples for training character templates in that typeface according to the present invention;

FIG. 16 is a pseudo code procedure for producing character templates for black-on-white printing, using a foreground parameter that varies by templates;

FIG. 17 is a pseudo code procedure for producing character templates for black-on-white printing, and for modeling a "space" character, using a foreground parameter that varies by template;

FIG. 18 is the pseudo code procedure of FIG. 17 modified for producing character templates using a candidate set of foreground parameters that vary by template pixel position;

FIG. 19 illustrates an exemplary multi-level character template constructed according to the the steps in the illustrated implementation of the template construction technique of FIG. 18;

Figure 1:
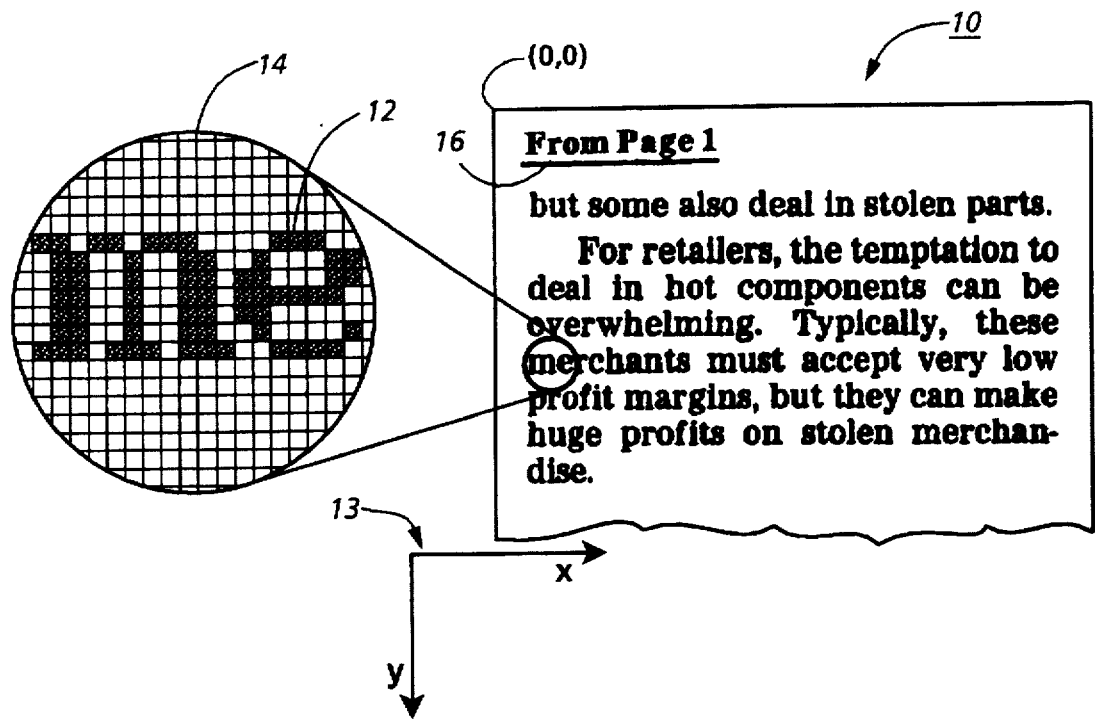
FIG. 1 illustrates a 2D image of a plurality of glyphs for use as a source of glyph samples for training character templates according to the present invention.

While the present invention will be hereinafter described in connection with an illustrated embodiment, it will be understood that it is not intended to limit the invention to that embodiment. On the contrary, it is intended to cover all alternatives, modifications and equivalents as may be included within the scope of the invention as defined by the appended claims.

The remainder of this description has the organization shown in Table 1:

TABLE 1

A. Conceptual Framework and Definitions.
1. Data, images and system components.
2. Character, character code, and input 2D image source of glyph samples.
3. Character templates.
B. An illustrated implementation of the Template Construction Technique.
1. Overview.
2. Creating template image regions for storing templates.
3. identifying sample image regions in the 2D input image.
4. The mathematical model of template construction.
5. Constructing templates contemporaneously from the sample image regions.
   a. Constructing black-on-white templates.
   b. Another example of producing black on white templates.
   c. Constructing white-on-black templates.
6. Template construction using foreground pixel probabilities that are not uniform across templates.
   a. Overview.
   b. Producing templates having foreground probabilities that vary by template.
   c. Modeling the "space" character as a binary template, as an example of foreground probabilities that vary by template.
   d. Producing templates comprising arrays of foreground probabilities.
7. Extending the template construction technique to gray-level and color character templates.
8. Determining character set widths for templates constructed according to the sidebearing model of character positioning.
   a. Review of the sidebearing template model.
   b. Determining the character set width from the glyph sample image regions.
C. Unsupervised Training of Character Templates Using the Character Template Construction Technique.
1. Overview
2. An illustrated implementation of unsupervised training.
   a. General features of the illustrated implementation.
   b. The 2D image source model represented as a stochastic finite state transition network.
      i. Formal image source models.
      ii. A Markov source as a formal image source model.
      iii. A finite state transition network for a single column of text.
   c. Decoding the 2D image source of glyph samples to produce labeled glyph sample image origin positions.
3. Unsupervised training using segmented input text line images.
   a. Definition and examples of a text line image source model.
      i. Definition of a formal line image source model.
      ii. An example of a line image finite state transition network.
      iii. Obtaining a line image source model from a 2D image source model.
   b. Unsupervised training using a line image source model and line image sources of glyph samples.
D. The Machine Configuration.

A. Conceptual Framework and Definitions.

The following terms and discussion provide the framework for describing the claimed invention as illustrated in the accompanying drawings. The terms defined below have the meanings indicated below throughout this specification and in the claims. In the event that these terms are defined in other sources, such as, for example, in documents that are incorporated by reference herein elsewhere in this description, the definitions below take precedence over definitions found elsewhere.

1. Data, images and system components.

Figure 2:
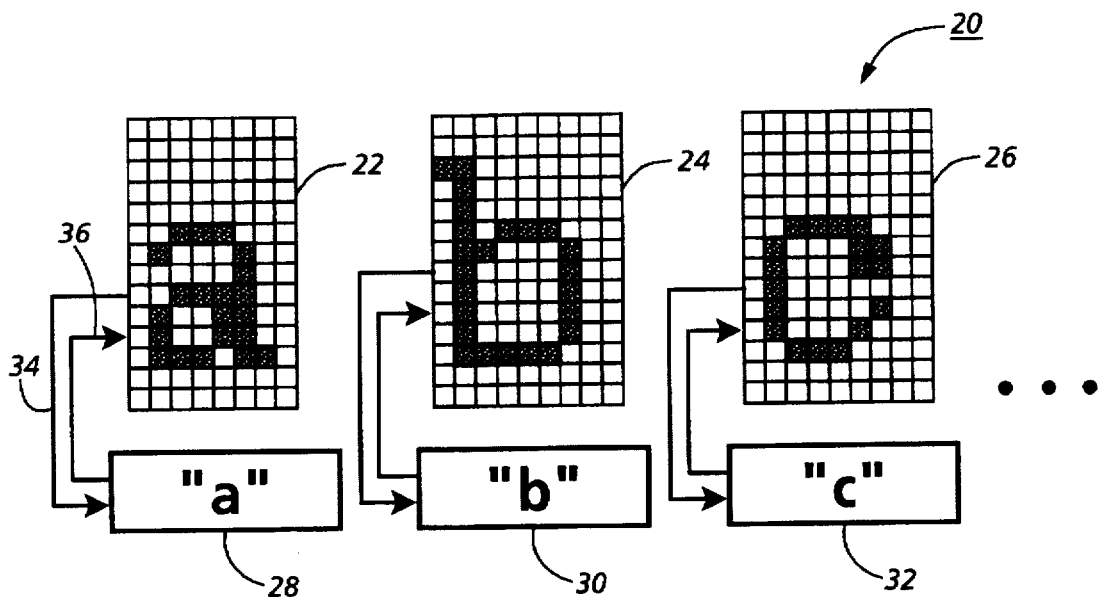
FIG. 2 illustrates an exemplary character template data structure produced by the present invention.

The term "data" or "data item" refers herein to physical signals that indicate or include information. Data items can be combined into a "data structure" such that the data structure "includes" the combined data items; thus, a "data structure" is any combination of interrelated data. A data structure may also include other data structures. An item of data "indicates" a thing, an event, or a characteristic when the item has a value that depends on the existence or occurrence of the thing, event, or characteristic or on a measure of the thing, event, or characteristic. For example, in FIG. 2, character label data item 28 in character template data structure 20 indicates the character code for the character "a." A first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. For example, directed arrow 36 in FIG. 2 shows that character label data item 28 in character template data structure 20 indicates character template 22, which depicts an image of the character "a." An item of data "identifies" or "is an identifier of" one of a set of identifiable items if the item of data is one of a set of items of data, each of which can be mapped to at most one of the identifiable items. For example, in FIG. 2, character label data item 28 may be said to identify character template 22.

A "processor-controlled machine" or "processor" is any machine, component or system that can process data, and may include one or more central processing units or other processing components. Any two components of a machine or system are "connected" when there is a combination of circuitry that can transfer data from one of the components to the other.

An "image" is a pattern of light. One or more items of data "define" an image when the data includes sufficient information for the processor to directly produce the image, such as by presenting the image on a display. Data defining an image may be referred to as "image definition data," or as an "image definition data structure." For example, a two-dimensional (2D) array can define all or any part of an image, with each item of data in the array providing a value indicating the color of a respective location of the image. In this type of image representation, each such image location is conventionally called a "picture element," or "pixel," and represents a small unique region of the image. In black and white binary images, the value in a pixel indicates black or white, where black is typically intended to represent a respective mark or active position in the image. An image in a processor-controlled system that is represented by a 2D array of binary data items defining pixels is referred to as a "binary image." For simplicity of exposition, the template construction process described below will be presented in terms of constructing binary character images, but, as is noted below, most of the concepts are easily generalized to other image representations.

2. Character, character code, and input 2D image source of glyph samples.

"Character" as used herein means a single, discrete, abstract element or symbol. For example, a character can include an abstract symbol that appears in a written or printed form of a language. Characters in a language can include not only alphabetic and numerical elements, but also punctuation marks, diacritical marks, mathematical and logical symbols used in mathematical notation such as equations, and other elements used in the written or printed form of the language. More generally, characters can include phonetic, ideographic, or pictographic elements in addition to alphanumeric elements. For example, symbols in pictographic languages and symbols representing musical notation are included in the term character. All of the characters related to a particular language or other symbol notation such as music comprise a "character set." A "word" is a set of one or more characters that is treated as a semantic unit in a language. A "text" or "string" is a sequence of characters; a "subsequence" or "substring" of characters is a set of one or more consecutive characters within a text or string; the characters of a text or string may form words and other subsequences within the text.

A "character code" is an item of data in a processor-controlled machine or system that defines, or represents, a character (the abstract symbol) to the processor. The encoding of a set of characters, such as those that belong to a language, involves defining a set of character codes that includes a respective character code for each character in the set. An example of a set of character codes is the set of ASCII codes for the symbols that make up the English language.

A "glyph" is a single instance, or example, of a character that is realized as an image, for example on a marking medium such as paper or on a display screen. For example, an image that is produced by a scanning operation performed on a paper document that includes text includes a plurality of glyphs, each of which is an image that represents a realized instance of a respective one of the characters in the text. Because a variety of factors may affect how an image of a character is produced when it is printed, scanned, copied or faxed, one glyph of a character in a text image may not be identical to another glyph of the same character in the text image.

The terminology "image definition data defining an input 2D image source of a plurality of glyphs" (hereafter also referred to as a "2D image source of glyph samples," "2D image data structure," or simply as the "2D image") refers to a data structure, suitable for storage in a memory device of a processor-controlled machine, that defines a 2D image in which a plurality of bitmapped representations of characters occur in the 2D space defined by the image. The organization of the 2D image data structure is such that individual pixel locations are accessible by the processor, but the pixels that comprise an individual glyph are not initially identified as a unit of data that is accessible to the processor, and no information is initially available to the processor as to whether a specific x,y coordinate position in the 2D image indicates one of the pixels included in a glyph. A 2D image, by definition, has a vertical size dimension larger than an image of a single horizontal row of glyphs, as, for example, represented by a single line of text in a document. A 2D image is conceptually analogous to a page of a document, and may frequently represent an image of an actual physical page, with glyphs being vertically, as well as horizontally, distributed in the 2D space; however, the input 2D image source of glyph samples is not intended to be limited in any manner to an entire page, or to a single page of a document. A 2D image as used herein is not limited to include only glyphs; other image objects such as graphical objects or shapes, pictures, halftone images, line drawings, photographs, other pictorial elements, or images that constitute noise may be included in the input 2D image source of glyphs. For convenience, collections of pixels representing image objects that are not glyphs will be referred to as "nonglyphs."

FIG. 1 illustrates 2D image data structure 10 that includes bitmapped representations of characters in the character set that comprises the English language, appearing in a particular font. In FIG. 1, each discrete representation of an English language character in 2D image 10 is a glyph; glyphs 12 and 14 have been enlarged to illustrate a schematic representation of the individual pixels that make up their respective images. For convenience, the character set represented by the glyphs in image data structure 10 is referred to as the "glyph sample character set." 2D image 10 in FIG. 1 illustrates a portion of the data structure representing a binary image that has been produced by scanning a newspaper article, and includes pixels comprising line segment 16, a nonglyph, included in the 2D image. In the illustrated embodiment of the template construction technique described below, images, including input 2D image source of glyphs 10 in FIG. 1, are assumed to be rectangular, and to have an image coordinate system 13 in which x increases to the right, y increases downward, and the upper left corner is at x=y=0.

The source device that produces the input 2D image source of glyphs is independent of and unrelated to the operation of the training technique. The input 2D image source may be produced by a scanning, digital faxing or digital copying operation applied to an existing physical document; the input 2D image source may also be a synthetic binary image created by a user using any suitable processor-controlled machine.

3. Character templates.

A "character template," or "template," is a data structure that indicates an image of a character in which each pixel takes on a value that is either a "foreground" value or a "background" value. There is only one background value for all templates. In the simplest case, there is only one foreground value for all templates as well. More generally there may be many possible foreground values. The value of a pixel in a template can generally be regarded as a code for a probability distribution over the possible values of image pixels. For binary images, for example, the background value of a template may be a code 0 (zero) representing a probability distribution $(\alpha_0, 1-\alpha_0)$, where $\alpha_0$ is the probability that a corresponding image pixel is white and $1-\alpha_0$ is the probability that it is black. Similarly, a foreground value of a template pixel may be a code 1 representing a probability distribution $(1-\alpha_1, \alpha_1)$, where $\alpha_1$ is the probability that a corresponding image pixel is black and $1-\alpha_1$ is the probability that it is white. In this case, a template pixel value of zero (0) usually means that the corresponding image pixel is white with high probability, and template pixel value of 1 usually means that the corresponding image pixel is black with high probability, but this may not always be the case, as will be described below with respect to so-called "reverse video" character templates. In general, there may be many possible foreground values (i.e., different probabilities that image pixels are black.) For simplicity in the discussion that follows, character templates will be described as binary templates so that each probability distribution that a pixel value may take on can be parameterized by a single real number, e.g., $\alpha_0$. Initially, the discussion will also focus on the case of one background value and one foreground value. In this case, the template pixels values may be identified as white and black. Later, the discussion will include the possibilities of more than one foreground value, i.e., more than one probability of an image being black.

The "support" of a character template is the set of pixel locations containing the template's foreground pixels or foreground.

A "character label" is a data item that indicates information uniquely identifying one of the characters in a character set with the respective character template indicating the binary image of the character. A character label may indicate a character code, such as an ASCII code, to identify the template, or may indicate some other information that uniquely identifies the template as the one indicating the binary image of a particular one of the characters in a character set, such as font identifying information, size, or type style information. For example, when a data structure includes a set of character templates for characters in each of two different fonts, and so includes two templates representing the character "a," one in each of the different fonts, the respective character label identifying each template includes font identifying information that uniquely distinguishes one of the templates representing the character "a" from the other. In addition to character template identifying information, a character label may also include information, such as font identifying information, character image positioning information, size, and type style information, about the character template that is not required to identify it. A "set of labeled character templates" or a "set of character templates" is a data structure that includes at least one character template and the respective character label that uniquely identifies the character template.

FIG. 2 illustrates an exemplary set 20 of labeled character templates representing characters in the English language character set and in a particular font. Exemplary data structure 20 represents character templates as explicit 2D arrays of ON/OFF pixel values, each representing a complete character. Character template data structures 22, 24 and 26 each indicate character label data items 28, 30 and 32, respectively, as shown via exemplary directed arrow 34 from character template 22 to character label 28. Identifying information in each of character label data items 28, 30 and 32 is shown as a character in quotation marks; this representation is used herein to indicate a respective character code stored in a data memory of a processor-controlled machine, as distinguished from pixels that represent an image of the character. Character label data items 28, 30 and 32 each respectively indicate character template data structures 22, 24 and 26, respectively, as shown via exemplary directed arrow 36 from character label 28 to character template 22.

The illustration of character templates in FIG. 2 is not intended to limit in any way the organization of the data structure that represents a character template as defined herein. For example, a character template may be constructed from the concatenation of pieces of bitmapped characters, such as vertical strokes, joins, ascenders, descenders, and curved portions. A template may also be represented by a formal model, such as a finite state transition network, that produces a data structure indicating an image of a character as one of its outputs.

B. An illustrated implementation of the template construction technique.

An embodiment of the present invention has been implemented as a software program on a SUN SparcStation 10 computer running the SUN Solaris-1 operating system, available from Sun Microsystems, Inc., of Mountain View, Calif. The system was configured with 64 MB RAM memory and a disk swap space of 600 MB. The software program is written in a standard version of the Common Lisp programming language, using a compiler obtained from Lucid, Inc. of Menlo Park, Calif. (now available from Harlequin, Inc. of Cambridge, Mass.) Portions of the software were written in the C programming language, compiled using the GCC compiler available from the Free Software Foundation, Inc., of Cambridge Mass. The compiled C programs were accessed from Lisp via the Lucid Common Lucid Common Lisp foreign function interface.

Figure 3:
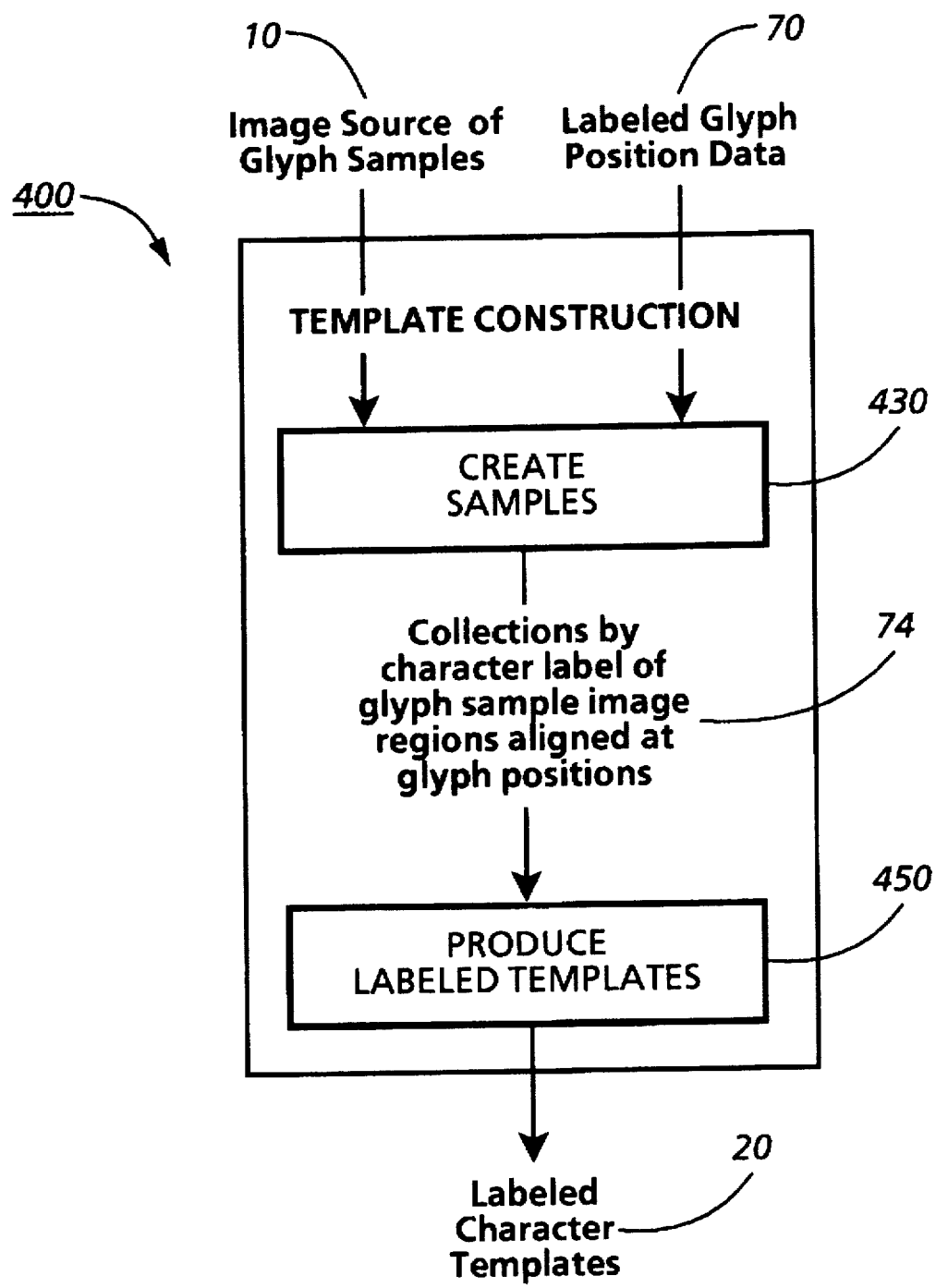
FIG. 3 is a simplified block diagram illustrating the input and output data structures and processes of the template construction technique of the present invention.
Figure 4:
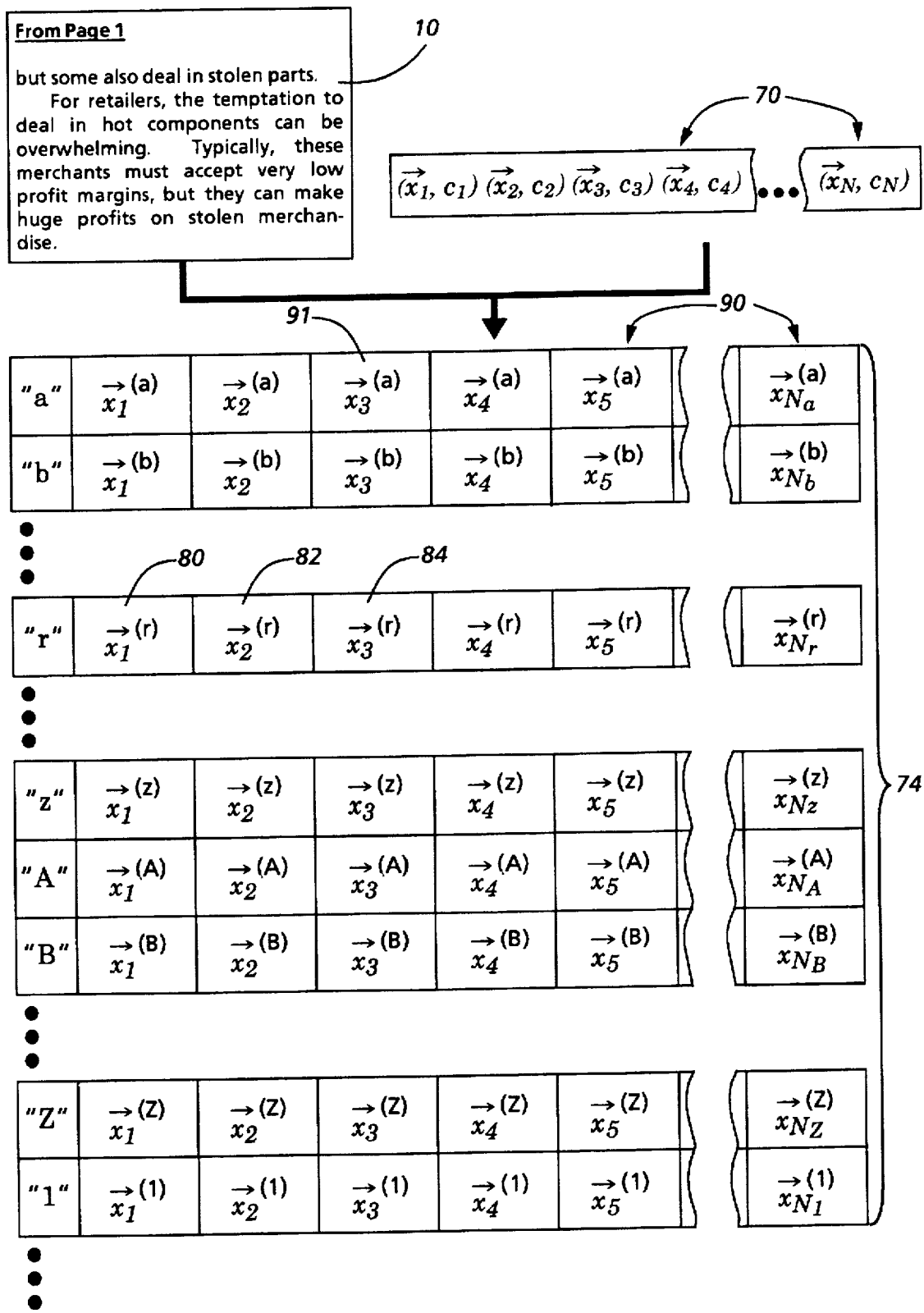
FIG. 4 schematically illustrates the organization of the data structure that is the immediate input to the template construction process shown as box 450 in FIG. 3.
Figure 5:
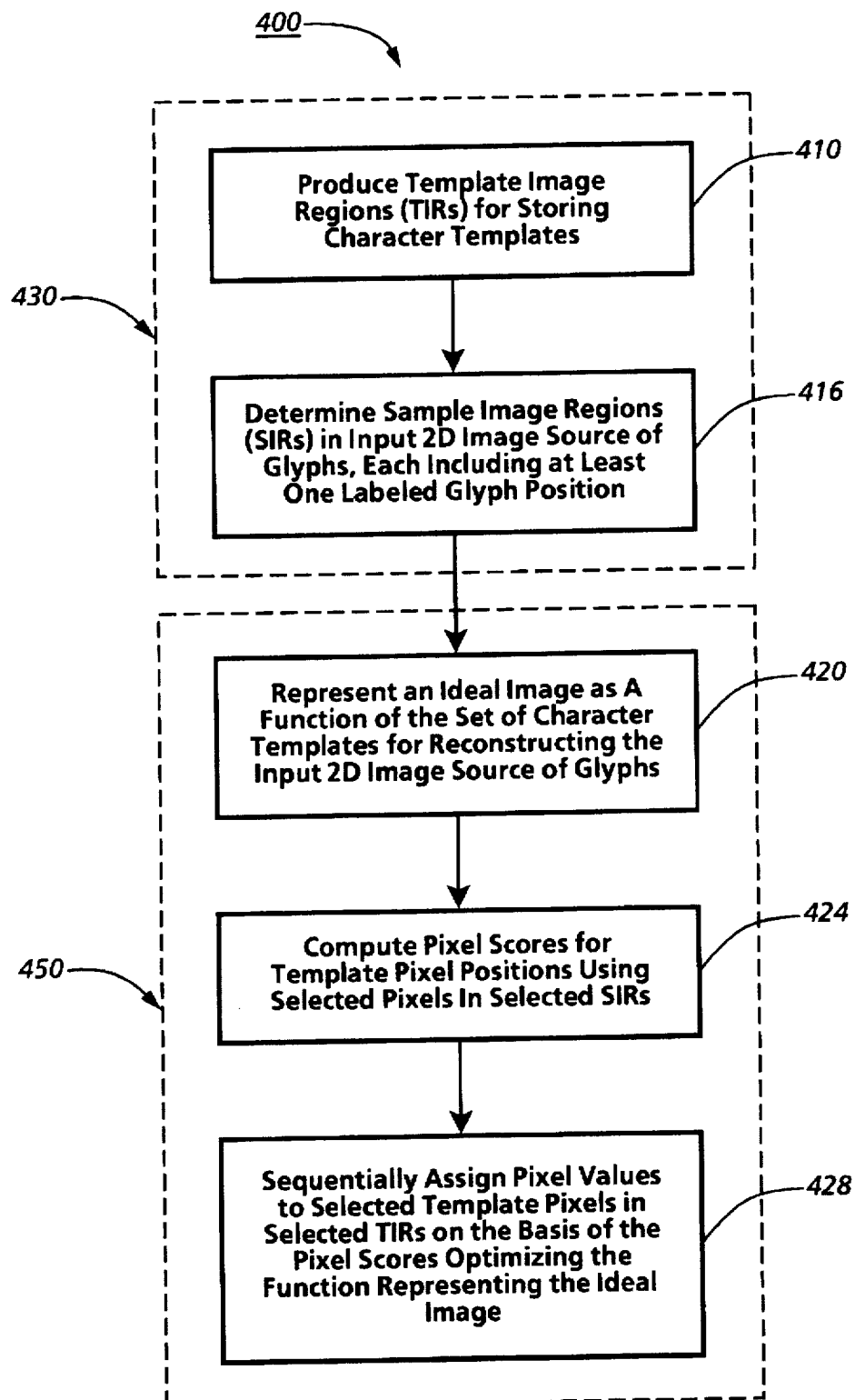
FIG. 5 is a flowchart showing the general steps of the template construction technique of the present invention.
Figure 6:
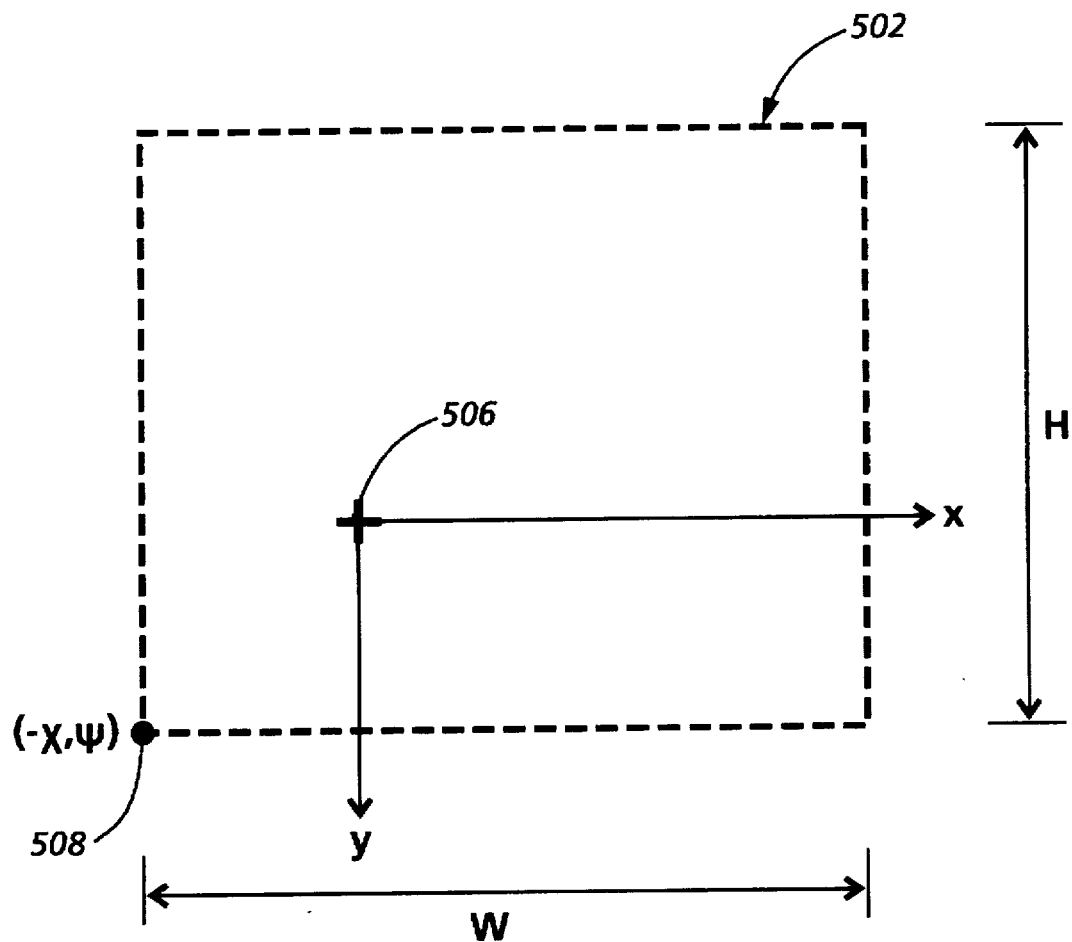
FIG. 6 illustrates the concept of a template image region used for storing a trained template during the template construction technique illustrated in FIG. 5.
Figure 7:
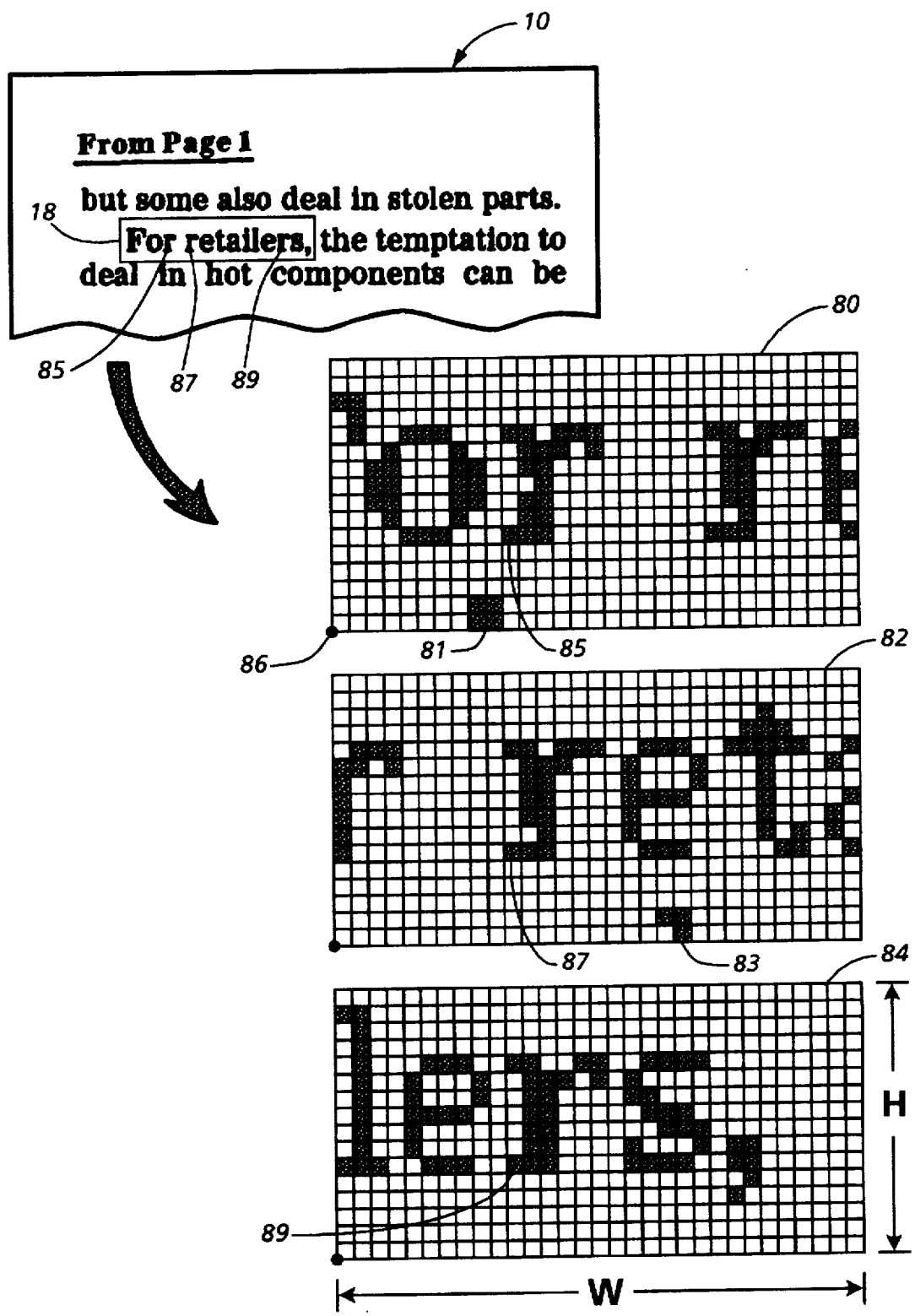
FIG. 7 illustrates the sample image regions that are identified in the image source of glyph samples from which the templates are trained according to the template construction technique illustrated in FIG. 5.
Figure 8:
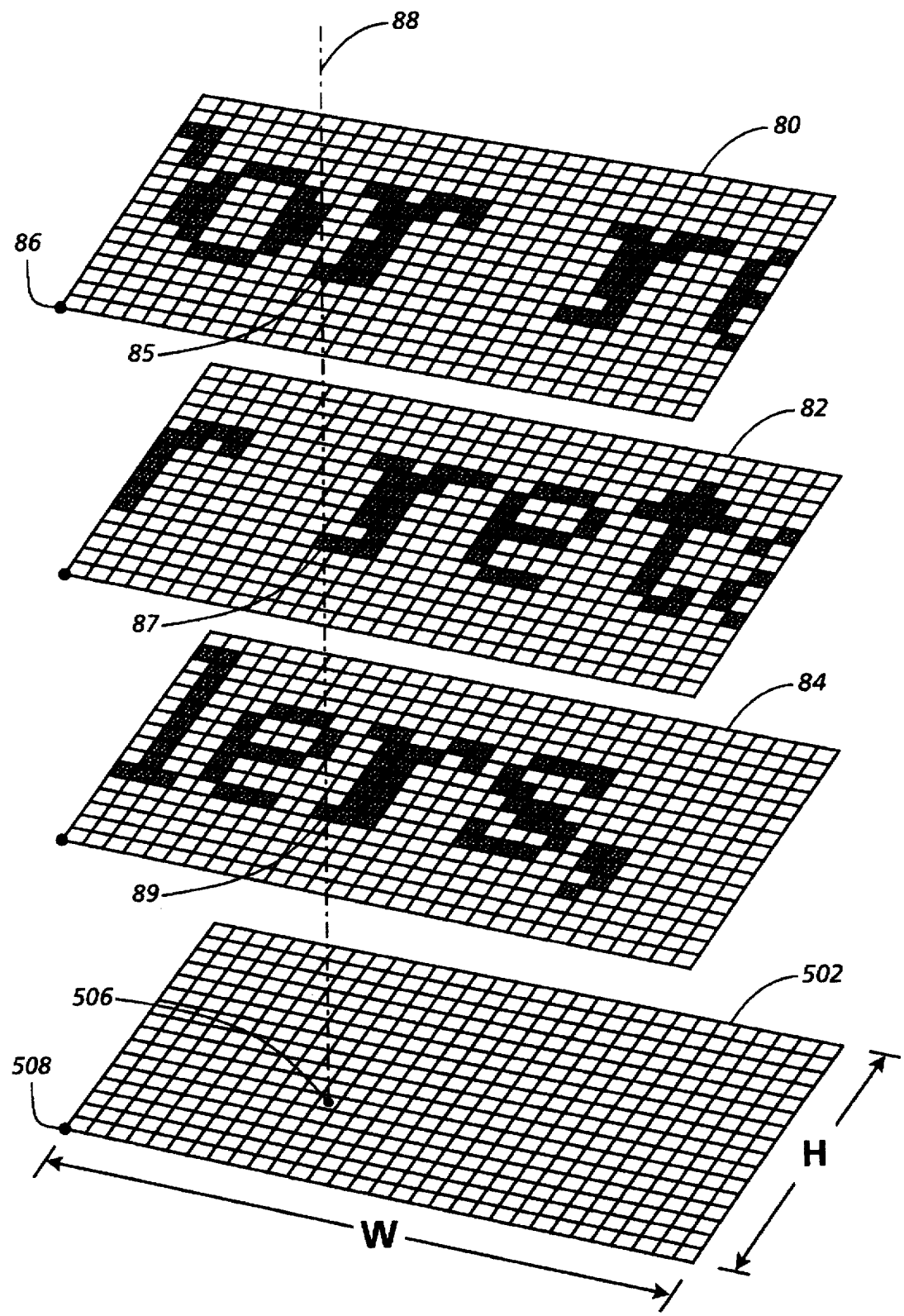
FIG. 8 is a schematic image of three sample image regions identified in the image of FIG. 1, layered above the template image region of FIG. 6, illustrating the concept of sample image regions aligned at image origin positions of the glyph samples, according to the illustrated implementation of the present invention.
Figure 9:
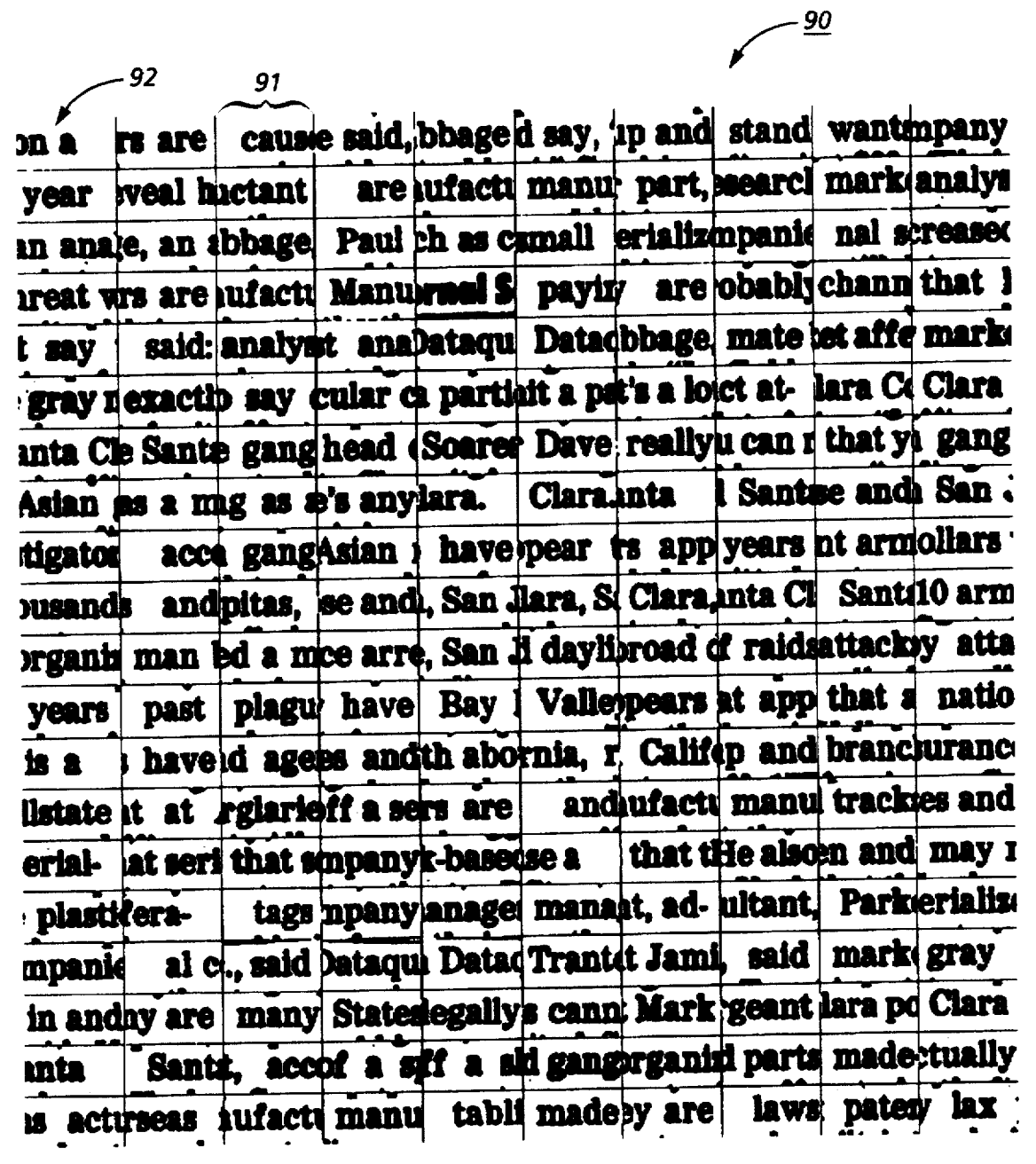
Figures 10, 12:
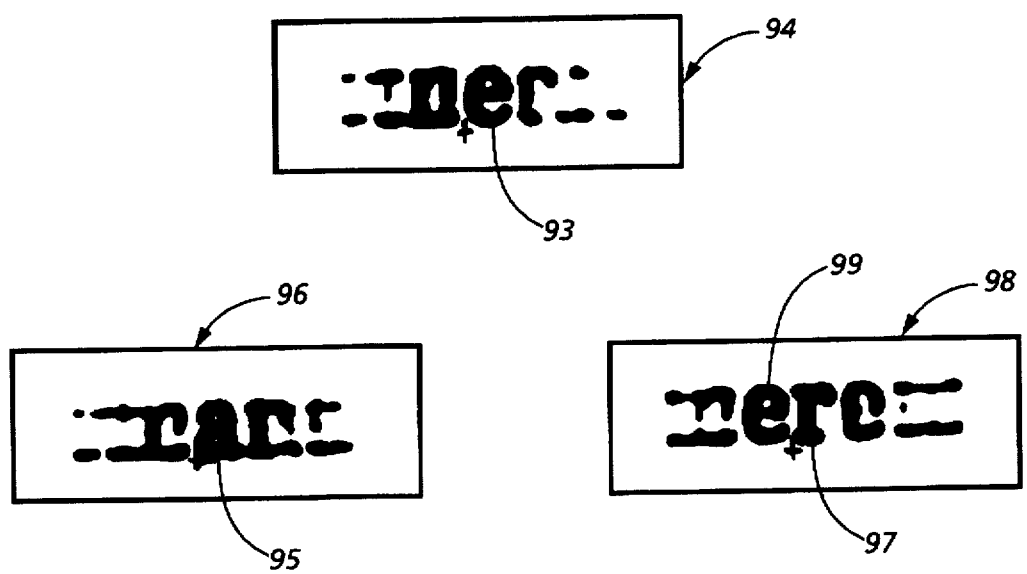
FIG. 10 shows three exemplary but unsatisfactory templates produced using a technique that does not observe an important mathematical constraint imposed on character templates.
FIG. 12 shows a final set of trained templates produced according to the novel template construction technique illustrated in FIG. 11.

Binary character template construction process 400 produces a set of trained, labeled character templates without prior segmentation of the training data into isolated, individual glyph samples and without identifying minimal bounding boxes for the samples. Template construction technique 400 identifies each glyph sample in the training data using only the x,y coordinate position in image source of glyphs 10 indicating a glyph origin position and the label identifying the character represented by the glyph sample located at the respective origin position. FIGS. 3 through 12 illustrate the basic template construction technique of the present invention. FIG. 3 is a high-level block diagram showing the data flow and general functions of template construction. FIG. 4 schematically illustrates an intermediate data structure of sample image regions used in template construction. FIG. 5 illustrates the general steps of the template construction technique. FIG. 6 illustrates the concept of a template image region used for storing a trained template, while FIG. 7 illustrates representative sample image regions that are identified in the image source of glyph samples from which the templates are trained. FIG. 8 illustrates the concept of aligning the sample image regions at respective glyph image origin positions, and shows the pixel relationships between aligned sample image regions and a template image region. FIG. 9 shows a collection of sample image regions clipped from an input image for use in training a template. FIG. 10 shows three exemplary but unsatisfactory templates produced using a technique that does not observe an important mathematical constraint imposed on character templates, while FIG. 12 shows a final set of trained templates produced according to the illustrated implementation of template construction technique shown in FIG. 11 that substantially observes the template constraint. In the mathematical notation used in this description, the symbol x in bold type will be used to denote a vector x, and an equation defined in the discussion will be subsequently referenced by its equation number in parentheses.

1. Overview.

With reference to FIG. 3, the character template construction technique 400 of the present invention is provided with inputs of an image source of glyph samples 10, and a data structure 70 of labeled glyph position data. A pair (x, c) consisting of a glyph image origin position x and a character label c will be called a "labeled glyph position;" image position x of each labeled glyph position indicates a pixel position in image source of glyph samples 10 that associates an image location with a glyph sample to be used in training a template; character label c identifies the character in the glyph sample character set for which the glyph is a sample. Character template construction technique 400 uses these input sources of data to produce character template data structure 20 which includes a set of character templates and their respective character label data items for the glyph sample character set. Template construction may be viewed as involving two major processes. Since the glyph samples are not isolated from image source of glyph samples 10 prior to training, the glyph samples must first be identified, in box 430 in the manner required by process 450 which actually produces the trained binary character templates using the identified samples. Process 450 uses as input a collection of glyph sample image regions 74 for each respective one of the character templates to be produced. The glyph sample image regions 74 included in each collection are segments of image source of glyph samples 10, each including image position x of a respective one of the collection of labeled glyph positions identified for a respective character; each glyph sample image region included in a collection has a local coordinate system defined relative to image position x such that image position x is at the same displacement from the local origin in each glyph sample image region.

FIG. 4 schematically illustrates data structure 74 which includes the collections of glyph sample image regions for the glyph sample character set used in image source of glyph samples 10. Collection 90 of glyph sample image regions, for example, illustrates the glyph samples for the lower case character "a". Glyph sample image region 91 is an individual image region denoted schematically by a rectangular box containing the vector $x_i$. FIG. 9 illustrates collection 90 for the complete newspaper article represented by the portion shown in image 10. Process 430 creates data structure 74 using labeled glyph position pairs 70 (x, c) and image 10. Data structure 74 may be implemented in a number of ways. For example, glyph sample image region 91 may be the actual contents of the segment of image 10 that includes image 10 pixel position $x_i$, or it may be a pointer to the origin of the local coordinate system of glyph sample image region 91 in a copy of image 10. Template construction process 450 produces labeled character templates using data structure 74 without regard to how pixel position $x_i$, identifies the glyph samples in image 10, as long as all glyph sample image regions for each glyph sample collection have been identically created, as described in detail below. As noted earlier, for purposes of this discussion, pixel position $x_i$ in labeled glyph position pair ($x_i$, c) will associate an image pixel location with the origin position of a glyph sample. Glyph origin positions have particular relevance in the training of character templates modeled after the sidebearing model of letterform shape description and positioning, which is described in more detail in the discussion below accompanying FIG. 21. Processes 430 and 450 are now described in more detail with reference to a specific implementation.

Figure 11:
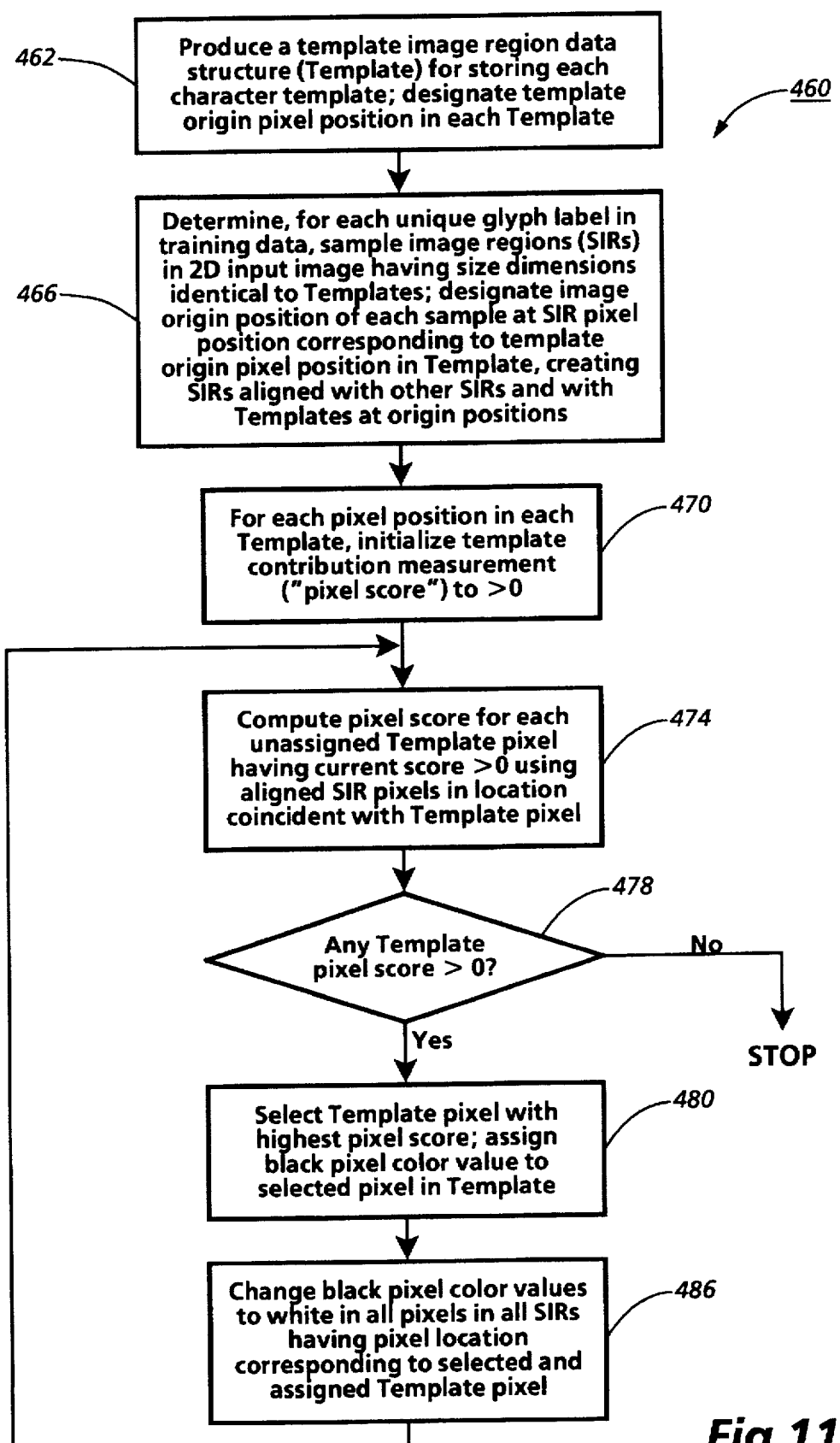
FIG. 11 is a flow chart showing the steps of the illustrated implementation of constructing character templates using template image regions of FIG. 6 and aligned sample image regions of FIG. 8 and FIG. 9.

FIG. 5 illustrates the general steps of template construction, while FIG. 11 illustrates the specific steps of the illustrated embodiment. In the invention's most general form, template image regions are created for storing the character templates, in box 410. Then, sample image regions in image 10 are determined using the labeled glyph position pairs 70. The process 450 of producing the templates is shown in boxes 420, 424, and 428. Process 450 mathematically models the template construction problem as an optimization problem. An ideal image is represented, in box 420, as a function of the set of character templates being constructed. The ideal image is a reconstruction of image 10 formed by positioning respective ones of the character templates in an image plane at image pixel positions identified as image glyph source locations of glyphs occurring in the image glyph source, toward the goal of matching image 10. A character template is identified for positioning in the ideal image by the glyph label paired with the image glyph source location. Pixel scores are then computed, in box 424, for template pixel positions in template image regions using selected ones of the sample pixel positions in selected ones of the sample image regions included in image 10. The pixel scores are used, in box 428, to select and sequentially assign a pixel value to selected template pixel positions in selected template image region. The selected template pixel positions are selected on the basis of the pixel scores optimizing the function representing the ideal image such that the pixel value assigned to each selected template pixel position optimizes a matching score measuring the match between image 10 and the ideal image when all template pixel positions have been assigned pixel values. The mathematical model of the template construction problem is presented in detail in section B.4 below. As will become clear from the discussion of the mathematical model below, representing an ideal image as a function of the set of character templates is a mathematically principled way of presenting the template construction problem. In particular implementations of the template construction technique of the present invention, an actual ideal image may or may not be constructed in the memory device of the machine being operated by the invention. If a particular implementation does not actually construct an ideal image, it is typically because of processing efficiency considerations or a design choice in the algorithms that implement the mathematical model, and this is not a departure from the mathematical model or from the general scope of the present invention.

2. Creating template image regions for storing templates.

The illustrated implementation of template construction is referred to as process 460, and the steps of process 460 are shown in FIG. 11. The first step in template construction process 460 is to create a template image region, in box 462, for storing each character template to be produced from the training data. Each pixel position in each template image region initially indicates a white pixel color value. In principle, the template image region for each character extends over an entire image plane that is unbounded in all directions. However, the support of a template is typically localized to a relatively small region surrounding the template's origin pixel location so that the template image region is selected to be some bounded image region smaller than the entire image plane, but large enough to contain the entire support of a template. FIG. 6 illustrates exemplary template image region 502 which assumes that the support of each template lies within a rectangle of height H and width W. Template image region 502 will also be referred to as the "canvas" of the template. The shape of the template canvas is fundamentally arbitrary, and is typically selected on the basis of assumptions about the character set for which templates are being trained, and about the samples in the training data. For example, the use of a rectangle having a width greater than its height as the shape for the canvas in this illustrated implementation is based on the fact that images of characters in the English language character set are placed along horizontal text lines that are divided by horizontal areas of white space. In addition, the canvas shape may also be selected or modified for purposes of optimizing the performance of the template construction procedure.

The selection of the vertical and horizontal size dimensions of the canvas, i.e. the height H and width W canvas parameters, is made on the basis of two factors that make use of information about the characters in the character set being trained. First, H and W canvas parameters are selected so that the resulting image region created is large enough to entirely contain the support of a single template; in effect, selection of the H and W canvas parameters reflects the decision that pixels outside the canvas are assumed not to be part of the template and are assumed to be the background (white) color. Secondly, the canvas is used to establish the glyph sample image regions in which glyph samples are assumed to be contained; therefore, selection of the H and W canvas parameters is also made so that the resulting image region created in input image 10 is large enough to entirely contain at least a single glyph sample. Moreover, the canvas should be large enough to completely contain at least a single glyph even when the image positions, x, (e.g., glyph origins) have been inaccurately determined.

The image region created by the canvas is distinguishable from a bounding box; the canvas image area is only very roughly defined and is not a minimal image region in the same sense that a bounding box is a minimal boundary defining the pixels that comprise a glyph in the image. Selection of the canvas shape and size is not made with the same intent with which bounding boxes for glyph samples are found in conventional segmentation processes; the goal of such segmentation is typically to find precise and minimal image dimensions for use in assigning pixels to one glyph sample as opposed to another, while the goal of the canvas rectangle is to find an image region for which it can be said that all pixels outside the canvas rectangle are not included in the template or glyph sample, a concept clearly distinguishable from a bounding box. In addition, template construction procedure 400 may provide for the user of the procedure to enter the H and W canvas parameters as a requested input information. In the illustrated embodiment, the template construction procedure has been implemented using a template canvas selected to be from three to five times the size of the largest template bounding box for the characters in the character set being trained.

With continued reference to FIG. 6, template canvas 502 has a local coordinate system associated with it in which x increases to the right, y increases downward, and the origin of the coordinate system is at $(\chi, -\psi)$ relative to the lower left corner 508 of the canvas; thus, lower left corner 508 has coordinates at $(-\chi, \psi)$ relative to the local coordinate system, where $0 \leq \chi < W$ and $0 \leq \psi < H$. The canvas rectangle 502 is denoted by C, so that $$C = [-\chi, -\chi + W - 1] \times [\psi - H + 1, \psi] \tag{1}$$

Canvas parameters H, W, $\chi$ and $\psi$ need not be uniform for all templates, and may vary by the particular character template being stored; it is usually more convenient to use the same canvas parameters for each template being trained. The template image regions in the illustrated embodiment have uniform canvas parameters.

Each character template includes a pixel position designated as the template's origin that is assumed to lie within canvas 502. The template origin pixel position is illustrated in FIG. 6 as template origin 506. Designation of template origin 506 within canvas rectangle 502 is arbitrary, subject to the constraint that the template to be stored in canvas rectangle 502 must be entirely contained within canvas rectangle 502 when its origin is placed at selected template origin 506. In the illustrated embodiment, satisfactory results have been achieved when template origin 506 is designated to be a pixel position to the left of and below a center pixel position in canvas rectangle 502.

3. Identifying sample image regions in the 2D input image.

With reference again to FIG. 11, the next step in the template construction procedure of the present invention, in box 466, is to determine a sample image region in the image source of glyphs 10 for each labeled glyph image origin position included in the training data, thereby producing data structure 74 (FIG. 4.) In theory, the sample image region could be defined to be the entire image 10. However, in practice, it is more efficient to work with a smaller, bounded image region within image 10. Template image region 502 is used as a pattern, or guide, in determining two important characteristics of each of these sample image regions: first, the sample image region in image 10 for each labeled glyph image origin position in the training data has vertical and horizontal size dimensions substantially identical to the vertical and horizontal size dimensions (the H and W canvas parameters) of canvas rectangle 502; secondly, the glyph image origin position of the glyph sample is located in the sample image region at a pixel position that is coincident with, or respectively paired with, the pixel position in canvas rectangle 502 designated as template origin position 506. Identifying the sample image region for a labeled glyph image origin position can be summarized as follows: if vector $x_i = (x_i, y_i)$ is a glyph origin position within an image of text, the corresponding glyph sample image region is defined to be that portion of the text image within the region defined by $x_i - \chi \leq x < x_i - \chi + W$ and $y_i + \psi - H < y \leq y_i + \psi$. That is, the glyph sample image for a glyph position is that portion of the text image within the template canvas, when the template origin is coincident with the glyph origin.

FIG. 7 illustrates three sample image regions 80, 82 and 84 identified for glyph image origin positions 85, 87 and 89 in image region 18 of image 10, each having a glyph label indicating the character "r." Each sample image region has the same height, H, and width, W, of canvas rectangle 502, shown by the H and W designations at the periphery of sample image region 84. Each sample image region has a local coordinate system having its origin aligned at the glyph image origin position, as illustrated in FIG. 7 by origin 85 of representative sample image region 80. Glyph image origin positions 85, 87 and 89 are located at pixel positions in sample image regions 80, 82 and 84 that have x and y displacements from the respective lower left corners of the sample image regions identical to the x and y displacements of template origin 506 from lower left corner 508 of template canvas rectangle 502. It can be seen that the H and W canvas parameters of canvas rectangle 502 have been selected to be large enough to entirely contain the simplified glyph samples for the character "r," and in fact are large enough to contain all or portions of adjacent glyph samples. Sample image regions 80 and 82 also contain portions 81 and 83 of glyph samples occurring in an adjacent line of text in image 10. It can also be seen that sample image regions 80, 82 and 84 are probably large enough to entirely contain the glyph samples for the character "r" even if glyph image origin positions had been inaccurately determined by several pixel positions in either the vertical or horizontal direction.

Identifying glyph samples in image 10 in this manner effectively accomplishes a partial segmentation and isolation of the glyph samples without performing a conventional segmentation process on image 10. This type of partial segmentation reduces the processing needed to produce templates from samples that are the size of the entire 2D image, but because a sample image region is typically much larger than a bounding box that would contain the actual sample, this technique of partially segmenting the glyph samples is unlikely to introduce segmentation errors of the type introduced in conventional segmentation when pixels are assigned to one glyph sample as opposed to another. No such pixel assignments have been made at this point in the template construction procedure; identification of the sample image regions merely reflects the partial segmentation decision that all pixels outside each sample image region are not included in the glyph sample contained within the sample image region.

The term "aligned sample image regions" is introduced to denote the characteristic of each sample image region that the image origin position of the glyph sample is located at a pixel position in the sample image region that has x and y displacements from the lower left corner of the sample image region identical to the x and y displacements of the template image origin 506 from the lower left corner 508 of template canvas rectangle 502. The concept of aligned sample image regions is illustrated in FIG. 8 which shows sample image regions 80, 82 and 84 of image 10 from FIG. 7 stacked in layers, one on top of another, above canvas rectangle 502. Respective image origin positions 85, 87 and 89 of sample image regions 80, 82 and 84 are "vertically" aligned with each other, and with template origin position 506, along dotted line axis 88. Alignment of same-sized sample image regions at respective image origin positions in this manner establishes a spatial relationship, or pairing, among each respective pixel location in each of the sample image regions relative to the local coordinate system of the sample image region, and establishes the same spatial relationship, or pairing, between the set of paired pixel locations in the collection of sample image regions and a pixel position in canvas rectangle 502 relative to the template coordinate system. Each set of pixels in aligned sample image regions related in this manner will be referred to as "aligned pixels," or "respectively paired pixels."

All of the sample image regions identified in image 10 for a particular one of the characters in the character set for which templates are being trained are referred to as a "collection" of sample image regions. FIG. 9 illustrates data structure 90 from FIG. 4 that is the collection of sample image regions for the character "a" in the entire scanned newspaper article that is the image represented by image 10. Data structure 90 is presented in FIG. 9 in rows and columns of concatenated, aligned sample image regions clipped from image 10 according to the pattern provided by canvas rectangle 502; the sample image regions are shown with borders for purposes of illustration. Looking down column 92 of sample image regions, it can be seen that glyph samples of the character "a" are located at approximately the same position in each sample, which is coincident with the template origin position of the template canvas (not shown) for character "a." As FIG. 9 illustrates, a sample image region typically contains glyphs and/or parts of glyphs in addition to the glyph sample located at the template origin.

4. The mathematical model of template construction.

Before continuing with the discussion of the illustrated embodiment of template construction process 460 as shown in FIG. 11, the mathematical model of the template construction problem will be discussed. As noted earlier, conventional character template construction techniques are concerned with assigning a color to each pixel of a template, given a set of isolated glyph samples for the character associated with that template, and require that the assignment of input image pixels to appropriate glyph samples be completed prior to template construction, as part of a character segmentation operation that creates isolated glyph samples. By contrast, template construction process 450 (FIG. 5) constructs a set of character templates substantially contemporaneously by assigning a color to each pixel in a set of character templates, given a collection of glyph sample images for each of those characters, each of which is permitted to contain whole or parts of adjacent glyphs, as illustrated in FIG. 9. The terms "substantially contemporaneously" mean that the construction of no one character template is effectively completed before any of the others, as will become clear from the description of process 450 which follows.

Template construction according to the present invention has its theoretical foundation in a communication theory approach to document image generation and recognition called "document image decoding." This theoretical foundation is explained in the article by Kopec and Chou, "Document Image Decoding," referenced earlier in the background discussion, and aspects of this approach that are relevant to template construction are briefly summarized here for convenience. In document image decoding, a document recognition problem is viewed as consisting of three elements: an image generator, a noisy channel and an image decoder. A document image generator is a Markov source (stochastic finite state automaton) that combines a message source with an imager. The message source produces a string of symbols, or text, that contains the information to be transmitted. The imager is modeled as a finite state transducer that converts the one-dimensional message string into an ideal two-dimensional bitmap image, called a composite ideal image and denoted $Q_{90}$, by positioning character templates, each of which is denoted below as $Q_c$, in an image plane. The channel transforms the ideal image $Q_\pi$ into a noisy observed image, denoted as Z. A simple asymmetric bit flip noise model that assumes that each pixel of ideal image $Q_\pi$ is independently perturbed is used as the channel model. The decoder estimates the message, given observed image Z, by finding the a posteriori most probable path through the combined source and channel models using a Viterbi-like dynamic programming algorithm. The mathematical foundation for template construction process 450 that is described below is derived from the theoretical foundation of document image decoding. Recall that C denotes a template canvas defined according to equation (1).

The template construction problem addressed here is to determine a template $Q_c$, for each character c in the set of glyph sample characters (font) F, given a set of labeled glyph image origin positions, $\pi=(x_i, c_i)i=1, \ldots, P$, in some observed image Z. Let $q_c(x)$ denote the color of the pixel at position x of template $Q_c$ where c∈F is a character in the glyph sample character set. A foreground pixel color is represented by a bit value of one (1), and a background pixel color by a bit value of zero. The objective of template construction is to assign a value to $q_c(x)$ for each character c∈F and for each x∈C, given a set of labeled glyph positions $(x_i, c_i)i=1, \ldots, P$. For each character c, let $N_c$ denote the number of glyph positions that are labeled with character c (i.e., the number of samples in each collection of samples), and let the corresponding image positions associated with these samples in observed image Z be denoted as $x_1(c) \ldots x_{N_c}(c)$. Thus, $$P = \sum_{c \in F} N_c \qquad (2)$$

In the framework of image generation according to document image decoding, a set of labeled glyph positions π in an observed image Z defines a composite ideal image $Q_\pi$ by $$Q_\pi = \bigcup_{i=1}^{P} Q_{c_i}[x_i] \qquad (3)$$

where Q[x] denotes Q shifted so that the origin of its local coordinate system is located at x, and the union of two template images is an image that has foreground pixels where either of the two template images has a foreground pixel.

Template construction according to the present invention is based on a maximum likelihood (ML) criterion. As discussed in Kopec and Chou, "Document Image Decoding," the asymmetric bit flip channel model (shown in FIG. 5 therein) assumes that each pixel of ideal image $Q_\pi$ is independently perturbed. The probability of a 1 (black) pixel in the ideal image $Q_\pi$ surviving as 1 in the observed image Z is $\alpha_1$. Similarly, the probability of a 0 being observed as a 0 is $\alpha_0$. These noise parameters are assumed to be constant over the observed image. With these assumptions, the log normalized likelihood of Z, given $Q_\pi$, may be written $$L(Z|Q_x) = \sum_{i|q_i=1} \left[ z_i \log \frac{\alpha_1}{1-\alpha_0} + (1-z_i)\log \frac{1-\alpha_1}{\alpha_0} \right] \quad (4)$$

$$= \sum_{i|q_i=1} \left[ \log \frac{1-\alpha_1}{\alpha_0} + z_i \log \frac{\alpha_0 \alpha_1}{(1-\alpha_0)(1-\alpha_1)} \right] \quad (5)$$

$$= \left[ (\# \text{ of 1's in } Q_x) \cdot \log \frac{1-\alpha_1}{\alpha_0} \right] +$$

$$\left[ (\# \text{ of 1's in } Q_x \wedge Z) \cdot \log \frac{\alpha_0 \alpha_1}{(1-\alpha_0)(1-\alpha_1)} \right] \quad (6)$$

$$= \gamma \|Q_\pi \wedge Z\| + \beta \|Q_\pi\| \quad (7)$$

where the symbol $\|\chi\|$ denotes the number of 1's in $\chi$ and $$\gamma \equiv \log \frac{\alpha_0 \alpha_1}{(1-\alpha_0)(1-\alpha_1)} \quad (8)$$

$$\beta \equiv \log \frac{1-\alpha_1}{\alpha_0} \quad (9)$$

Note that the first term on the right hand side of (7) can be simply computed by counting the nonzero bits in the logical and of images $Q_\pi$ and $Z$, while the second term is a template-dependent bias that is independent of $Z$. Note that $\gamma > 0$ and $\beta < 0$ if $\alpha_1 > 1 - \alpha_0$. This condition simply means that the probability of a foreground template pixel producing a black pixel in the observed image is greater than the probability of a background pixel being observed as black. This is the normal situation.

The log normalized likelihood possesses an important decomposition property. If composite ideal image $Q_\pi$ is expressed as a disjoint union of templates $Q_{c_1} \ldots Q_{c_P}$, so that $$Q_\pi = \bigcup_{i=1}^{P} Q_{c_i}[x_i] \quad (10)$$

and $$Q_{c_i}[x_i] \cap Q_{c_j}[x_j] = \emptyset \quad (11)$$

for $i \neq j$, then from (7) it is clear that $$L(Z|Q_x) = \sum_{i=1}^{P} L(Z|Q_{c_i}[x_i]) \ldots \quad (12)$$

Note that (11) expresses a constraint on the supports, not the bounding boxes, of $Q_{c_i}$ and $Q_{c_j}$. Thus, (12) can be used to compute the log normalized probability (7) for a composite image even when the bounding boxes of the constituent templates overlap, as long as the constituent supports are disjoint. Based on the premise that fonts are typically designed so that the foreground pixels of the character glyphs do not overlap (i.e., share the same black pixels) in text strings, it is expected that $$Q_{c_i}[x_i] \cap Q_{c_j}[x_j] = \emptyset \quad (13)$$

for $i \neq j$, for any set of labeled glyph positions. The requirement expressed in (13) may be referred to as the "template disjointness constraint" of neighboring template supports. Thus, the preconditions for decomposition (12) are satisfied and we have $$L(Z|Q_x) = \sum_{i=1}^{P} L(Z|Q_{c_i}[x_i]) \quad (14)$$

$$= \sum_{c \in F} \sum_{i=1}^{N_c} L(Z|Z_c[x_i^{(c)}]) \quad (15)$$

$$= \sum_{c \in F} \sum_{i=1}^{N_c} \{\gamma \|Q_c[x_i^{(c)}] \wedge Z\| + \beta \|Q_c\|\}. \quad (16)$$

By expanding the right hand side of (16) in terms of individual template pixel positions and color values, (16) may be expressed as $$L(Z|Q_x) = \sum_{c \in F} \sum_{x \in C} q_c(x) \left[ \gamma \sum_{i=1}^{N_c} z(x + x_i^{(c)}) + \beta N_c \right] \quad (17)$$

where $z(x) \in \{0, 1\}$ is the color of the observed image $Z$ at pixel $x$. Template construction using the maximum likelihood criterion involves assigning values to $q_c(x)$ to maximize (17), subject to the template disjointness constraint (13).

The Significance of template disjointness constraint (13) to the template construction technique of the present invention can be easily illustrated. If the template disjointness constraint is ignored, template construction using the ML criterion becomes straightforward and consists of separately maximizing each term of the right hand side of (17). Since $q_c(x) \in \{0, 1\}$, the ML decision rule is $$q_c(x) = \begin{cases} 1 \text{ if } S_c(x, Z) > 0 \\ 0 \text{ otherwise} \end{cases} \quad (18)$$

where $$S_c(x, Z) \equiv \gamma \sum_{i=1}^{N_c} z(x + x_i^{(c)}) + \beta N_c \quad (19)$$

The reason for explicitly noting the dependence of $S_c(x;Z)$ on $Z$ becomes clear shortly from the following discussion. The condition $S_c(x;Z) > 0$ may be written as $$\frac{1}{N_c} \sum_{i=1}^{N_c} z(x + x_i^{(c)}) > \frac{-\beta}{\gamma} \quad (20)$$

which has the following interpretation: The left hand side of (20) is the fraction of pixels at location $x$ that are black in the collection of aligned sample image regions for $Q_c$. Thus, $S_c(x;Z)$ may be referred to as an "aligned pixel score" or a "template contribution measurement" at location $x$ for template $Q_c$. The ML decision rule (18) prescribes that the template pixel at $x$ should be black if the fraction of black pixels at location $x$ in the aligned sample image regions exceeds a threshold; equations (8) and (9) indicate that this threshold may be computed using the channel noise parameters $\alpha_0$ and $\alpha_1$. Simply, if the template disjointness constraint is ignored, each ML template may be independently computed by averaging and thresholding the collection of aligned sample image regions for the template, pixel by pixel.

FIG. 10 shows three templates 94, 96 and 98, selected from a set of templates, constructed from collections of sample image regions for the characters "e," "a" and "r," respectively, using ML decision rule (18) without observing template disjointness constraint (13). The sample image regions used were similar to those in FIG. 9 and were extracted from the scanned image of a newspaper column similar to image 10. It can be seen that templates 94, 96 and 98 clearly include the "correct" template images 93, 95 and 97, aligned at the origin of each canvas rectangle (indicated by the "+".) However, it can also be seen that each template canvas includes black pixels that clearly do not belong to the template. These extra black pixels occur in the templates when the averaging and thresholding operations of (18) are performed on neighboring glyphs in each of the sample image regions in the collection for a template. The extra pixels clearly arise as a result of using sample image regions that contain multiple glyphs, as opposed to a single, isolated glyph. If the sample image regions had contained only the central glyph of interest, e.g. as required in conventional template construction techniques, these extra pixels would be missing.

In addition, it can be seen from an examination of templates 94, 96 and 98 that template disjointness constraint (13) has not been observed. The pixels referenced by reference numeral 99 in template 98 for character "r" resemble the character "e.". This type of pixel averaging and thresholding might occur, for example, when the sample image regions for the character "r" frequently contain the neighboring glyph for the character "e" preceding the character "r," such as would occur when an input image source of glyph samples contains words that frequently include the character pair "er." It can be seen that template 98 includes black pixels in pixel group 99 that are also included in template 94. If template 98 were positioned horizontally adjacent to template 94 with their respective origins placed along the same baseline, these templates would share the same black pixels, the supports of these templates would not be disjoint, and the template disjointness constraint expressed by (13) would be clearly violated.

5. Constructing templates contemporaneously from the sample image regions.

a. Constructing black-on-white templates.

Maximizing (17) subject to the template disjointness constraint (13) is a computationally difficult problem, in the formal sense of being NP-complete. Rather than use an exponential algorithm to solve the constrained ML template construction problem exactly, the template construction technique of the present invention provides an approximate but effective solution that produces templates that substantially observe the template disjointness constraint. This solution, illustrating an implementation of box 450 in FIG. 5, is summarized in pseudo code in Table 2, and shown in flowchart form in FIG. 11.

TABLE 2

Procedure for contemporaneous template construction procedure (F, C, Z) do begin
  while max $S_c(x;Z) > 0$ do begin $$(s,w) := \arg\max_{\left\{\begin{array}{c} c \in F \\ x \in C \end{array}\right\}} S_c(x;Z)$$

$$q_s(w) := 1$$
    for $i = 1 \ldots N_s$ do $z(w + x_i(s)) := 0$
  end
end

The basic strategy of the solution illustrated in Table 2 of assigning black pixel color values to individual character templates is as follows. Rather than apply (18) independently to each template pixel included in a single template on a pixel-by-pixel basis, a value of 1 is assigned, in some sequential template assignment order, to each template pixel—in any template—for which $S_c(x;Z)>0$; template pixels assigned in this manner will be referred to as assigned template pixels. After each such assignment, the observed image Z, as represented by the sample image regions clipped from the image source of glyph samples, is modified by setting to zero (0) all aligned sample pixels at locations that are paired with, or coincident with, the newly assigned template pixel. For example, suppose that template pixel $q_s(w)=1$ has just been assigned. Then the pixels of Z at locations $w+x_i(s)$, $i=1 \ldots N_s$ are set to 0 before the next template pixel assignment is made to a remaining unassigned template pixel. The effect of setting sample pixels in the observed image to zero after a coincident template assignment has been made, which may be called "clearing pixels of Z," is to reduce the value of $S_c(x;Z)$, for subsequent computations of $S_c(x;Z)$, for overlapping template pixels that have not yet been set to 1, thereby decreasing the likelihood that the overlapping pixels will be set to 1 subsequently. The sequential assignment continues as long as $S_c(x;Z)>0$ for some unassigned template pixel. The net result of the template construction technique of the present invention is to produce the entire set of trained binary character templates contemporaneously, with no one template being complete until no positive $S_c(x;Z)$ remains. Once all foreground template pixels have been assigned in this manner, remaining unassigned template pixels are assigned a background value; in the case of black on white templates, the remaining unassigned template pixels are assigned a value of zero.

With reference to FIG. 11, after initializing pixel scores, or template contribution measurements, $S_c(x;Z)$, associated with each pixel position in each template canvas, in box 470, to some value greater than zero, $S_c(x;Z)$ is computed, in box 474, for each unassigned template pixel having a currently positive pixel score in each template, using the respectively paired aligned sample pixel positions in the collection of aligned sample image regions for that template. The pixel scores are then tested in box 478, and if any one of the computed pixel scores is greater than zero, the procedure proceeds to box 480 where the template pixel, in any template, having the highest positive pixel score is selected, and a black (i.e., foreground) color value is assigned to that selected template pixel. The pixel values of all aligned pixels in the collection of aligned sample image regions that are paired with the selected template pixel are then modified to zero (indicating a white or background color) in box 486. This results in each pixel position being modified in all sample image regions in which it is included, including sample image regions that are training data samples for other character templates. Then processing returns to box 474 where pixel scores are again computed for remaining unassigned template pixels.

Modifications may be made to the algorithm illustrated by the pseudo code in Table 2 that result in either reducing computation time or in improving template quality, or both. The specific details of such modifications will depend on the features available in the programming language used to implement the template construction technique, but, in general, modifications to reduce computation time will involve reducing the number of pixel scores, $S_c(x;Z)$, to be computed. One such modification that has actually been implemented involves computing pixel scores once, for all template pixels in all templates, and making a rank ordered list of the positive scores computed. Then the template pixel having the highest positive score from this list is selected, the selected template pixel is assigned a black pixel color value, and the color values of the aligned pixels in the collection of aligned sample image regions paired with the selected template pixel are set to zero (white). Then, only the next highest score in the rank ordered list of scores is computed next; if this recomputed score is now zero or less, the template pixel having this recomputed score is ignored, and the next highest template pixel score is selected next for template pixel assignment. If the recomputed score is still positive, then the template pixel having this recomputed score is selected next. The next selected template pixel is assigned a black pixel color value and the aligned pixels in the aligned sample image regions are cleared. This technique for selecting the next template pixel for assignment by recomputing only the next highest score continues while there are still positive scores in the rank ordered list of scores. Significantly fewer pixel scores are computed for the template pixels in this variation and consequently template construction processing time is reduced, but the general observation from its implementation is that the resulting templates produced are of lower quality than the templates produced using the steps summarized in Table 2 and shown in the flowchart of FIG. 11.

Another modification that can result in faster execution without changing the resulting templates in any way concerns the step of setting pixels of Z to zero after each template pixel is assigned. In the algorithm of FIG. 11 and Table 2, the score of each candidate template pixel, $S_c(x;Z)$, is computed using equation (19) after every template pixel assignment. If the number of glyph samples is large, this may require significant computation. Furthermore, if all candidate template pixels are re-ranked every time a pixel is assigned (e.g. as in the algorithm of FIG. 11), this computation might be repeated many times. Some of the $S_c(x;Z)$ computations may be avoided by noting that $S_c(x;Z)$ will not change when a template pixel for template s is assigned unless one of the glyph sample image regions for s overlaps one of the glyph sample sample image regions for a template c. Thus, $S_c(x;Z)$ only needs to be recomputed when a pixel is assigned to such a potentially overlapping template. Before pixel assignment begins, a table can be constructed that lists, for each template s, the templates c that have at least one glyph sample image region that overlaps a glyph sample image region of s. When a pixel is assigned to s, only the values of $S_c(x;Z)$ for those templates listed in the table entry for s need to be recomputed.

FIG. 12 shows the results of applying the template pixel color assignment algorithm of Table 2 to the same glyph sample image data used to generate the templates shown in FIG. 10. The set of templates 510 in FIG. 12 are arranged in the order "space", lowercase letters, uppercase letters, numerals and punctuation. If a character does not occur in the input image its template is given as a solid black square. Compared with FIG. 10, templates 510 in FIG. 12 contain significantly fewer extra black pixels, reflecting the effect of the "Z pixel clearing" step of the algorithm. In particular, templates 516, 514 and 518 representing characters "e," "a" and "r," respectively, have been called out for purposes of comparing them to templates 94, 96 and 98 in FIG. 10. In contrast to templates 94, 96 and 98 in FIG. 10, templates 516, 514 and 518 have the appearance that would be expected for their respective characters, given the glyph samples provided in image source 10. Note that, since the technique illustrated by the pseudo code in Table 2 and the flow chart of FIG. 11 is an approximation of the exponential algorithm that would be needed to solve the constrained ML template construction problem exactly (i.e., to maximize equation (17)), the character templates produced using this technique have substantially disjoint supports (i.e., substantially nonoverlapping foreground pixels when imaged in pairs,) but cannot be said to be perfectly disjoint in the rigorous mathematical sense.

As noted in (19), computation of the pixel scores requires use of the factors $\gamma$ and $\beta$, where $\gamma > 0$ and $\beta < 0$. In the illustrated embodiment that produced the templates shown in FIG. 10, the values used for these factors were 2.237 and −1.629, respectively, corresponding to channel noise parameters $\alpha_0 = 0.9$ and $\alpha_1 = 0.51$.

b. Another example of producing black on white templates.

Figure 13:
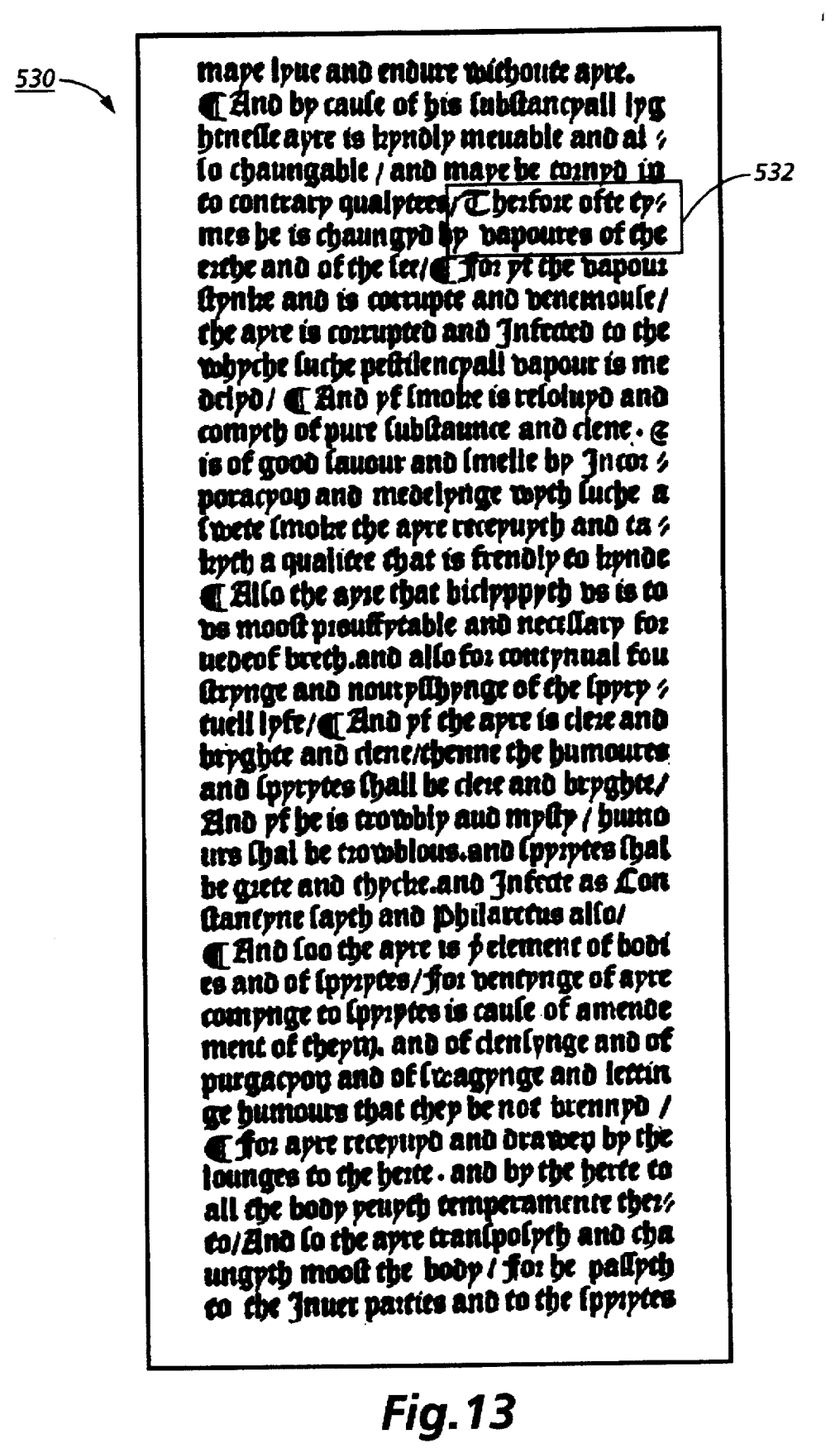
Figure 14:
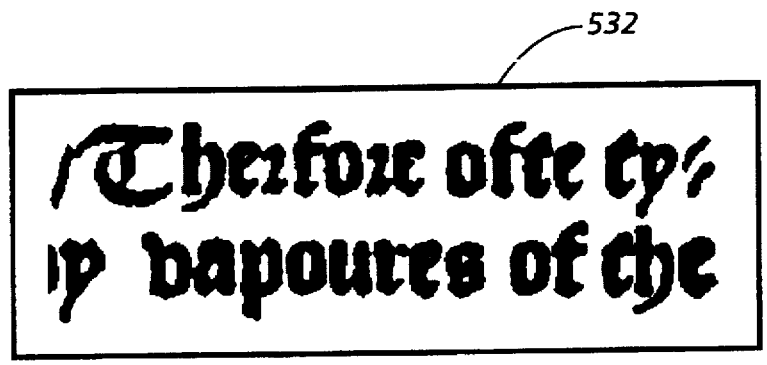
FIG. 14 illustrates an enlarged image portion of the 2D image of FIG. 13 showing the typeface and letter spacing of the glyphs more clearly.
Figure 15:
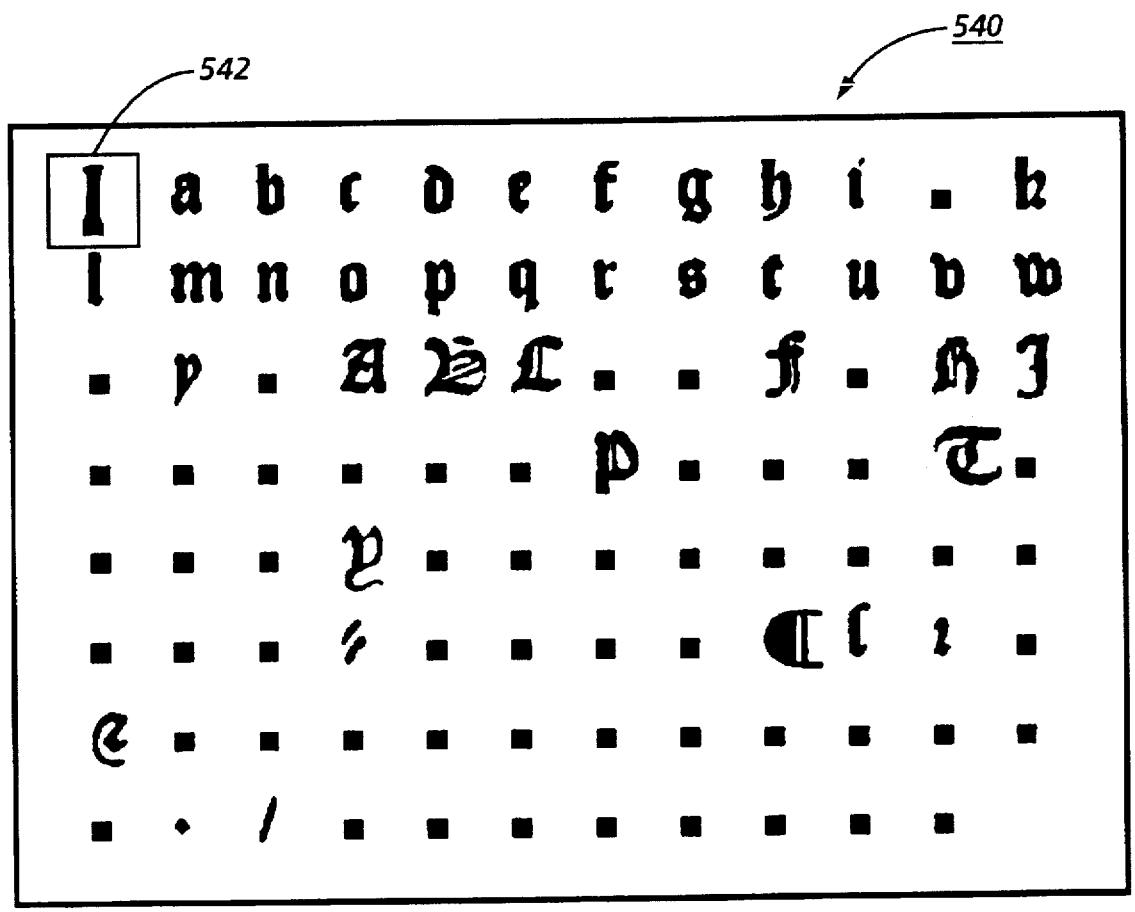
FIG. 15 illustrates the set of character templates constructed from the glyph samples in the image of FIG. 13 according to the the steps in the illustrated implementation of the template construction technique of FIGS. 5 and 11.

FIGS. 13, 14 and 15 illustrate another example of producing binary character templates that shows the versatility and power of the template construction technique of the present invention. FIG. 13 illustrates image 530 of a portion of a column of fifteenth century English text having glyphs in a Gothic style that was produced from scanning a document showing the text. Image portion 532 has been specifically called out and is shown enlarged in FIG. 14 to illustrate the typeface and letter spacing more clearly, and to show the tendency of some glyph pairs to merge in the image. Using image 530 and a data structure indicating the labeled glyph positions of the glyph samples occurring in image 530 as input data structures, the set of templates 540 illustrated in FIG. 15 was constructed according to the technique just described using collections of sample image regions for the samples identified in image 530 by their respective image origin positions.

c. Constructing white-on-black templates.

In the illustration of the template construction method just described, channel noise parameters $\alpha_0$ (background probability) and $\alpha_1$ (foreground probability) are assumed to have the relationship, $\alpha_1 > 1 - \alpha_0$, meaning that the probability of a foreground template pixel in any of the templates in an ideal image producing a black pixel in the observed image is greater than the probability of a background image pixel being observed as black. This is the normal situation for images that contain black (foreground) printing on a white background. In this situation, recall that computation of the pixel scores using (19) requires use of the factors $\gamma$ and $\beta$; when $\alpha_1$ and $\alpha_0$ satisfy the condition, $\alpha_1 > 1 - \alpha_0$, then $\gamma > 0$ and $\beta < 0$.

The template construction method just described may be modified to accommodate the training of white-on-black templates, such as found in images containing what is commonly called "reverse video" printing. Many telephone yellow pages, for example, contain major headings that include glyphs in reverse video. The construction of white-on-black templates by the method of the present invention in effect constitutes the modeling of white space, as opposed to black space, in a text image, where image regions are expected to be free of black pixels. Templates that model white space may be referred to as "hyper-white" templates.

In the case of reverse video printing, producing hyper-white templates from samples having white foreground pixels on a black background is accomplished by reversing the relationship between $\alpha_0$ and $\alpha_1$ such that $\alpha_1$ and $\alpha_0$ satisfy the condition, $\alpha_1 < 1 - \alpha_0$, and modifying template construction process 450 as shown in Table 3 below. When $\alpha_1 < 1 - \alpha_0$, the probability that a foreground pixel from a template will produce a black observed pixel is less than the probability of a background pixel being observed as black. Thus, when $\alpha_1 < 1 - \alpha_0$, $\gamma < 0$ and $\beta > 0$. The ML template pixel color assignment criterion (18) remains valid, where $S_c(x;Z)$ is defined as before, but now the condition $S_c(x;Z) > 0$ becomes $$\frac{1}{N_c} \sum_{i=1}^{N_c} z(x + x_i^{(c)}) < \frac{-\beta}{\gamma} \qquad (21)$$

in which the direction of inequality is reversed compared to (20). The interpretation of (21) is that the fraction of black pixels at location x in the collection of aligned glyph sample image regions for a template $Q_c$ should be less than a threshold, rather than greater as in the case for black-on-white printing.

Template estimation with hyper-white templates requires modification to the pixel assignment procedure described above in the discussion accompanying FIG. 11 and shown in Table 2. In the existing procedure, when a template pixel is assigned a color of 1, e.g. $q_c(w):=1$, the pixels of Z at locations $w+x_i(s)$, $i=1 \ldots N_s$ are set to 0 before the next template pixel assignment is made. The effect of this is to reduce the scores $S_c(x;Z)$ computed for overlapping template pixels that have not yet been assigned (i.e., set to 1,) thereby decreasing the likelihood that the overlapping pixels will be set to 1 subsequently. In the case of hyper-white templates, the principle of reducing $S_c(x;Z)$ is still valid, but since $\gamma<0$ when $\alpha_1<1-\alpha_0$, reducing $S_c(x;Z)$ is accomplished by adding black pixels to Z, rather than removing them. For the case where all templates have hyper-white foregrounds (e.g. reverse video text), the required modification to the pixel assignment procedure of Table 2 consists of replacing the line that assigns a value of zero to pixels in the samples that are aligned with an assigned template pixel with a line that assigns a value of one to those pixels. The modified algorithm is shown in Table 3.

TABLE 3

Procedure for contemporaneous template construction
for white-on-black templates

```
procedure (F, C, Z) do begin
    while max S_c(x;Z) > 0 do begin
        {  c ∈ F  }
        {  x ∈ C  }
        (s,w)
        :=
        arg   max   S_c(x;Z)
            {  c ∈ F  }
            {  x ∈ C  }
        q_c(w) := 1
        for i = 1 ... N_s   do   z(w + x_i(s)) := 1
    end
end
```

Thus, for example, when template pixel $q_c(w)=1$ is assigned in a hyper-white template, the pixels of Z at locations $w+x_i(s)$, $i=1 \ldots N_s$ are set to 1 before the next template pixel assignment is made to a remaining unassigned template pixel. In FIG. 11, a modification is made to box 480, where the color values of the aligned pixels in the collection of aligned sample image regions paired with the selected template pixel are set to one (black). Note that hyper-white templates constructed in this manner are stored as black on white templates; each black pixel has a very low foreground $\alpha_1$ value associated with it, indicating its low probability of being black. Satisfactory results have been obtained for construction of hyper-white templates using $\alpha_0=0.9$ and $\alpha_1=0.001$.

6. Template construction using foreground pixel probabilities that are not uniform across templates.

a. Overview.

In the binary template construction methods for both black-on-white and white-on-black printing just described, channel noise parameters $\alpha_0$ (background probability) and $\alpha_1$ (foreground probability) are assumed to be uniform over the entire image source of glyph samples; in the case of images with black printing, these parameters have the relationship, $\alpha_1>1-\alpha_0$, reflecting the normal situation for these images; analogously, in the case of white-on-black printing, these parameters have the relationship, $\alpha_1<1-\alpha_0$. In both cases, the foreground pixel probability $\alpha_1$ is assumed to be uniformly the same value for each template produced. These assumptions reflect a meaningful physical relationship with the channel model proposed by the theoretical framework of document image decoding where an exemplary asymmetric bit flip noise model transforms an ideal image composed of templates into a noisy observed image, without regard to the transformation of specific templates.

However, the present invention of producing binary character templates can be generalized by viewing the probabilities $\alpha_1$ and $\alpha_0$ as not necessarily being physically related to an actual noise model for transforming an ideal image into a noisy observed image. Rather, these probabilities, and in particular foreground probability $\alpha_1$, in their broadest sense can be viewed as simply reflecting, in each template, the statistical, quantized percentage of foreground and background pixels that appear in foreground and background colors respectively in the set of samples that occur in the observed image used for training the templates. When the background probability is assumed to be globally constant across an entire observed image, and the foreground probability $\alpha_1$ is treated as reflecting these pixel percentages, the present invention produces character templates that are represented as arrays of foreground probabilities, indicated by $\alpha_1$, that may be uniform across templates, or that may vary either by individual template or by pixel location within a template. The present invention does this using unsegmented labeled samples as the input training data.

Applying this generalization to the black-on-white binary templates produced above, an equivalent, but not necessarily efficient, representation of each template in the set of templates 510 in FIG. 12 would be an array of pixel locations the size of canvas C, where each background pixel has a probability of being observed as black of $1-\alpha_0=0.1$ and each foreground pixel has a probability of being observed as black of $\alpha_1=0.51$. Each character template model in this type of representation thus consists of an array of probabilities for pixel values being on (in this case, black) as observed from the collection of samples used for training the template. The binary representation of these templates is equivalent to the operation of counting all of the black pixels in aligned glyph sample image regions for each pixel location, dividing by number of samples, quantizing at either 0.51 for foreground or 0.1 for background, and replacing all the percentages by 1 or 0, respectively, since there are only two probability values of interest.

Applications of this generalized view of producing binary templates, and the modifications necessary to the template construction method previously discussed, are described next. These include producing templates in which the foreground probability varies by template, and producing templates in which the foreground probability varies by pixel position within each template.

b. Producing templates having foreground probabilities that vary by template.

Producing a set of character templates in which the foreground probability of each template is nonuniform (i.e., varies by template) requires a slight modification to the definition of the aligned pixel score, $S_c(x;Z)$ in (19) to make $\alpha_1$ an explicit parameter, so that $$S_c(x, Z, \alpha_1) \equiv \gamma_{\alpha_1} \sum_{i=1}^{N_c} z(x + x_i^{(c)}) + \beta_{\alpha_1} N_c \quad (22)$$

The subscripts on $\gamma$ and $\beta$ indicate that these parameters are related to $\alpha_1$ via (8) and (9). The pixel assignment procedure 450 of FIG. 11 and Table 2 is modified as shown in the pseudo code of FIG. 16. The value of $\alpha_1$ that is used for template $Q_c$ is denoted $\alpha_1(c)$.

The modified template construction procedure of FIG. 16 assumes that a value of $\alpha_1$ has been assigned to each template prior to template construction. The values to use to set these $\alpha_1$ parameters in advance of template construction will typically depend on the situation for which the templates are being trained, or on the nature of the particular samples being used for training. In some cases, there may no basis for intelligently establishing an individual $\alpha_1$ parameter value for each template in advance of template construction. However, one situation in which there is a good rationale for using a different $\alpha_1$ probability value for some templates than for others is when modeling image white space. This concept has already been discussed above with reference to constructing hyper-white (white-on-black) templates. Combining the notion of constructing hyper-white templates to model image white space with the notion of constructing templates having nonuniform foreground probability values leads to another novel aspect of the present invention: modeling the "space" character as a hyper-white template, while modeling the remaining templates in the glyph sample character set as black-on-white templates, in a black-on-white image.

c. Modeling the "space" character as a binary template, as an example of foreground probabilities that vary by template.

Existing recognition operations typically use the white space between words primarily for character segmentation purposes, and do not perform a "recognition" operation on the white space in the sense of matching portions of white space in an image to a template. However, treating the white space between semantic units (e.g., words) as a glyph may improve recognition performance for certain types of images or for particular recognition methods. A useful and novel aspect of the present invention is the discovery that white space between words in an image of black text on a white background may be successfully modeled as a "space" character template. The presence of a "space" character template in a set of trained character templates has proven to be of particular utility in recognition performed using the document image decoding method of recognition described in U.S. Pat. No. 5,321,773, entitled "Image Recognition Method Using Finite State Networks" and in Kopec and Chou, "Document Image Decoding" both of which are referenced earlier, where recognition is performed without reliance on segmentation of words or characters in advance of recognition.

Producing a "space" character template according to the present invention makes use of both sets of modifications to the binary template construction technique of process 450 that have been discussed above with reference to producing hyper-white templates, and with respect to producing templates having nonuniform $\alpha_1$ values that vary by template. When the "space" character template alone is modeled as a hyper-white template, while the remaining templates in the glyph sample character set are modeled as black-on-white templates, it can be seen that constructing hyper-white templates involves coloring Z pixels black every time a template pixel is assigned a 1 value, while constructing normal templates involves coloring Z pixels white. To accomplish this, two copies of the observed image Z are maintained during pixel color assignment. One copy, denoted $Z_1$, is used to compute $S_c(x;Z)$ for those templates for which $\alpha_1 > 1 - \alpha_0$. The second copy, denoted $Z_0$, is used to compute $S_c(x;Z)$ for the hyper-white templates, i.e. templates for which $\alpha_1 < 1 - \alpha_0$. Before the pixel assignment process begins, $Z_1$ and $Z_0$ are each initialized to be copies of Z. Every time any template pixel is assigned a 1 value, pixels of $Z_1$ are cleared to 0 and pixels of $Z_0$ are set to 1. FIG. 17 shows the pseudo code for the resulting pixel assignment procedure. The selection function $\sigma$ determines which of $Z_0$ or $Z_1$ is used to compute $S_c(x;Z)$ for a given template, and is defined by $$\sigma(\alpha_1) = \begin{cases} 1 \text{ if } \alpha_1 > 1 - \alpha_0 \\ 0 \text{ otherwise.} \end{cases} \quad (23)$$

The set 510 of character templates illustrated in FIG. 12 and the set 540 illustrated in FIG. 15 are examples of sets of character templates that have been constructed according to the modified procedure of FIG. 17 using nonuniform foreground probabilities. Examples of "space" character templates are shown in template 520 of FIG. 12 and in template 542 of FIG. 15. In these figures, the "space" hyper-white foreground is shown in black. These "space" character templates were constructed using $\alpha_1=0.001$, while the remainder of the templates in the character sets of FIGS. 12 and 15 were constructed using a foreground probability of $\alpha_1=0.51$. The value of $\alpha_0=0.9$ was used.

d. Producing templates comprising arrays of foreground probabilities.

In addition to the observation that modeling the white space between semantic units in an image may be useful in performing recognition operations, another common observation about black-on-white images is that pixels of a glyph that lie on the glyph boundary ("edge pixels") are less reliably black than pixels within the interior of the glyph. Representing a character template in a binary form only does not capture this observation about the probability of edge pixels, and so this information is not available during a recognition operation. However, this observation about edge pixels can be formalized by using a different (lower) value of foreground probability $\alpha_1$ for edge pixels than for interior pixels when representing these pixels in a template for a single character, thereby letting $\alpha_1$ vary by template pixel position. The foreground probability for a template pixel position is represented as $\alpha_1(c,x)$, denoting that $\alpha_1$ is a function of both the character c and the pixel position x with the template canvas.

When training data consists of isolated, pre-segmented character samples, it is known which pixels belong to which samples, and therefore to which templates; the samples can be averaged in a conventional manner and quantized to one of several predetermined candidate probability levels. The problem arises, however, that, since templates are trained using unsegmented training data in the present invention, assignment of a color to a pixel in any one particular template canvas is based on the score computations for pixels in all templates, and there is no a priori knowledge about which of the template pixels in any template are likely to be edge pixels. Thus, a priori assignment of candidate values of $\alpha_1$ to particular template pixel locations may not be feasible. This problem is analogous to the problem, noted above, of assigning different values of $\alpha_1$ to different templates.

The solution to the $\alpha_1$ assignment problem consists of allowing $\alpha_1(c,x)$ to be assigned automatically and contemporaneously with pixel color assignment, using the same maximum likelihood (ML) criterion of equation (18) that is used for template construction. Potential values of $\alpha_1(c,x)$ are assumed to be drawn from a set of candidate values, denoted A. Experimental results have shown that quality templates are obtained using the set of candidate values A={0.001, 0.6, 0.9, 0.99, 0.999} with a global background parameter of $\alpha_0$=0.9. The pixel color assignment procedures of Table 2 for constructing black-on-white templates and of Table 3 for constructing white-on-black templates having uniform foreground probability values across templates, and the pixel color assignment procedures illustrated in FIGS. 16 and 17 having nonuniform foreground probability values, may each be modified to allow for the assignment of $\alpha_1(c,x)$ contemporaneously with pixel color assignment. The required change to the procedures of FIGS. 16 or 17 is simply to replace $\alpha_1(c)$ by $\alpha_1(c,x)$ to build an array of foreground pixel values, with reference to the set A as the source of candidate values for $\alpha_1(c,x)$. By way of example, FIG. 18 shows the modification for contemporaneous assignment of template pixel color and $\alpha_1(c,x)$ value to the procedure in FIG. 17. In addition to assigning pixel color to template canvas pixels, the algorithm also assigns values to the array $\alpha_1(c,x)$. When the algorithm terminates, if $q_c(x)=1$ then pixel position x of template $Q_c$ is a foreground pixel, as before. The corresponding foreground parameter is given by $\alpha_1(c,x)$. Note that the template disjointness constraint (13), in addition to requiring the assignment of a foreground color to a pixel location in only one template at a time so that the individual black pixels included in one template do not overlap with those in another template, also imposes the rule that a pixel location is assigned only one probability value.

Templates of foreground probabilities constructed in this manner may either be stored as a single probability array per template, or each template can be stored as a set of binary templates, one for each $\alpha_1$ value, with the value of $\alpha_1$ associated with the template. Each of the binary templates may be thought of as a template "level," and the collection of binary templates for a character, c, may be referred to as a "multi-level template." In the illustrated implementation, there are five template levels associated with the foreground $\alpha_1$ candidate values identified above in candidate set A. A pixel having a value of zero in all of the foreground template levels indicates a background pixel. For foreground pixels, a pixel having a value of one at a particular level has the $\alpha_1$ value associated with that level, while a value of zero for a foreground template pixel at that same level indicates that that pixel location either has an actual $\alpha_1$ value associated with a different foreground template level or is a background pixel.

Figure 20:
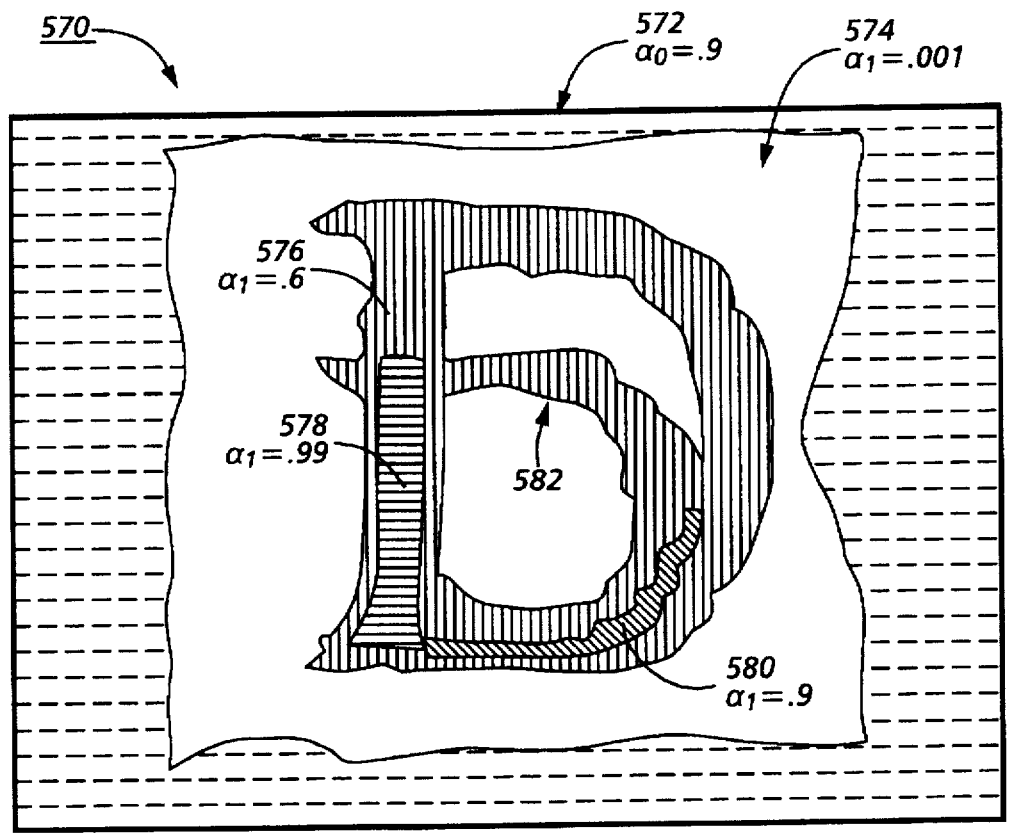
FIG. 20 illustrates a second exemplary multi-level character template constructed according to the steps in the illustrated implementation of the template construction technique of FIG. 18.

Multi-level templates constructed from high quality training data (i.e., relatively non-noisy samples properly labeled with respect to character and font) are likely to have fewer pixels at foreground levels with $\alpha_1<0.999$ than those constructed from noisy or mislabeled training data. Rendering multi-level templates in a printed form for inspection may reveal useful information about the quality of the training data used. FIG. 19 illustrates a simplified outline form of multi-level template 550 for the character "m" in which different cross-hatchings are used to represent different $\alpha_1$ values. For printing purposes, the cross-hatchings may be assigned colors, as shown in the key 566 to FIG. 19, and the template may be rendered as a color image to clearly illustrate the template probabilities to a user. The template canvas is represented by area 552; the portion of area 552 that represents background pixels is shown in a dotted line pattern. Area 554 represents an area immediately adjacent to the foreground pixels of the template; portions 556, 558, 560 and 562 have been called out as representative areas of the foreground pixels having different foreground probability values assigned as a result of the template construction procedure of FIG. 18. As expected, edge pixels of the foreground template region have a lower probability ($\alpha_1$= 0.6) of being ON than interior pixels. The overall shape of the template is of generally good quality, indicating that the training data was of good quality. FIG. 20 illustrates a simplified outline form of multi-level template 570 for the character "D" in which the same cross-hatchings as in FIG. 19 are used to represent the different $\alpha_1$ values. It can be seen that pixels have only been assigned to levels with $\alpha_1<0.999$, illustrated by areas 576, 578 and 580, with the majority of foreground pixels on the lower probability level of $\alpha_1=0.6$. It can also be seen that area 582 of template 570 shows what appears to be a smaller type size version of the top portion of the character "D," indicating that a significant number of the labeled glyph image origin positions from which glyph sample image regions were created were mislabeled with respect to font or size, and so were included in the collection of glyph samples for the larger character "D." Notice that significant portions of template 570 have been assigned a foreground probability of 0.6, (and consequently would appear as red if printed according to key 566), serving as a visible indicator of poor quality and mislabeled samples.

7. Extending the template construction technique to gray-level and color character templates.

For simplicity of exposition, the foregoing discussion has focussed on the case of constructing binary character templates, where pixel values are directly represented as codes of 0 or 1, or as foreground probability values. However, most of the concepts presented can be easily generalized to the case where the image pixel values lie in an abstract set. In typical gray-level (i.e., monochrome, continuous tone) images, the value in a pixel indicates a non-negative intensity represented as an integer from 0 (zero) to 255, where an intensity greater than zero is intended to represent a respective mark or active position in the image. In color images the value of a pixel may be a triple of intensities, one intensity for each color component, for example, red, green and blue. Alternatively, the value in a pixel in a color image may be one of the codes C, M, Y, K, W for cyan, magenta, yellow, black and white. In the case of these non-binary images, the template pixel values in the character templates represent probability distributions on more than two image pixel values. For CMYKW images, for example, the probability distributions can be represented by four probabilities, the fifth being derivable from the first four, since they must sum to one.

The template construction technique of the present invention may be generalized to produce gray-level or color character templates. In general, the technique is a stepwise optimization procedure in which the likelihood $L_{\{q_c\}}(Z|Q_\pi)$, which depends on the collection of templates $\{q_c\}$, is iteratively maximized by selecting the template $q_c$, the pixel position x, and the value v such that when $q_c(x)$ is set to v to obtain a new collection of templates $\{q'_c\}$, $L_{\{q_c\}}(Z|Q_\pi)$ is maximized.

8. Determining character set widths for templates constructed according to the sidebearing model of character positioning.

a. Review of the sidebearing template model.

In the examples of the illustrated embodiments, the template disjointness constraint of equation (13) essentially defines the set of character templates constructed as being modeled after the sidebearing model of letterform shape description and positioning used in digital typography, in which pairs of adjacent character images are positioned with respect to their image origin positions to permit overlapping rectangular bounding boxes as long as the foreground (e.g., black) pixels of one character are not shared with, or common with, the foreground pixels of the adjacent character.

Figure 21:
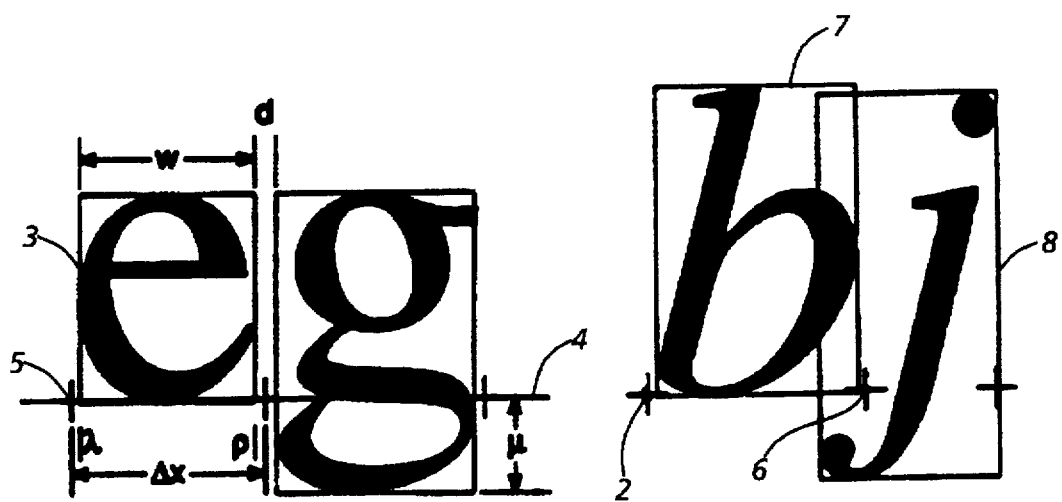
FIG. 21 illustrates a simplified version of the sidebearing model of letterform shape description and positioning.

The characteristics of the sidebearing model are illustrated in FIGS. 3(a) and (b) of U.S. Pat. No. 5,321,773, and in FIG. 2(a) and (b) of Kopec and Chou, "Document Image Decoding," (referenced earlier); these are reproduced herein for convenience as FIG. 21. As disclosed in Kopec and Chou, "Document Image Decoding," the shape of a glyph is defined in terms of a local coordinate system aligned so that the origin of the glyph is at (0,0), shown by crosses 2, 5 and 6 in FIG. 21. The character "set width" of a glyph is defined in terms of glyph origin positions, and is the vector displacement $\Delta = (\Delta x, \Delta y)$ from the glyph origin position of a first glyph to the point at which the origin of a second adjacent glyph is normally placed when imaging consecutive characters. In most Indo-European alphabets, including Roman, $\Delta x > 0$ and $\Delta y = 0$. In FIG. 21, the character set width of the letter "e" is denoted by displacement $\Delta x$. In other writing systems, however, $\Delta x$ can be negative (e.g., Semitic) or $\Delta y$ can be nonzero (e.g., Oriental glyphs.) When $\Delta y = \alpha \Delta x$ for some $\alpha$, the glyph origins in a line of text are colinear and define the baseline 4 of the text line. The bounding box 3 of a glyph is the smallest rectangle, oriented with the character coordinate axes, that just encloses the glyph. It can be seen from FIG. 21 that a glyph image origin position is not necessarily coextensive with an x,y position of the bounding box; FIG. 1 shows glyph image origin position 5 for the glyph "e" outside bounding box 3, and glyph image origin position 6 for the glyph "j" inside bounding box 8. The "width" of the character, a character measurement distinguishable from set width, is the corresponding dimension w of the bounding box, as shown in FIG. 21. (It is worth noting that some discussions of the sidebearing model in the computer typesetting art refer to the measurement called "set width" herein as "width".) The left sidebearing is the horizontal displacement $\lambda$ from the origin of the glyph to the left edge of the bounding box. Similarly, the right sidebearing is the horizontal displacement $\rho$ from the right edge of the bounding box to the origin of the next glyph. One or both of the sidebearings can be negative. For example, the left sidebearing of "j" in FIG. 21 is negative, with the result that the bounding boxes 7 and 8 of the "b" and "j" glyphs respectively overlap.

b. Determining the character set width from the glyph sample image regions.

The character set width is one of the font metrics needed to completely describe a binary character template that is modeled by the sidebearing model. In the illustrated embodiment, therefore, in addition to constructing the character templates according to template construction procedure 400 or one of its variations illustrated in FIGS. 16, 17 or 18, the character set widths for the constructed templates must be determined. A template's character set width is determined using the collection of sample image regions identified for that template. Because the glyph image origin positions associated with the glyph samples in the input image may be accomplished by a previous operation as a process of estimation, it may be likely that at least some of the identified samples will have inaccurate image origin positions identified. However, the set width of each glyph sample included in a glyph sample image region can be computed from knowledge of the image origin position of the next adjacent glyph sample in the input image. Therefore, computing a set width for a template includes computing the set width for each sample identified for that template using the collection of sample image regions and the displacement from each image origin position in each sample to the image origin position of the next adjacent glyph in the input image. The collection of computed set widths for the glyph samples is then used to arrive at a set width for the template; for example, the mean or median set width value for all of the samples may be determined to be the set width for the template. Or the minimum set width computed using the samples may be used as the template's set width.

Because set width determination uses the glyph sample image regions and not the constructed templates, determination of character set widths is not dependent on the completion of template construction, and may take place before or after template construction. Once character set widths have been determined, estimating or computing other typographic characteristics, or parameters, that may be required for using the templates in a recognition or other subsequent operation is straightforward from the relationships illustrated in FIG. 21. These other parameters include character sidebearings and baseline depth, and together with character set width are collectively called the template's font metrics.

C. Unsupervised Training of Character Templates Using the Character Template Construction Technique.

1. Overview

Figure 22:
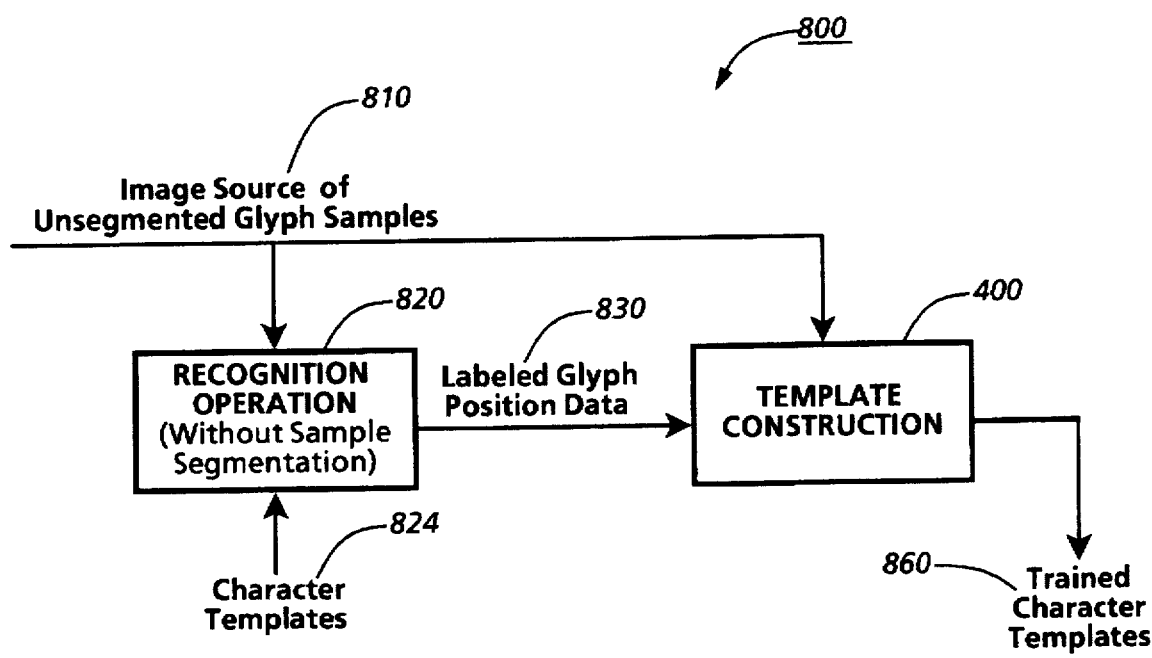
FIG. 22 is a simplified block diagram of an unsupervised character template training process illustrating the data source and data flow through the process.

FIG. 22 is a block diagram illustrating the method of unsupervised character template training 800 of the present invention which permits the training of character templates using unsegmented samples. Unsupervised training method 800 is suitable for operating a processor-based machine, such as that illustrated in FIG. 30 and described below in the discussion accompanying FIG. 30. Image source of unsegmented glyph samples 810 denotes an image definition data structure defining an image source of a plurality of glyphs that is the input to recognition operation 820; image source 810 may be a two-dimensional (2D) text document image or one or more images of lines of text that have been segmented from a 2D text document image. In either case, the organization of image source 810, as defined earlier, is such that individual pixel locations are accessible by the processor, but the pixels that comprise an individual glyph are not initially identified as a unit of data that is accessible to the processor, and no information is initially available to the processor as to whether a specific x,y coordinate position in the image indicates one of the pixels included in a glyph. Because of this data structure organization, image source 810 is described as including a plurality of "unsegmented" glyph samples.

Recognition operation 820 is any new or conventional recognition operation that can produce, or that can be adapted to produce, labeled glyph position data 830 of the type described earlier in the discussion accompanying FIGS. 3 and 4, in a manner that does not include segmentation of the samples into isolated glyph samples. Recognition operation 820 makes use of an existing set of character templates 824 that provide the source of character labels used to label the glyph positions that are associated with the locations of glyph samples in image source 810. Labeled glyph position data 830 together with image source 810 are then input to template construction process 400 (FIG. 3) which produces trained character templates 860 from unsegmented samples according to the processes described earlier.

A significant advantage of the unsupervised character template training method of the present invention is its ability to produce a set of character templates that are trained in the font of the glyph samples in the input image source 810 without the manual preparation of an extensive collection of training data. If a set of character templates already exist that are of sufficient quality to be used in recognition operation 820 to accurately label the glyph samples in image source 810, then that set of templates can be automatically trained to provide improved recognition performance on other documents that include glyphs in the font of the glyphs in image source 810. Alternatively, if an existing set of character templates is not of sufficient quality to accurately label the samples for unsupervised training, an adequate set of initial templates may be trained by conventional methods using a small set of manually prepared training data, and the unsupervised training method may be implemented to further improve the initial set automatically using a larger collection of training data.

2. An illustrated implementation of unsupervised training.

The description of the illustrated implementation of the method for the unsupervised training of character templates that follows requires a familiarity with the details of the invention that is the subject matter of commonly assigned U.S. Pat. No. 5,321,773, issued to Kopec and Chou, inventors herein, and entitled "Image Recognition Method Using Finite State Networks." The disclosure of this patent is hereby incorporated by reference as if set out in full herein for all that it teaches. Additional information about the image model and image decoding discussed in the illustrated implementation may also be found in the article by Kopec and Chou, "Document Image Decoding," referenced earlier in the background discussion, which is also hereby incorporated by reference herein as if set out in full. In the context of the discussion of the illustrated implementation that follows, the term "2D image decoding" or "document image decoding" or simply "decoding" will be used to refer to a recognition operation that includes matching a binary image of a character to a character template in order to assign a character code to the character image.

Figure 24:
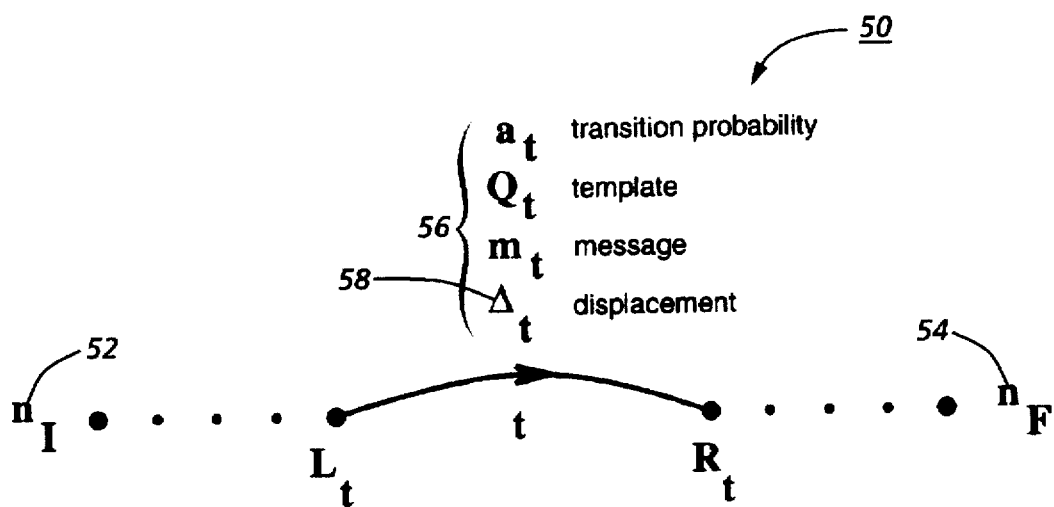
FIG. 24 illustrates a formal 2D image source model represented in its general form as a simplified, finite state transition network, for use in the illustrated implementation of the unsupervised training process of the present invention.
Figure 23:
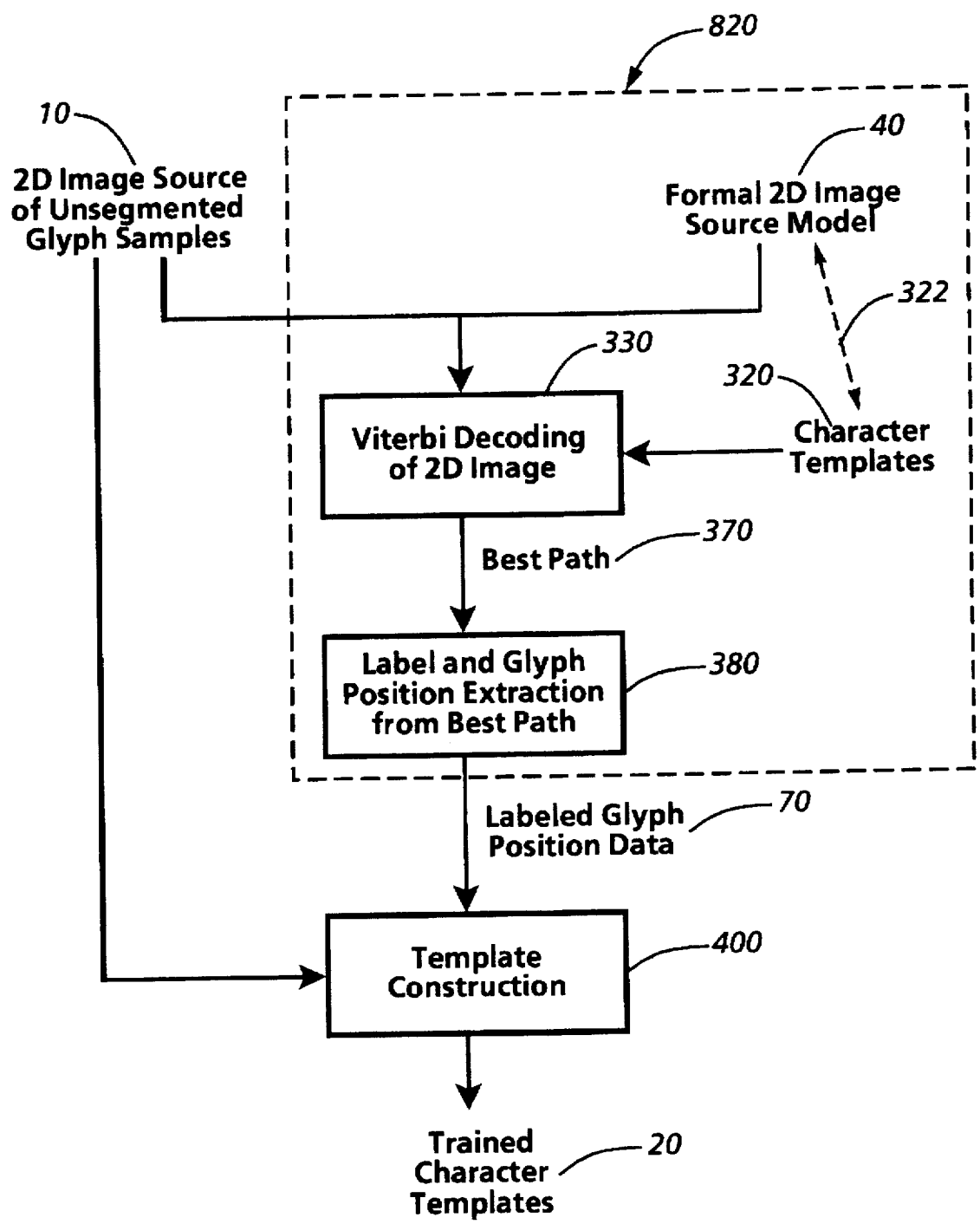
FIG. 23 illustrates a block diagram of an illustrated implementation of the unsupervised training process of the present invention.
Figure 25:
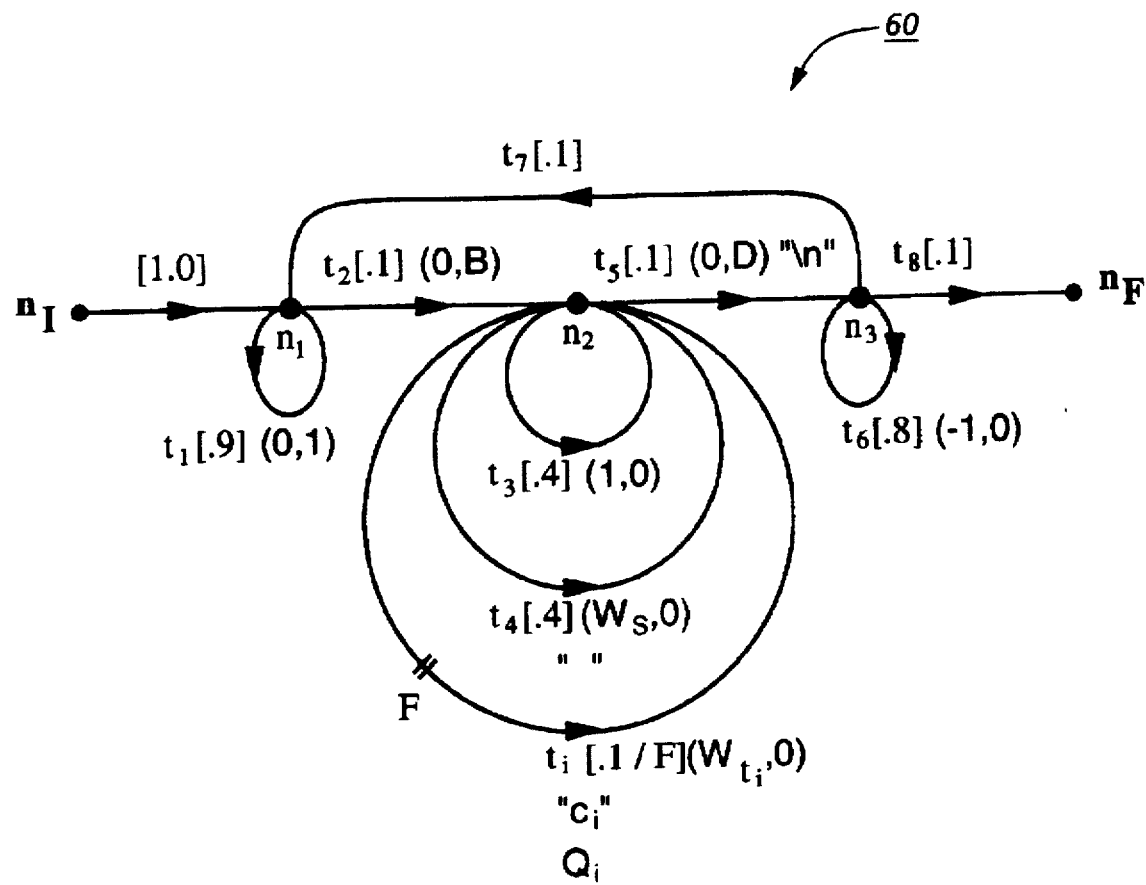
FIG. 25 is a diagram illustrating a finite state transition network of the type illustrated in FIG. 24, modeling a class of 2D images having a spatial structure of a single text column, such as the 2D image of FIG. 1, used in the illustrated implementation of the unsupervised training process of the present invention.
Figure 26:
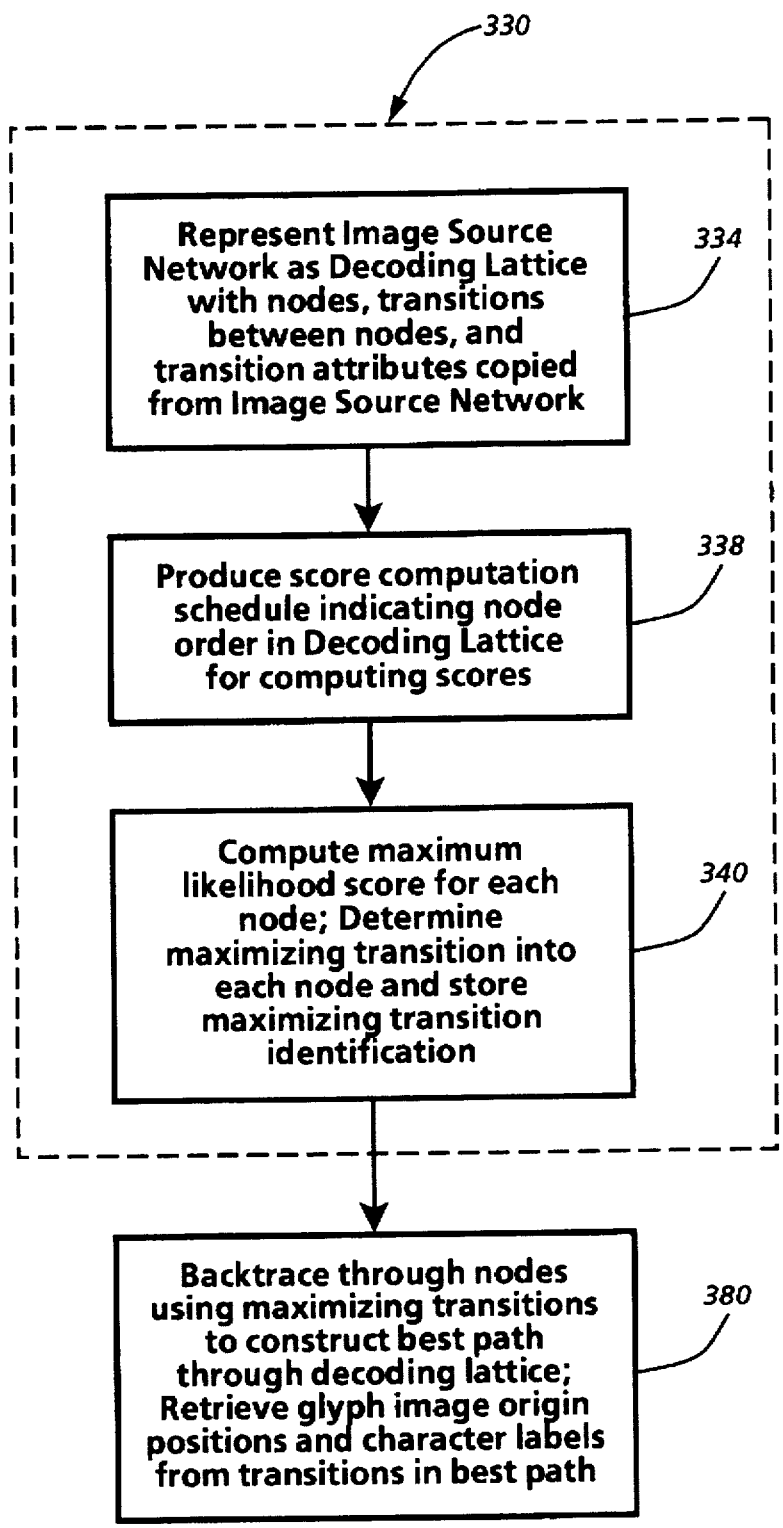
FIG. 26 is a flow chart illustrating the Viterbi decoding step in the block diagram of FIG. 23, according to the illustrated implementation of the present invention.

FIGS. 23-26 illustrate the features of the illustrated embodiment for finding and labeling glyph sample image origin positions in a 2D input image source of glyph samples. The block diagram of FIG. 23 shows the data flows and processes of the illustrated implementation. FIG. 24 illustrates the general form of a formal finite state model for modeling images according to the present invention, and FIG. 25 shows a diagram of the specific finite state transition network that is the formal 2D image model input to the unsupervised training process of the illustrated implementation. The flowchart in FIG. 26 presents the steps of decoding using a Viterbi decoder, and of obtaining labeled glyph image origin positions as the output of the decoding step.

An embodiment of the present invention has been implemented as a software program on a SUN SparcStation 10 computer running the SUN Solaris-1 operating system, available from Sun Microsystems, Inc., of Mountain View, Calif. Hardware and software implementation details of this embodiment are identical to that described above for the illustrated implementation of template construction process 400.

a. General features of the illustrated implementation.

With reference to FIG. 23, the inputs to the illustrated implementation of unsupervised training method 800 include 2D image source of glyph samples 10, previously illustrated in FIG. 1, and formal 2D image source model 40 that models a class or set of images as a grammar represented as a finite state transition network. Image model 40 is used to decode 2D image source of glyph samples 10 using a Viterbi decoding process 330 that produces a best sequence of transitions, or path 370, through the finite state network. An existing set of character templates 320 is used during this decoding process. The character template model that defines a set of properties of the character templates is implicitly part of formal 2D image source model 40, and this is indicated in FIG. 23 by dotted line 322. In the illustrated embodiment, character templates 320 are defined by the sidebearing model illustrated in FIG. 21 and include character labels that indicate character template origin coordinate information, set width information, and the font metric information described in the discussion accompanying FIG. 21. Process 380 determines the image origin positions and the character labels of the glyph samples in 2D image 10 from the transitions that make up best path 370 produced by Viterbi decoding process 330. The training data, i.e., labeled glyph image origin positions 70, are the output of this sequence of processes. Dotted line box 820 indicates the correspondence between the illustrated implementation and the recognition operation of the general unsupervised training method of the present invention shown in FIG. 22. The labeled glyph position data 70 together with the 2D image of samples 10 is then input to template construction process 400 to produce trained templates 20. The formal image source model 40 and processes 330 and 380 are now discussed in more detail.

b. The 2D image source model represented as a stochastic finite state transition network.

i. Formal image source models.

2D image source model 40 is a data structure that defines an explicit mapping between the glyph positions of the glyph samples in a 2D image and character labels of templates that identify the glyphs as samples of the characters indicated by the respective character labels. 2D image source model 40 is an explicit input to the illustrated implementation of the unsupervised training method of the present invention, and is referred to as being a "formal" model because it contains instructions, in the form of a formal description language such as a formal grammar or a finite state transition network, that characterize or describe a priori information about the set of possible 2D input images for which a recognition operation is designed and about a character template model that describes a set of character templates that are suitable for use in the recognition operation. Formal 2D image source model 40 is analogous to a formal grammar in a grammar-based character string parsing system which exists as an explicit data structure independent of the instructions (i.e., the code) of the parser that uses it. Formal model 40 is distinguishable from the data structure that defines an exemplary 2D image, such as 2D image 10, on which a decoding operation is to be performed.

The a priori information that formal image source model 40 describes includes structural features about the set of possible 2D images and the set of character templates, as well as functional characteristics of the model. Structurally, formal model 40 defines image position information about how possible image objects (e.g., glyphs, and nonglyph image components such as graphical objects, photographs, etc.) in an image included in the set of possible 2D images are spatially arranged in the 2D image; a priori position information about nonglyph components of an image permits the nonglyph portions to be eliminated during decoding as image locations that include glyphs. Formal model 40 may define image objects that include glyphs in logical or functional units larger than the individual glyphs themselves; for example, a formal image model that models a set of images having the form of a business letter may include a sub-model that defines the inside address or greeting portion of the letter.

Any formal 2D image source model having the characteristics and properties described is suitable for use in the unsupervised training method 800 of the present invention. For purposes of unsupervised training, the formal model may also, but need not, have the property of being a document image production model, in addition to a model suitable for decoding. The types of formal document image production models that are suitable for use in the present invention include those described in P. A. Chou and G. E. Kopec, "A stochastic attribute grammar model of document image production and its use in document image decoding," presented at IS&T/SPIE 1995 *Intl. Symposium on Electronic Imaging*, San Jose, Calif., Feb. 5–10, 1995.

ii. A Markov source as a formal image source model.

Formal 2D image source model 40 is represented in the illustrated embodiment as a stochastic finite state transition network of the type generally disclosed in U.S. Pat. No. 5,321,773 and discussed and described in Kopec et al., "Document Image Decoding." The general characteristics of this finite state image model are repeated here for convenience; the complete mathematical description supporting the use of the model for decoding may be found in the references. This general model description is followed by a discussion of the specific finite state image model that models a set of 2D images having the common spatial structure of a single column of text, of which 2D image source of glyph samples 10 is a representative image.

With reference to FIG. 24, the structure of a set of images is captured formally by modeling image generation as image source model 50, which is also called a Markov source. A Markov source consists of a finite set of states (nodes, vertices), N, and a set of directed transitions (branches, edges) B. Each transition t connects a pair of states, $L_t$ and $R_t$, that are called, respectively, the predecessor (left) state and the successor (right) state of t. Two distinguished members of N are the initial state $n_I$, denoted by reference numeral 52, and the final state $n_F$, denoted by reference numeral 54. It is assumed that no transition has $n_F$ as its predecessor, so that the final state is a trap state. With each transition t is associated a 4-tuple of attributes 56, $(Q_t, m_t, \alpha_t, \Delta_t)$, where $Q_t$ is the template, $m_t$ is the message string, $\alpha_t$ is the transition probability, and $\Delta_t$, denoted by reference numeral 58, is the vector displacement of t, analogous to set width for characters. Some of these attributes may be null for particular transitions and vector displacement 58 may have negative, zero or positive scalar component values. The template $Q_t$ is defined over the entire image plane $\Omega$, although normally its support (set of nonzero, foreground pixels) will be localized within a small region near the origin of the local template coordinate system.

A "path" in a Markov source is a sequence of transitions $t_1 \ldots t_P$ for which $L_{t_i} = n_I$ and $R_{t_i} = L_{t_{i+1}}$ for i=1, . . . , P−1. Associated with each path $\pi$ is a composite message, or message string, that is formed by concatenating the message strings of the transitions of the path. A Markov image source model defines a probability distribution on complete paths and induces a probability distribution on messages associated with complete paths. Also associated with each path $\pi$ is a sequence of vector image pixel positions $x_1 \ldots x_{P+1}$ recursively defined by $$x_1 = 0 \quad (24)$$

$$x_{i+1} = x_i + \Delta_{t_i} \quad (25)$$

where $x_{P+1}$ is introduced for convenience, and a composite image Q defined by $$Q_\pi = \bigcup_{i=1}^{P} Q_{t_i}[x_i] \quad (26)$$

where Q[x] denotes Q shifted so that the origin of its local coordinate system is located at x. For a path $\pi$, $$\Delta_\pi = x_{P+1} - x_1 = \sum_{i=1}^{P} \Delta_{t_i} \quad (27)$$

is defined to be the displacement of the path and $\Delta x_\pi$ and $\Delta y_\pi$ denote the x and y components of $\Delta_\pi$, respectively. A pair $(x_i, t_i)$ consisting of one of the positions defined by (24) or (25) and the corresponding transition of the Markov source is called a "labeled transition image origin position." The set of all such pairs defined by a complete path is called the set of labeled transition image origin positions of the path. For each transition t, let $N_t$ denote the number of transition image origin positions of the path that are labeled with t and let the corresponding transition image origin positions be denoted $x_1^{(t)} \ldots x_{N_t}^{(t)}$. Thus, $$P = \sum_{t \in B} N_t \quad (28)$$

Based on the premise that fonts are typically designed so that the foreground pixels of the character glyphs do not overlap in text strings, image source models of the type illustrated in FIG. 24 are required to be designed so that $$Q_{t_i}[x_i] \cap Q_{t_j}[x_j] = \emptyset \quad (29)$$

for i≠j, for every path $\pi$. The requirement expressed in (29) is analogous to the template disjointness constraint introduced in the discussion of template construction method 400, in equation (13).

Image source model 50 (FIG. 24) defines a relation, or mapping, between message strings and images via an underlying path that is bi-directional; that is, in addition to recovering messages from observed images, image source model 50 may also function as an imaging model for use in generating an image of a specified composite message. Equation (26), in view of (29), defines an imaging model in which, for each transition $t_i$ of path $\pi$, a copy of template Q corresponding to a message string is placed in an image plane with the origin of Q aligned at image position $x_i$, such that the support of $Q_{t_i}$ does not overlap with the support of a template previously positioned in the image plane. The complete set of positioned templates defines the image, $Q_\pi$.

iii. A finite state transition network for a single column of text.

As an image decoder, image source model 50 may be used to extract simple text strings from an observed image to produce a literal text transcription of the image (i.e., a transcription without formatting or logical structure tags.) These text strings are extracted from the message string attribute associated with each transition included in a path identified through model 50 as the observed image is being decoded. Image source model 60 in FIG. 25 models a set of 2D images having the common spatial structure of a simple text column and will be used to illustrate the process of image decoding in more detail. A simple text column consists of a vertical sequence of text lines, alternating with white space. Horizontally, a text line is a sequence of characters typeset according to the sidebearing model shown in FIG. 21. 2D image source of glyph samples 10 is a representative image of the type modeled by image source model 60. Model 60 models a path through a 2D image of a single column of text that follows the conventional reading order for a text in the English language, assuming that the path through the image starts at the top left corner of the image and proceeds to the bottom right corner, and proceeds from the left of the image to the right in repeated 1D line sequences. Each transition $t_i$ between nodes in the network has the associated 4-tuple of attributes, shown in FIG. 25 in the order $[\alpha_t]$ $\Delta_t$, $m_t$, $Q_t$, where, when a template $Q_t$ is associated with a transition, the message string $m_t$ identifies the character represented by the template. It can be seen that some of these attributes are null for some transitions.

With reference now to FIG. 25, state $n_1$ corresponds to the creation of vertical white space. Each time branch $t_1$ is traversed, the imager moves down one row without drawing anything on the output image plane, since no image template is associated with $t_1$. At some point, the imager reaches the top of a text line and follows branch $t_2$. The displacement (O,B) of $t_2$ moves the cursor down to the text baseline; B is the font height above baseline. State $n_2$ represents the creation of a horizontal text line. The self-transitions from $n_2$ to $n_2$ are of two types. The F transitions $t_i$ that are labeled with image templates $Q_i$ and single character message strings "$c_i$" are used to draw individual glyphs on the output image plane. The horizontal displacement associated with each of these branches is the character set width, $W_{t_i}$. Branches $t_3$ and $t_4$ have blank templates associated with them and represent white space. Branch $t_3$ represents a white space of minimal (1 pixel) width and is used for fine spacing adjustment. Branch $t_4$ corresponds to a real space character of font-dependent width $W_s$ and is labeled with a space message " ". At the end of a text line, the imager traverses $t_5$ ("line feed") and enters "carriage return" state $n_3$. The message on $t_5$ is the new line character "\n". The vertical displacement associated with $t_5$ is the font depth D. Each traversal of branch $t_6$ moves the imager left by one pixel. Finally, transition $t_7$ returns the imager to state $n_1$ and the process is repeated for the next text line. After the last text line has been created, the imager traverses $t_8$ into final state $n_F$.

The transition probabilities illustrated in FIG. 25 have been set manually. Actual experience with image source model 60 suggests that the exact values of the transition probabilities are not important in determining the most likely path through the network, given an observed image, except when the observed image alone is insufficient to reliably distinguish between alternative possibilities, for example, as a result of noise.

c. Decoding the 2D image source of glyph samples to produce labeled glyph sample image origin positions.

Decoding process 330 (FIG. 23) may be accomplished using any type of software- or hardware-implemented decoder suitable for decoding 2D image 10 using image source network 60 to produce the labeled glyph image origin positions 70 indicating the glyph samples in 2D image 10. In general, such a decoding process will identify some or all of the complete paths through network 60, each of which indicates a target composite ideal 2D image, $Q_\pi$, and will determine which one of the identified paths is the best path, by determining which target composite ideal 2D image best matches the 2D image source of glyph samples according to some matching criterion. The best path through the network is the path that indicates the best-matched target ideal 2D image; transition image origin positions in the 2D image glyph source can be computed from the transitions that make up this best path, and glyph image origin positions and their labels are available, in turn, from selected ones of the transitions and their transition image origin positions. The matching criterion may be any suitable image measurement; typically, the matching criterion will involve optimizing a pixel match score for the target ideal image compared to the image glyph source.

Decoding process 330 in the illustrated implementation is accomplished using a Viterbi decoder, described in detail in Kopec and Chou, "Document Image Decoding," and in U.S. Pat. No. 5,321,773. It finds the maximum a posterior (MAP) path through the network 60, using the assumed asymmetric bit flip channel model, also described in Kopec and Chou, "Document Image Decoding," and shown in FIG. 5 therein. The purpose of the Viterbi decoder is to maximize a recursive MAP decision function over all complete paths through network 60 in order to determine the most likely path through the network. As noted above, each complete path through network 60 corresponds to a composite ideal image produced during decoding. Thus, the Viterbi decoder determines which ideal image, of the possible ideal images produced from complete paths through network 60, is closest in appearance (by pixels) to the input image being decoded, i.e., 2D image 10. It does this by computing a likelihood measurement, or maximum likelihood score, for a path defining an ideal image that is the summation of scores for individual transitions in the path. The general operation of the Viterbi decoder is discussed next; the references cited above should be consulted for the mathematical principles underlying decoding process 330 and for additional details about the process.

FIG. 26 is a flow chart illustrating the sequence of steps implementing the Viterbi decoder of decoding process 330 of the illustrated embodiment. Viterbi image decoding involves path finding in a three-dimensional decoding lattice, also called a decoding trellis. The decoding lattice is composed of nodes that may be viewed as forming a stack of image planes, one for each node or state of the source model. There is a one-to-one correspondence between paths in network 60 and paths in the lattice, and corresponding transitions between nodes in the lattice have the same attribute information as transitions between states in the network 60. Thus, in step 334, network 60 is first represented in a data structure as the decoding lattice. Next, in box 338, the order in which scores for the nodes in the lattice are to be computed must be determined; this is accomplished by producing a score computation schedule for the recursion, indicating in which order the nodes of the lattice are to be visited and consequently, in which order the node scores are to be computed. Then, the maximum likelihood scores for each node, in the order prescribed by the schedule, are computed, in box 340. For each node, the transition into that node that maximizes the likelihood score is identified and stored. The steps of decoding process 330 have been illustrated as being performed in a particular sequence for purposes of describing the functions that are performed during decoding according to the illustrated implementation; they may be, and usually are, performed contemporaneously in an actual software implementation.

At the conclusion of decoding, after the likelihood score for the $n_F$ image plane in the decoding lattice has been computed, the most likely complete path found by the Viterbi decoder is retrieved by backtracing through the stored transitions from the final node to the initial node in the decoding lattice, as shown in box 380, to identify the transitions that compose the best path, and to compute the transition image origin positions $(x_i, t_i)$ in 2D image 10 using equations (24) and (25) above. Each transition of the best path defines one transition image origin position. However, not all of these image positions in 2D image 10 are of interest; a filtering step identifies the transitions that indicate estimated glyph image origin positions in 2D image 10 (i.e., the transitions that include as attributes non-null character templates for characters in the glyph sample character set), extracts these image origin positions from all of the identified transition image origin positions, and pairs these image origin positions with the respective character label on each of the identified transitions, thereby providing labels for the image origin positions of the glyph samples. These glyph image origin positions and paired character labels comprise labeled glyph position data 70 (FIG. 23).

Decoding provides an estimate of the image origin position of a glyph sample in 2D image 10, but does not provide information about the extent or size of the glyph sample in the image. The image origin positions are considered to be estimates of glyph sample positions because decoding may produce imperfect results such as, for example, when a noisy 2D image 10 is an input into the unsupervised training procedure, or when the existing set of character templates used for decoding represent characters in a font that is significantly different from the font of the glyph samples in 2D image 10.

The labeled glyph image origin positions together with 2D image 10 are then input into template construction process 400 to produce a set of character templates that are trained in the font of the glyph samples in 2D image 10. In this illustrated implementation, character templates are produced that are modeled after the sidebearing model, and template construction process 400 therefore includes the process of determining character set widths and other font metrics for the trained templates.

3. Unsupervised training using segmented input text line images.

The unsupervised character template training technique of the present invention may be carried out using a series of text line images as the source of glyph samples. The text line image environment could be viewed as being a one-dimensional (1D) image environment, in contrast to the 2D image environment that is typically exemplified by an image of a document page. This discussion of the unsupervised character template training technique in the line image environment assumes for simplicity that the term "text line image" or "line image" refers to a horizontal row of glyphs imaged across a page in a substantially colinear arrangement, as is, for example, conventionally found in English text and in musical scores. However, the term "text line image" is equally applicable to substantially colinear arrangements of consecutive glyphs in vertical columns, or in any other arrangement that is characteristic of a particular character system and its notational form, and that complies with the mathematical definition of a text line image source as described below. As with the 2D implementation, this illustrated implementation in the line image environment produces character templates that are modeled after the sidebearing model. Input line images may be automatically isolated from the 2D image using known text line segmentation methods, or may be manually isolated from a 2D image by a user.

a. Definition and examples of a text line image source model.

i. Definition of a formal line image source model.

Figure 27:
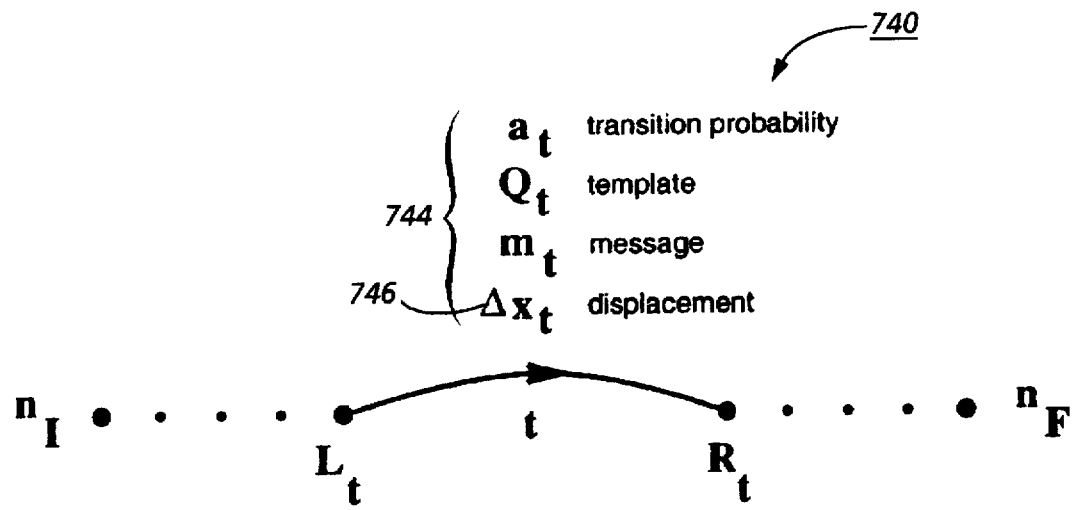
FIG. 27 illustrates a formal line image source model represented in its general form as a simplified, finite state transition network.

A formal line image source model models the spatial structure of a set of line images as a formal grammar; an input line image that is to serve as a source of glyph samples must be included in the set of text line images modeled by the formal line image source model. FIG. 27 shows the general form of a line image source model 740, which is similar in structure to the 2D image source model 50 of FIG. 24. Line image source model 740 models the spatial structure of a set of line images as a finite state transition network that includes a set of states and a set of directed transitions. Each transition connects a pair of states, $L_t$ and $R_t$, that are called, respectively, the predecessor (left) state and the successor (right) state of the transition. Formally, the Markov line image source model 740 of FIG. 27 is a special case of the Markov image source 50 of FIG. 24 in which each complete path π through the model has the same y coordinate of path displacement; that is, $\Delta y_\pi$ is the same for each π, where the path displacement $\Delta_\pi$ is defined by equation (27) above.

A simple and very common form of text line image source model models a horizontal text line image model in which the y component of each branch displacement is zero, i.e., $\Delta y_t=0$ for each transition t. It is clear from (27) that $\Delta y_\pi=0$ for each complete path π through such a source. Moreover, from equations (24) and (25) above, the y coordinates of all of the image positions $x_i$ defined by π will be equal to the y coordinate of the initial position $x_1$. Normally, $x_1=0$, as discussed previously. However, the choice of initial y position is arbitrary. Thus, by setting the y position appropriately, a line image source can be used to describe horizontal text lines aligned at any vertical baseline position. When all branch y displacements of a line image source are zero, they can be omitted from the description of the model, suggesting the characterization of the model as being "one-dimensional." This is illustrated in FIG. 27 by showing transition displacement 746 as only the 1D (scalar) displacement $\Delta x_t$, in contrast to FIG. 24 which shows 2D vector displacement 58 ($\Delta_t$).

Note also, however, that since a text line image may include glyphs that are imaged both above and below the text baseline (i.e., glyphs whose image origin positions occur above or below the vertical position that has been determined to be the baseline, relative to other nearby glyphs that are imaged at the baseline), and that such an image is represented as a two-dimensional array of pixels, there clearly may be instances where the text line image source model will be defined to include as a transition attribute a 2D vector displacement, $\Delta_t$. The key to defining a one-dimensional image source model in the present context is that $\Delta y_\pi$ for each complete path π through the model equals some constant path displacement that is independent of the path.

More information on line Markov sources is available in A. Kam and G. Kopec, "Separable source models for document image decoding", presented at IS&T/SPIE 1995 Intl. Symposium on Electronic Imaging, San Jose, Calif., Feb. 5–10, 1995 (hereafter, Kam and Kopec, "Separable source models"), and in A. Kam, "Heuristic Document Image Decoding Using Separable Markov Models", S. M. Thesis, Massachusetts Institute of Technology, Cambridge, Mass., June, 1993 (hereafter, Kam, "Heuristic Document Image Decoding"). The text line image source model described herein corresponds exactly to what is called a "horizontal subsource with constant y displacement" in the first of these references, and corresponds to what is called a "child HMM" in the second of these references. Both of these references are hereby incorporated by reference herein for all that they teach.

ii. An example of a line image finite state transition network.

Figure 28:
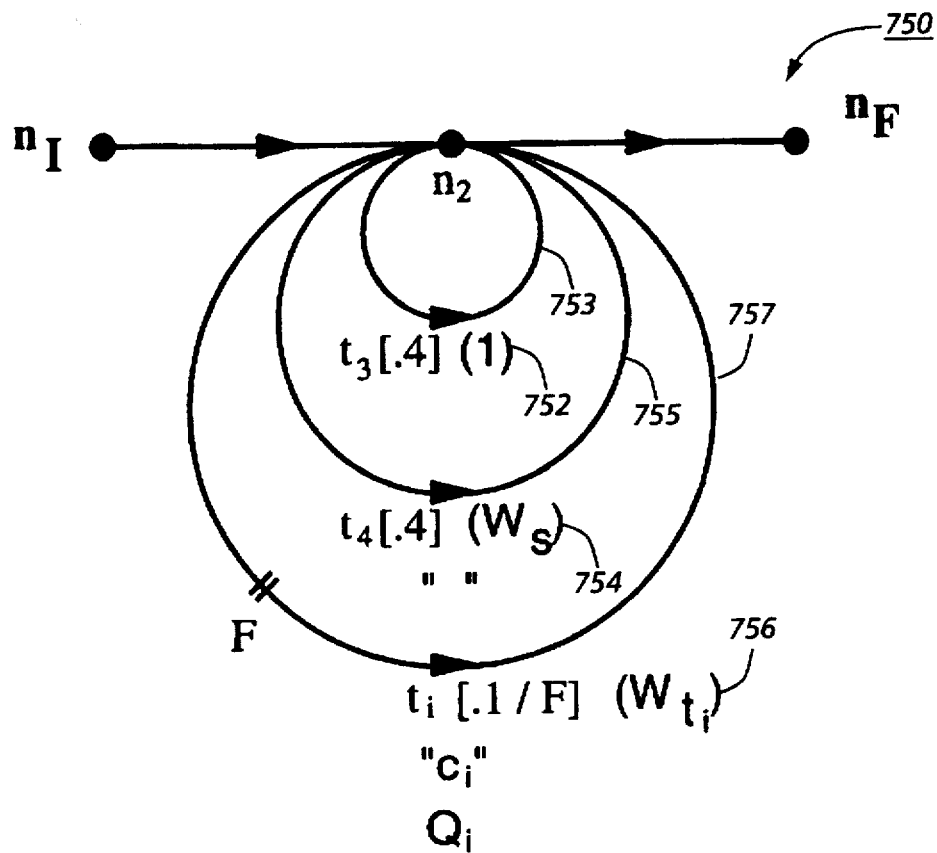
FIG. 28 is a diagram illustrating a finite state transition network modeling a set of line images having a spatial structure of a single text line, used in a text line image implementation of the present invention.

FIG. 28 shows a simple line image source model 750 for lines of printed text. It can be seen that model 750 is the same as the subgraph of the text column model 60 (FIG. 25) and consists of state $n_2$ and the self-transitions 753, 755 and 757 from $n_2$ to $n_2$. As discussed previously, the portion of the text column model around node $n_2$ represents the creation of a horizontal text line. In fact, text line image source model 750 in FIG. 28 may be viewed as the result of extracting the portion of text column model 60 around node $n_2$ and making it a separate model. The branch displacements in FIG. 28 are one-dimensional, as noted above. Self-transition 753 provides for fine horizontal spacing along the baseline; self-transition 755 provides for the imaging of a space character of displacement $W_s$; and self-transition 757 provides for the imaging of a character template $Q_i$ having a horizontal displacement equal to character set width $W_r$. The message strings generated by the line image model of FIG. 28 differ from those generated by the text column model of FIG. 25 in that they do not include the new line character \n that appears in text column model 60 in FIG. 25 on the transition from state $n_2$ to $n_3$. The new line characters in a text column message are viewed as line separators that are logically part of the page-level markup, rather than as parts of the text lines themselves.

iii. Obtaining a line image source model from a 2D image source model.

From the perspective of processing efficiency, the illustrated 2D implementation of the unsupervised training process as described above, and in particular the Viterbi decoding of the 2D image, involves a computationally complex algorithm; decoding of a 2D image may execute in a time frame that is commercially unacceptable, or may require a prohibitively large amount of storage. The 2D implementation may be simplified by factoring the 2D image source model into a 1D vertical image source model and one or more 1D horizontal text line image source models. Factoring the 2D image source into its 1D constituent models has the effect of improving the performance of several aspects of Viterbi decoding; decoding is significantly simpler than decoding using a full 2-dimensional model. In particular, the Viterbi algorithm for line image sources is essentially identical to the well-known segmental form of Viterbi algorithm used in speech recognition.

Certain types of 2D image source models are of a form that are able to be automatically factored into 1D constituent models without modification. When a particular 2D image source model is of the type that is able to be factored in this manner directly, without modification, it is called a "separable" source model. Other types of 2D image models may only be able to be factored after being converted to an equivalent model that is of a separable form. Generating 1D vertical and horizontal source models from a 2D image source model most efficiently, and, for separable 2D models, automatically, in order to take advantage of the improved decoding performance is discussed in detail in Kam and Kopec, "Separable source models" and in Kam, "Heuristic Document Image Decoding." 2D image source model 60 illustrated in FIG. 25 may be factored into text line image source model 750 in FIG. 28 using the techniques described in these two references.

b. Unsupervised training using a line image source model and line image sources of glyph samples.

Figure 29:
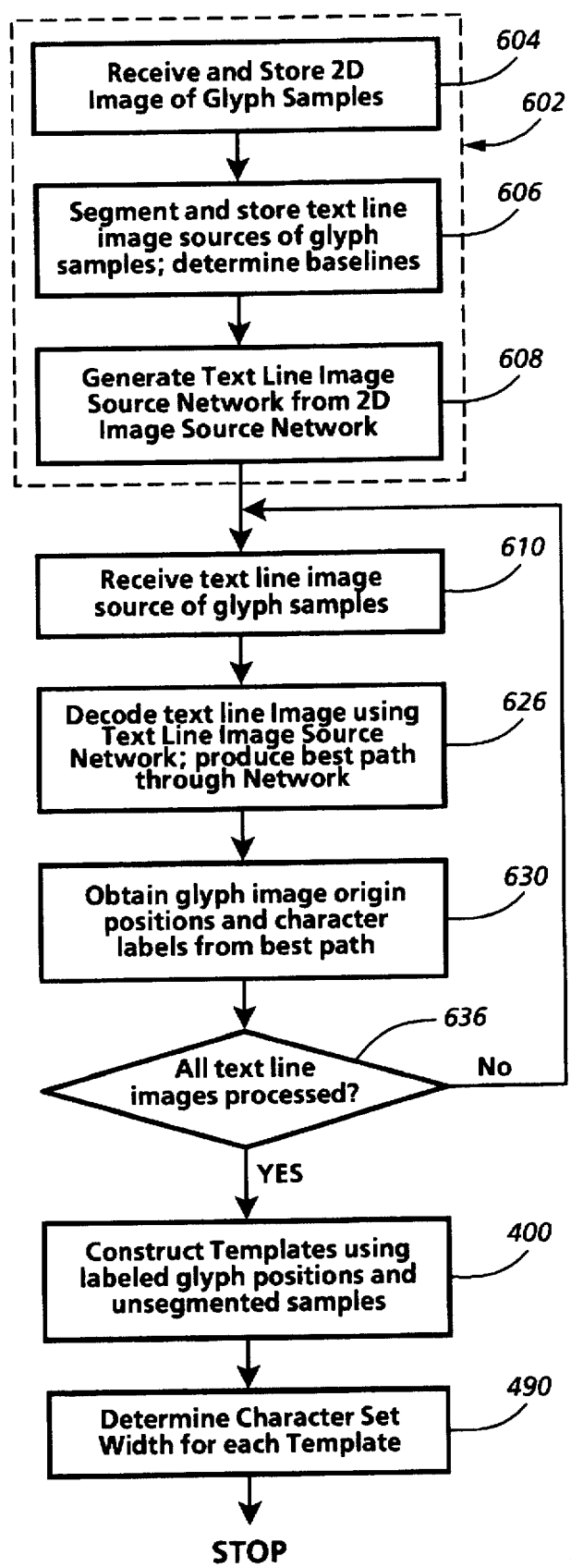
FIG. 29 is a flow chart showing an illustrated implementation for carrying out the unsupervised character template training method using line image source models and text line images as sources of samples.

An illustrated implementation of the unsupervised character template training process of the present invention using a line image source model and using line image sources of glyph samples is straightforwardly derived from the illustrated implementation of unsupervised training in the 2D environment shown in FIG. 23. The flowchart of FIG. 29 illustrates the steps of this implementation. The processing steps in dotted line box 602 illustrate the preliminary processing steps necessary to automatically convert the 2D inputs into text line forms suitable for processing in the text line context. In particular, text line images are isolated from an input 2D image in box 606 using known text line segmentation techniques; the vertical baseline position of each text line is determined using any suitable known method for finding text baselines. A text line image source model is generated, in box 608, as a separate model from the 2D image source network using the methods described above.

As in the 2D implementation, identifying labeled glyph positions in the text line image source of glyph samples includes the steps of Viterbi decoding of segmented line images in box 626 and glyph position extraction in box 630. Glyph sample image origin positions are obtained from backtracing through the nodes of the best path in the same manner as previously described. The glyph sample image origin positions that are directly defined by a path through line transcription image source network 750 (FIG. 28) are just x coordinates. Complete glyph sample image origin positions indicating samples in a line image are generated, trivially, by pairing each of these x coordinates with the line baseline y, position. Once decoding of a first text line image is completed, a test is made in box 636 to determine whether all text line images of glyph samples have been processed; if not, processing returns to step 610.

When all samples have been identified, processing continues with template construction process 400, which is carried out in the same manner as previously described. Producing trained character templates defined according to the sidebearing model requires determination of character set widths, in box 490, as described above.

D. The Machine Configuration.

Figure 30:
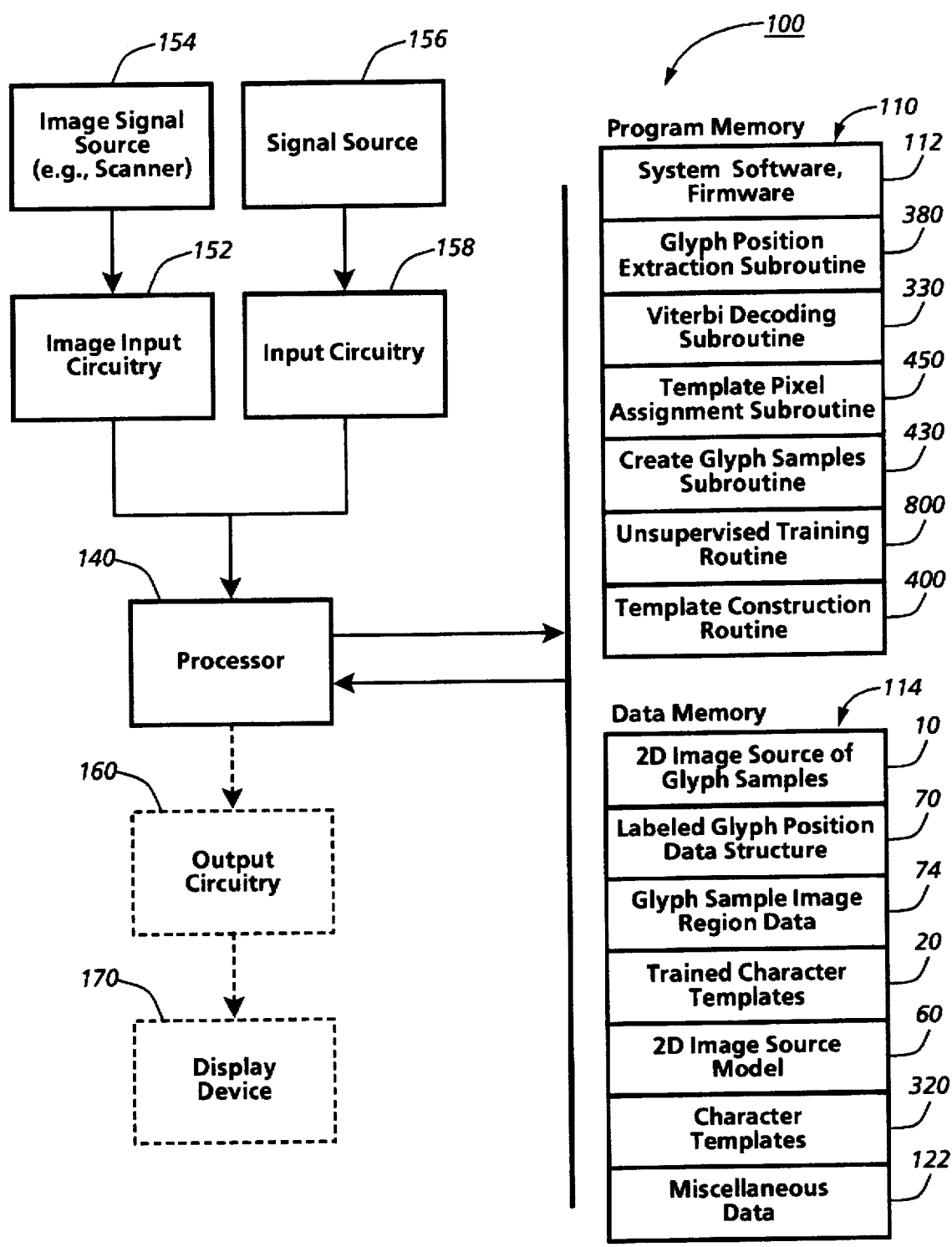
FIG. 30 is a simplified block diagram illustrating the hardware components of the machine that the present invention may operate.

FIG. 30 shows the components of processor-controlled machine 100 implementing the features described above for constructing binary templates using unsegmented samples, and for the unsupervised training of character templates using the template construction technique. Machine 100 includes processor 140, which could be any processor, including one or more CPUs, and may include specialized hardware such as one or more coprocessors to provide specific functions. Processor 140 is connected for receiving image definition data defining images from image input circuitry 152, which in turn is connected for receiving signals indicating image data from an image signal source 154. Image signal source 154 may include an optical scanner, a copier machine scanner, a Braille reading machine scanner, a bitmap workstation, an electronic beam scanner or any similar signal source capable of providing image signals of the type required by the present invention. In the case of one of the scanners, the output of a sensor associated with the scanner is digitized to produce an image definition data structure defining a two-dimensional image source of glyph samples 10, and the image definition data structure is then provided to processor 140 via image input circuitry 152 for storage in data memory 114.

Processor 140 is also connected for receiving signals from input circuitry 158 connected to signal source 156 that provides signals to machine 100 that indicate one of the various input data structures needed for template construction technique 400 or for unsupervised training method 800. Signal source 156 provides, for example, labeled glyph position data 70 (FIG. 3) for template construction technique 400, and provides formal image source model 40 for unsupervised training method 800. Signal source 156 may include any one or more signal-producing sources that produces signals of the type needed by the present invention. Such sources include an operation (not shown) that processor 140 is executing, or that is being executed by another processor in communication with processor 140, that provides labeled glyph position data 70 to processor 140 for processing according to the present invention. An example of such an operation is a recognition operation performed on 2D image 10 that produces labeled glyph position data 70 as its output. Processor 140 then provides labeled glyph position data 70 to data memory 114 for storage. Signal source 156 may also include input devices controllable by a human user that produce signals in response to actions by the user, such as a keyboard or pointing device; for example, a user interface operation may be executed by processor 140 to obtain information from a user needed to construct the formal image source model 40; in response to actions by the user interacting with the user interface to provide the requested information, signal source 156 produces signals indicating data used to construct formal image source model 40 which are then received by processor 140 via input circuitry 158, and stored in data memory 114.

Processor 140 is also connected for accessing program memory 110 and data memory 114 to obtain data stored therein. Processor 140 of machine 100 operates by accessing program memory 110 to retrieve instructions, which it then executes. Program memory 110 includes the underlying system software and firmware 112 that provide the operating system and operating facilities of machine 100, and includes template construction routine 400 that implements the invention described in the flowcharts of FIGS. 3, 5 and 11, including subroutine 430 for creating the aligned glyph sample image regions, and subroutine 450 for assigning foreground pixel colors to template pixel positions; program memory 110 may also include routines that implement the variations shown in the pseudo code of Table 3 and FIGS. 16, 17 and 18. When machine 100 implements the unsupervised training technique of the present invention, program memory 110 further includes unsupervised character template training routine 800, and its two subroutines 330 and 380, implementing the block diagram and flowchart of FIGS. 23 and 26, respectively.

During execution of the instructions for template construction routine 40 in program memory 110, processor 140 accesses data memory 114 to obtain data items in labeled glyph position data 70, and to write glyph sample image region data 74 to data memory 114 using 2D image 10; during template pixel assignment subroutine 450, processor 140 writes the results in character template data structure 20 in memory 114. When machine 100 implements the unsupervised training technique of the present invention, data memory 114 also stores other data, such as the 2D image source model 60 and an existing set of character templates 320 used by the recognition operation. Miscellaneous data 122 includes other data used in executing instructions in program memory 110, and may include initial values, indices for use in accessing the template canvases and sample image regions, aligned pixel scores, and the factors γ and β for use in computing pixel scores. Depending on the particular implementation of unsupervised character template training technique 800, miscellaneous data 122 may include the Viterbi decoding lattice and scores.

Machine 100 may, but need not, include output circuitry 160 connected to processor 140 for receiving image definition data defining an image for presentation on display device 170. A display or display device is any image output device that is capable of presenting information in human perceptible form, and display device 170 may include a cathode ray tube device or a liquid crystal display device for presenting images on display screens, or a printer device for presenting images on a marking medium. Thus output circuitry 160 may include a screen display device driver or printing circuitry. In a document recognition system integrating the present invention as a component thereof, for example, display device 170 may be either a printer or a display screen for presenting the final set of trained character templates for visual inspection by a user. In another example, when display device 170 is a screen display, it may be used in conjunction with a user interaction device by the user for providing information to machine 100.

The actual manner in which the physical components of machine 100 are connected may vary, and may include hardwired physical connections between some or all of the components as well as connections over wired or wireless communications facilities, such as through remote or local communications networks and infrared and radio connections. Image signal source 154 and image input circuitry 152, for example, may be physically included in a single physical unit such as a scanning device that is part of a device such as a facsimile machine, that produces 2D image 10 and transmits it for receipt by processor 140. Or, either or both memory 110 or 114 may include memory that is physically connected to processor 140 as local memory, or that is remotely accessible to processor 140 by means of a wired or wireless communications facility. It is further of importance to note that the range of the physical size of machine 100, or of any of its components, may vary considerably from a large device, for example, a multi-featured high volume copier/duplicator device, to much smaller desktop, laptop, and pocket-sized or smaller display devices. The character template construction and unsupervised character template training techniques of the present invention are operable on all machines in this physical size range.

While this invention has been described in conjunction with specific embodiments, it is evident that many alternatives, modifications and variations will be apparent to those skilled in the art. Accordingly, the invention as herein described is intended to embrace all such alternatives, modifications and variations as fall within the scope of the appended claims.

What is claimed:

1. A method of operating a machine to train a set of character templates; the machine including a processor and a memory device for storing data; the data stored in the memory device including instruction data the processor executes to operate the machine; the processor being connected to the memory device for accessing the data stored therein; the method comprising:

operating the processor to receive and store, in the memory device of the machine, an image definition data structure including a plurality of image pixel positions defining an image; the image definition data structure, hereafter referred to as an image glyph source, including a plurality of glyphs occurring therein; each glyph being an image instance of a respective one of a plurality of characters in a character set; the set of character templates being trained representing respective ones of the plurality of characters in the character set;

operating the processor to receive and store, in the memory device of the machine, a plurality of labeled glyph position data items; each labeled glyph position data item indicating one of the plurality of image pixel positions in the image glyph source as an image glyph source location of a glyph occurring therein; each labeled glyph position data item further indicating a glyph label, hereafter referred to as a respectively paired glyph label, paired with the image pixel position identifying the glyph indicated by the image pixel position as a respective one of the plurality of characters in the character set;

operating the processor to determine a sample image region included in the image glyph source for each labeled glyph position data item; the sample image region including the image pixel position indicating the image glyph source location of a glyph and being identified as a training data sample for the character template indicated by the respectively paired glyph label; each sample image region including a plurality of image pixel positions in the image glyph source, hereafter referred to as sample pixel positions, each indicating a sample pixel value;

operating the processor to produce, for each respective character template to be trained, a template image region including a plurality of template pixel positions for storing the respective character template; and operating the processor to produce the set of character templates using the template image regions and the sample image regions; producing the set of character templates including (a) computing template pixel scores for respective ones of the template pixel positions in the template image regions using the sample pixel values indicated by the sample pixel positions included in the sample image regions;

(b) assigning a foreground pixel value to a template pixel position, referred to as an assigned template pixel position, in one of the template image regions; the assigned template pixel position being selected on the basis of the template pixel scores;

(c) modifying the sample pixel values of the sample pixel positions used in computing the template pixel score for the assigned template pixel position to indicate modified sample pixel values that, when used in computing a subsequent template pixel score for an unassigned template pixel position, reduce the chance that a foreground pixel value will be assigned to the unassigned template pixel position on the basis of the subsequent template pixel score; and (d) repeating substeps (a), (b) and (c) until a stopping condition indicates that the set of character templates is complete.

2. The method of operating a machine to train a set of character templates of claim 1 wherein the template pixel scores computed for respective ones of the template pixel positions in the template image regions are computed for template pixel positions included in at least first and second template image regions; and when a first assigned template pixel position is included in the first template image region, a foreground pixel value may be assigned to an unassigned template pixel position in the second template image region on the basis of the template pixel score computed for the unassigned template pixel position before all template pixel positions included in the first template image region have been assigned, such that the first and second character templates in the set of character templates are produced substantially contemporaneously with each other.

3. The method of operating a machine to train a set of character templates of claim 1 wherein each character template stored in a respective template image region has a foreground probability parameter associated therewith indicating a probability value that the foreground pixel values indicated by the template pixel positions in the template image region are valid foreground pixel values; and the substep (a) of computing the template pixel scores for respective ones of the template pixel positions in the template image regions further includes computing the template pixel scores for a respective one of the template image regions using the probability value associated with the respective template image region.

4. The method of operating a machine to train a set of character templates of claim 3 wherein each character template stored in a respective template image region further has a background probability parameter associated therewith indicating a probability value that the background pixel values indicated by the template pixel positions in the template image region are valid background pixel values; and wherein the template pixel scores computed for template pixel positions in a respective one of the template image regions are computed using a threshold data item indicating a threshold value that represents a relationship between the foreground probability parameter and the background probability parameter associated with the respective character template stored in the respective template image region.

5. The method of operating a machine to train a set of character templates of claim 3 wherein the foreground probability parameter associated with each character template in the set of character templates indicates an identical probability value associated with each character template.

6. The method of operating a machine to train a set of character templates of claim 3 wherein the foreground probability parameter associated with each character template indicates a probability value that varies by character template in the set of character templates.

7. The method of operating a machine to train a set of character templates of claim 3 wherein the probability value indicated by the foreground probability parameter associated with each character template is related to a model of the image glyph source that models image noise present in the image glyph source resulting from an operation used to produce the image glyph source.

8. The method of operating a machine to train a set of character templates of claim 3 wherein at least one character template in the set of character templates being trained represents a character that, when imaged on a marking medium, is perceived as having white foreground pixels imaged against black background pixels, referred to as a reverse video character; the at least one character template representing the reverse video character being referred to as a reverse video character template; the template image region storing the reverse video character template being referred to as a reverse video template image region;

wherein the white foreground pixels of the reverse video character are stored as black foreground pixels in a reverse video template image region representing the reverse video character, and the black background pixels of the reverse video character are stored as white background pixels in the reverse video template image region; and wherein the foreground probability parameter associated with the reverse video character template indicates a low probability value indicating that the black foreground pixel values indicated by the template pixel positions in the reverse video template image region are less likely to be valid black foreground pixel values, such that an operation using the reverse video character template interprets the black foreground pixel values as white foreground pixels.

9. The method of operating a machine to train a set of character templates of claim 8 wherein each reverse video character template further has a background probability parameter associated therewith indicating a probability value that the background pixel values indicated by the template pixel positions in the reverse video template image region are valid background pixel values; and wherein the template pixel scores computed for template pixel positions in a respective one of the reverse video template image regions are computed using a threshold data item indicating a threshold value that represents a relationship between the foreground probability parameter and the background probability parameter associated with the respective reverse video character template.

10. The method of operating a machine to train a set of character templates of claim 8 wherein the set of character templates being trained includes a "space" character template defined as a plurality of foreground template pixel positions each indicating a background pixel value; the template image regions produced for storing respective character templates including a template image region, hereafter referred to as a "space" template image region for storing the "space" character template; the "space" character template being produced using the "space" template image region and using at least one sample image region identified as a training sample for a "space" character in the character set; and wherein the "space" character template is trained in the same manner as a reverse video character template.

11. The method of operating a machine to train a set of character templates of claim 1 wherein each template pixel position included in a respective template image region has a foreground probability parameter associated therewith indicating a probability value that the foreground pixel value indicated by the template pixel position is a valid foreground pixel value; and wherein the substep (a) of computing the template pixel scores for respective ones of the template pixel positions in the template image regions further includes computing each template pixel score for a respective template pixel position using the probability value associated with the respective template pixel position.

12. The method of operating a machine to train a set of character templates of claim 11 wherein the probability value indicated by the foreground probability parameter associated with each template pixel position is selected from a set of predetermined probability values; and wherein the substep (a) of computing each template pixel score for the respective template pixel position using the probability value associated with the respective template pixel position further includes selecting a probability value to be associated with the template pixel position from the set of predetermined probability values, and assigning the probability value to the template pixel position.

13. The method of operating a machine to train a set of character templates of claim 1 wherein each template pixel position in each template image region is identified relative to a local template region origin position defined according to a local template coordinate system; one of the template pixel positions included in each template image region being designated as a template origin position having a displacement from the local template region origin position in the local template coordinate system;

wherein a plurality of sample image regions identified by respectively paired glyph labels as training data samples for a respective one of the character templates is included in a glyph sample collection data structure, referred to as a glyph sample collection, for the respective character template;

wherein each sample pixel position in each sample image region in each glyph sample collection is identified relative to a local sample region origin position according to a local sample coordinate system; the image pixel position in each sample image region that indicates the image glyph source location of a glyph in the sample image glyph source being positioned in the sample image region at a displacement from the local sample image region origin position equal to the displacement of the template origin position from the local template region origin position in the template image region representing the character template identified by the glyph sample collection, such that the sample image regions included in a glyph sample collection are effectively aligned at their respective image glyph source locations, being hereafter referred to as aligned sample image regions; each sample pixel position in a first one of the aligned sample image regions being respectively paired with a sample pixel position at the same displacement from the local sample region origin position in a second one of the aligned sample image regions, and being respectively paired with a template pixel position at the same displacement from the local template region origin position in the template image region representing the character template identified by the glyph sample collection; and wherein the substep (a) of computing the template pixel scores for respective ones of the template pixel positions in the template image regions further includes computing each template pixel score for a respective template pixel position using respectively paired sample pixel positions in the aligned sample image regions included in the glyph sample collection identifying training data samples for the respective template image region.

14. The method of operating a machine to train a set of character templates of claim 1 wherein each template pixel score computed for a respective template pixel position is a function of a count of foreground pixel values indicated by the sample pixel positions included in the sample image regions used for computing the template pixel score;

wherein substep (b) of assigning a foreground pixel value to a template pixel position further includes selecting the template pixel position on the basis of a maximum template pixel score; and wherein substep (c) of modifying the sample pixel values of the sample pixel positions used in computing the template pixel score for an assigned template pixel position includes modifying the sample pixel values to indicate background pixel values, such that a subsequently-computed template pixel score computed for an unassigned template pixel position using the modified sample pixel values will be reduced, thereby reducing the likelihood that a foreground pixel value will be assigned to the unassigned template pixel position on the basis of the subsequently-computed template pixel score.

15. The method of operating a machine to train a set of character templates of claim 1 wherein a first one of the sample image regions including a first image pixel position indicating a first image glyph source location as a first glyph and identified as a training data sample for a first character template; the first sample image region having size dimensions large enough to further include a second image pixel position included in the image glyph source indicating a second image glyph source location as a second glyph, such that the first sample image region includes sample pixel positions belonging to the first and second glyphs;

wherein a second sample image region also includes the second image pixel position indicating the second image glyph source location as the second glyph; the second sample image region being identified as a training data sample for a second character template by a second respectively paired glyph label; the second sample image region also including sample pixel positions belonging to the second glyph; and wherein the set of character templates for the characters in the character set is produced without requiring all sample pixel positions in a sample image region to belong to a single glyph.

16. A method of operating a machine to train a set of character templates; the machine including a processor and a memory device for storing data; the data stored in the memory device including instruction data the processor executes to operate the machine; the processor being connected to the memory device for accessing the data stored therein; the method comprising:

operating the processor to receive and store, in the memory device of the machine, an image definition data structure including a plurality of image pixel positions defining an image; the image definition data structure, hereafter referred to as an image glyph source, including a plurality of glyphs occurring therein; each glyph being an image instance of a respective one of a plurality of characters in a character set; the set of character templates being trained representing respective ones of the plurality of characters in the character set;

operating the processor to receive and store, in the memory device of the machine, a plurality of labeled glyph position data items; each labeled glyph position data item indicating one of the plurality of image pixel positions in the image glyph source as an image glyph source location of a glyph occurring therein; each labeled glyph position data item further indicating a glyph label, hereafter referred to as a respectively paired glyph label, paired with the image pixel position identifying the glyph indicated by the image pixel position as a respective one of the plurality of characters in the character set;

operating the processor to produce, for each respective character template to be trained, a template image region including a plurality of template pixel positions for storing the respective character template;

operating the processor to determine a sample image region included in the image glyph source for each labeled glyph position data item; the sample image region including the image pixel position indicating the image glyph source location of a glyph and being identified as a training data sample for the character template indicated by the respectively paired glyph label; each sample image region including a plurality of image pixel positions in the image glyph source, hereafter referred to as sample pixel positions, each indicating a sample pixel value; and operating the processor to produce the set of character templates using the template image regions and the sample image regions; producing the set of character templates including (a) producing an image definition data structure for defining and storing an ideal image; the ideal image being represented as a function of the set of character templates being trained, and being a reconstruction of the image glyph source formed by positioning respective ones of the character templates in an image plane at image pixel positions identified as image glyph source locations of glyphs occurring in the image glyph source; each respective one of the character templates positioned in the ideal image being identified by the glyph label paired with the image glyph source location;

(b) computing pixel scores for template pixel positions in template image regions using selected ones of the sample pixel positions in selected ones of the sample image regions included in the image source of glyphs; and (c) sequentially assigning a pixel value to selected template pixel positions in selected template image regions; the selected template pixel positions being selected on the basis of the pixel scores optimizing the function representing the ideal image such that, when all template pixel positions have been assigned pixel values, the pixel value assigned to each selected template pixel position optimizes a matching score measuring a match between the image glyph source and the ideal image.

17. The method of operating a machine to train a set of character templates of claim 16 wherein glyphs occurring in the image glyph source are positioned according to a characteristic image positioning property such that, when a second glyph is positioned in the image glyph source with a glyph image origin position thereof displaced from a glyph image origin position of a preceding first glyph by a set width thereof, a first bounding box entirely containing the first glyph overlaps in the image glyph source with a second bounding box entirely containing the second glyph, and the first and second glyphs have substantially nonoverlapping foreground pixel positions;

wherein each sample image region has size dimensions large enough to include at least two glyphs positioned in the image glyph source according to the characteristic image positioning property;

wherein each character template in the set of character templates being trained is defined relative to a template origin position; the function representing the ideal image requiring that respective ones of the character templates forming the ideal image in the image plane be positioned according to the characteristic image positioning property, such that, when a second character template is positioned in the ideal image with the template origin position thereof displaced from the template origin position of a preceding first character template by a character set width thereof, a first bounding box entirely containing the first character template is permitted to overlap in the image with a second bounding box entirely containing the second character template as long as the first and second character templates have substantially nonoverlapping foreground pixel positions; and wherein the selected template pixel positions selected on the basis of the pixel scores optimizing the function representing the ideal image are selected further on the basis of the pixel scores optimizing the matching score between the image glyph source and the ideal image when the ideal image has character templates positioned according to the characteristic image positioning property.

18. The method of operating a machine to train a set of character templates of claim 16 wherein the selected pixel positions in selected sample image regions are selected by character template to include a plurality of sample image regions, referred to as a glyph sample collection, identified by respectively paired glyph labels as training data samples for a respective one of the character templates;

wherein each template pixel position in each template image region is identified relative to a local template region origin position defined according to a local template coordinate system; one of the template pixel positions included in each template image region being designated as a template origin position having a displacement from the local template region origin position in the local template coordinate system; and wherein each sample pixel position in each sample image region in each glyph sample collection is identified relative to a local sample region origin position according to a local sample coordinate system; the image pixel position in each sample image region that indicates the image glyph source location of a glyph in the image glyph source being positioned in the sample image region at a displacement from the local sample region origin position equal to the displacement of the template origin position from the local template region origin position in the template image region representing the character template identified by the glyph sample collection, such that the sample image regions included in a glyph sample collection are effectively aligned at their respective image glyph source locations, being hereafter referred to as aligned sample image regions; each sample pixel position in a first one of the aligned sample image regions being respectively paired with a sample pixel position at the same displacement from the local sample region origin position in a second one of the aligned sample image regions, and being respectively paired with a template pixel position at the same displacement from the local template region origin position in the template image region representing the character template identified by the glyph sample collection; the selected pixel positions used by the template assignment selection criteria being the respectively paired pixel positions in the aligned sample image regions.

19. The method of operating a machine to train a set of character templates of claim 16 wherein each pixel score computed for a respective template pixel position is a function of a count of foreground pixel values indicated by the sample pixel positions included in the sample image regions used for computing the pixel score.

20. The method of operating a machine to train a set of character templates of claim 16 wherein each character template stored in a respective template image region has a foreground probability parameter associated therewith indicating a probability value that the foreground pixel values indicated by the template pixel positions in the template image region are valid foreground pixel values; and the substep (b) of computing the pixel scores for the template pixel positions in the template image regions further includes computing the pixel scores for a respective one of the template image regions using the probability value associated with the respective template image region.

21. The method of operating a machine to train a set of character templates of claim 20 wherein the set of character templates being trained includes a "space" character template defined as a plurality of foreground template pixel positions each indicating a background pixel value; the template image regions produced for storing respective character templates including a template image region, hereafter referred to as a "space" template image region for storing the "space" character template; the "space" character template being produced using the "space" template image region and using at least one sample image region identified as a training sample for a "space" character in the character set;

wherein the white foreground pixels of the "space" character are stored as black foreground pixels in the "space" template image region representing the "space" character, and the black background pixels of the "space" character are stored as white background pixels in the "space" template image region; and wherein the foreground probability value associated with the "space" character template is a low probability value indicating that the black foreground pixel values indicated by the template pixel positions in the "space" template image region are less likely to be valid black foreground pixel values, such that an operation using the "space" character template interprets the black foreground pixel values as white foreground pixels.

22. A method of operating a machine to train a set of character templates; the machine including a processor and a memory device for storing data; the data stored in the memory device including instruction data the processor executes to operate the machine; the processor being connected to the memory device for accessing the data stored therein; the method comprising:

operating the processor to receive and store, in the memory device of the machine, an image definition data structure including a plurality of image pixel positions defining an image; the image definition data structure, hereafter referred to as an image glyph source, including a plurality of glyphs occurring therein; each glyph being an image instance of a respective one of a plurality of characters in a character set; the set of character templates being trained representing respective ones of the plurality of characters in the character set;

operating the processor to receive and store, in the memory device of the machine, a plurality of labeled glyph position data items; each labeled glyph position data item indicating one of the plurality of image pixel positions in the image glyph source as a glyph image origin position of a glyph occurring therein; the plurality of labeled glyph position data items identifying positions of glyphs occurring in the image glyph source without requiring identification of minimal bounding boxes for the glyphs; each labeled glyph position data item further indicating a glyph label, hereafter referred to as a respectively paired glyph label, paired with the image pixel position identifying the glyph indicated by the image pixel position as a respective one of the plurality of characters in the character set;

operating the processor to produce, for each respective character template to be trained, a template image region including a plurality of template pixel positions for storing the respective character template; one of the template pixel positions being designated as a template origin position;

operating the processor to determine a sample image region included in the image glyph source for each labeled glyph position data item; the sample image region including the image pixel position indicating the glyph image origin position of a glyph and being identified as a training data sample for the character template indicated by the respectively paired glyph label; each sample image region including a plurality of image pixel positions in the image glyph source, hereafter referred to as sample pixel positions, each indicating a sample pixel value; each sample image region having no minimal size restriction such that a sample image region is not required to include sample pixel positions belonging only to a single glyph; and operating the processor to produce the set of character templates using the template image regions and the sample image regions; each character template being based on a character template model defining character image positioning, referred to as the sidebearing template model of character image positioning, wherein each character template is defined relative to a template origin position; each character template produced having a characteristic image positioning property such that, when a second character template is positioned in an image with the template origin position thereof displaced from the template origin position of a preceding first character template by a character set width thereof, a first bounding box entirely containing the first character template is permitted to overlap in the image with a second bounding box entirely containing the second character template as long as the first and second character templates have substantially nonoverlapping foreground pixel positions;

the set of character templates being produced by sequentially assigning, in a template assignment order, a foreground pixel value to a selected template pixel position in a selected template image region until the set of character templates is complete; the template assignment order being determined on the basis of template assignment selection criteria determined using the sample pixel values indicated by the sample pixel positions in the sample image regions; the template assignment selection criteria determining which sample pixel positions in which sample image regions to use in selecting template pixel positions for foreground pixel value assignment such that a sample pixel position included in a first sample image region identified as a training data sample for a first character template that is identical to a sample pixel position included in a second sample image region identified as a training data sample for a second character template is used in a manner that produces character templates that substantially observe the characteristic imaging property of the sidebearing template model.

23. The method of operating a machine to train a set of character templates of claim 22 wherein the step of operating the processor to produce the set of character templates further includes determining, for each character template, a character set width thereof using glyph sample width data computed using the sample image regions identified as training data samples for the respective character template.

24. A machine for training a set of character templates including an image input device for providing image definition data defining images;

image input circuitry connected for receiving the image definition data defining images from the image input device;

input circuitry for receiving signal data; the input circuitry being connected to a signal source for providing the signal data;

a processor; and a memory device for storing data; the data stored in the memory device including instruction data indicating instructions the processor executes to operate the machine;

the processor being connected to the image input circuitry for receiving the image definition data defining an image; the processor being further connected to the input circuitry for receiving the signal data; the processor being further connected to the memory device for storing data therein and for accessing the data stored therein;

the processor, in executing the instructions, receiving and storing, in the memory device of the machine, an image definition data structure including a plurality of image pixel positions defining an image; the image definition data structure, hereafter referred to as an image glyph source, including a plurality of glyphs occurring therein; each glyph being an image instance of a respective one of a plurality of characters in a character set; the set of character templates being trained representing respective ones of the plurality of characters in the character set; and receiving and storing, in the memory device of the machine, a plurality of labeled glyph position data items; each labeled glyph position data item indicating one of the plurality of image pixel positions in the image glyph source as an image glyph source location of a glyph occurring therein; each labeled glyph position data item further indicating a glyph label, hereafter referred to as a respectively paired glyph label, paired with the image pixel position identifying the glyph indicated by the image pixel position as a respective one of the plurality of characters in the character set; the processor, further in executing the instructions, producing, for each respective character template to be trained, a template image region including a plurality of template pixel positions for storing the respective character template; and determining a sample image region included in the image glyph source for each labeled glyph position data item; the sample image region including the image pixel position indicating the image glyph source location of a glyph and being identified as a training data sample for the character template indicated by the respectively paired glyph label; each sample image region including a plurality of image pixel positions in the image glyph source, hereafter referred to as sample pixel positions, each indicating a sample pixel value; the processor, further in executing the instructions, producing the set of character templates using the template image regions and the sample image regions; wherein producing the set of character templates includes (a) producing an image definition data structure for defining and storing an ideal image; the ideal image being represented as a function of the set of character templates being trained, and being a reconstruction of the image glyph source formed by positioning respective ones of the character templates in an image plane at image pixel positions identified as image glyph source locations of glyphs occurring in the image glyph source; each respective one of the character templates positioned in the ideal image being identified by the glyph label paired with the image glyph source location;

(b) computing pixel scores for template pixel positions in template image regions using selected ones of the sample pixel positions in selected ones of the sample image regions included in the image source of glyphs; and (c) sequentially assigning a pixel value to selected template pixel positions in selected template image regions; the selected template pixel positions being selected on the basis of the pixel scores optimizing the function representing the ideal image such that, when all template pixel positions have been assigned pixel values, the pixel value assigned to each selected template pixel position optimizes a matching score measuring a match between the image glyph source and the ideal image.

* * * * *